United States Patent
Akama et al.

(10) Patent No.: US 7,893,638 B2
(45) Date of Patent: Feb. 22, 2011

(54) APPARATUS AND METHOD FOR DRIVING ROTARY MACHINE

(75) Inventors: Sadahiro Akama, Nukata-gun (JP); Shuji Agatsuma, Toyohashi (JP); Nobumasa Ueda, Nagoya (JP); Masahiro Kuroda, Yokkaichi (JP); Kiyoshi Nagata, Nagoya (JP); Masaya Ootake, Kariya (JP)

(73) Assignee: DENSO CORPORATION, Kariya (JP)

( * ) Notice: Subject to any disclaimer, the term of this patent is extended or adjusted under 35 U.S.C. 154(b) by 459 days.

(21) Appl. No.: 11/979,250

(22) Filed: Oct. 31, 2007

(65) Prior Publication Data
US 2008/0252242 A1 Oct. 16, 2008

(30) Foreign Application Priority Data

| Nov. 30, 2006 | (JP) | 2006-323947 |
| Dec. 6, 2006 | (JP) | 2006-329430 |
| Feb. 5, 2007 | (JP) | 2007-025840 |
| Feb. 5, 2007 | (JP) | 2007-025841 |
| Feb. 5, 2007 | (JP) | 2007-025842 |
| Feb. 21, 2007 | (JP) | 2007-040958 |
| Sep. 7, 2007 | (JP) | 2007-232989 |

(51) Int. Cl.
*H02P 23/12* (2006.01)
(52) U.S. Cl. ............ 318/400.14; 318/400.01; 318/400.06; 318/400.11; 318/400.13
(58) Field of Classification Search ............ 318/400.01, 318/400.13, 400.14, 400.06, 400.11
See application file for complete search history.

(56) References Cited

U.S. PATENT DOCUMENTS

| 5,432,414 A | 7/1995 | Sakurai et al. |
| 5,845,405 A | 12/1998 | Jeske et al. |
| 5,982,133 A * | 11/1999 | Murakami et al. .......... 318/650 |
| 6,140,789 A | 10/2000 | Kachi et al. |
| 6,163,117 A | 12/2000 | Rappenecker |
| 6,232,730 B1 * | 5/2001 | Doyama et al. ........ 318/400.04 |
| 6,232,737 B1 | 5/2001 | Kachi et al. |
| 6,483,270 B1 * | 11/2002 | Miyazaki et al. ............ 318/700 |

(Continued)

FOREIGN PATENT DOCUMENTS

CN 1655437 A 8/2005

(Continued)

OTHER PUBLICATIONS

First Office Action mailed on Nov. 6, 2009 issued from the Chinese Patent Office in the corresponding Chinese patent application No. 2007101940743 (with English translation).

(Continued)

*Primary Examiner*—Bentsu Ro
*Assistant Examiner*—David S Luo
(74) *Attorney, Agent, or Firm*—Posz Law Group, PLC

(57) ABSTRACT

A motor driving apparatus has a loss-of-synchronism monitoring circuit that monitors the rotation of a rotary machine such as a brushless DC motor to detect a sign of transition to a state of loss of synchronism. When the sign is detected, an energization control circuit temporarily stops driving of the rotary machine to bring it into a free running state, and thereafter carries out control so as to resume driving of the rotary machine. Further, the motor driving apparatus has an inverter and a drive control circuit that controls switching operation of the inverter based on rotation of the rotary machine.

19 Claims, 60 Drawing Sheets

U.S. PATENT DOCUMENTS

| | | | |
|---|---|---|---|
| 6,661,192 B2 * | 12/2003 | Copeland | 318/400.35 |
| 7,122,980 B2 * | 10/2006 | Kuroshima et al. | 318/400.11 |
| 2001/0035730 A1 | 11/2001 | Yoshikawa et al. | |
| 2002/0067148 A1 | 6/2002 | Moddemann | |
| 2005/0258788 A1 | 11/2005 | Mori et al. | |
| 2006/0279242 A1 | 12/2006 | Lindemann et al. | |

FOREIGN PATENT DOCUMENTS

| | | |
|---|---|---|
| DE | 10 2004 003 153 | 8/2004 |
| DE | 103 32 228 | 2/2005 |
| JP | A-2-290191 | 11/1990 |
| JP | A-4-317587 | 11/1992 |
| JP | A-7-115791 | 5/1995 |
| JP | A-7-327390 | 12/1995 |
| JP | B2-2642357 | 5/1997 |
| JP | A-10-256541 | 9/1998 |
| JP | A-11-18478 | 1/1999 |
| JP | A-2002-199777 | 7/2002 |
| JP | A-2002-218787 | 8/2002 |
| JP | A-2003-111483 | 4/2003 |
| JP | A-2003-224992 | 8/2003 |
| JP | A-2003-224993 | 8/2003 |
| JP | A-2004-104935 | 4/2004 |
| JP | A-2004-129471 | 4/2004 |
| JP | A-2005-137120 | 5/2005 |
| JP | A-2005-176456 | 6/2005 |
| JP | A-2005-287223 | 10/2005 |
| JP | A-2005-312145 | 11/2005 |

OTHER PUBLICATIONS

Second Office Action mailed on May 17, 2010 issued from the Chinese Patent Office in the corresponding Chinese patent application No. 200710194074.3 (with English translation).

Office Action mailed on Sep. 29, 2010 issued from the German Patent Office in corresponding German patent application No. 10 2007 057 746.1 (with English translation).

* cited by examiner

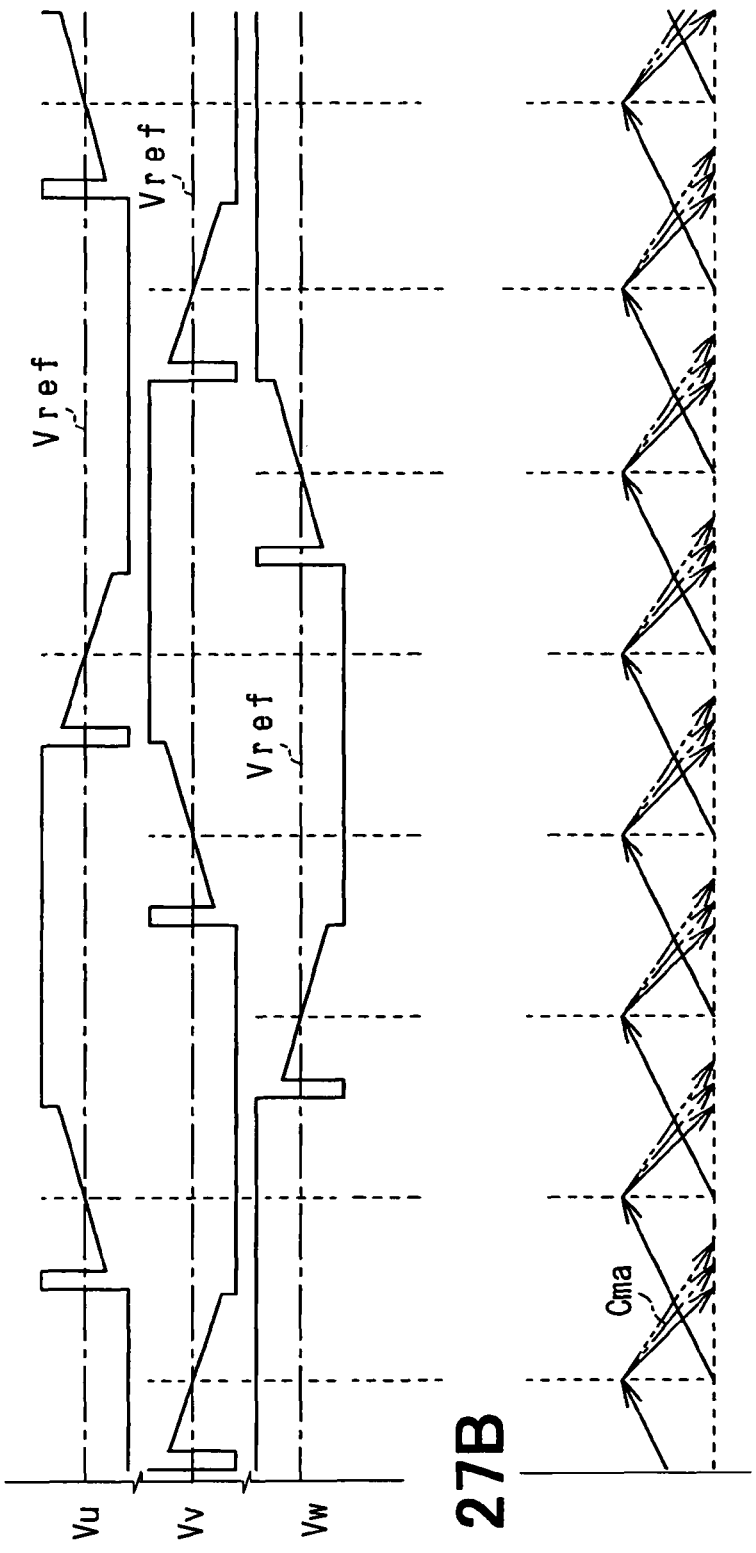

x > z ⇒ bxy < bzy

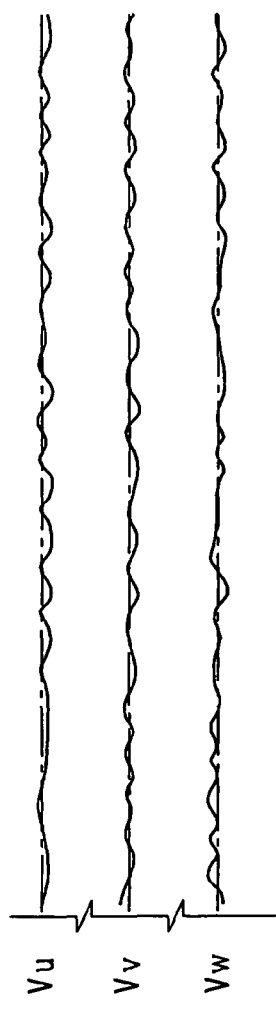
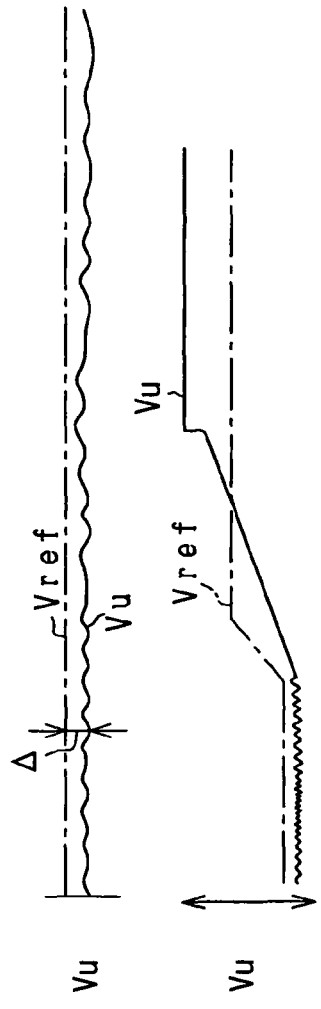
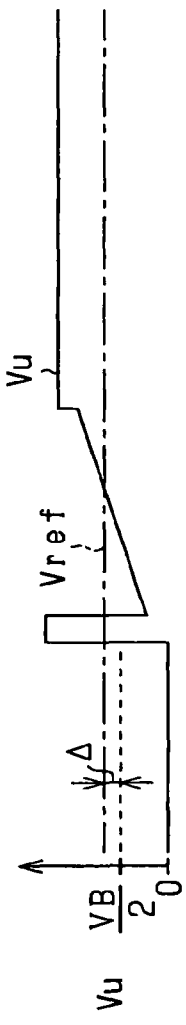
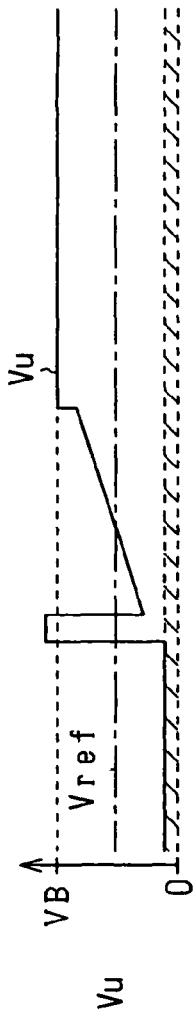
FIG. 36A  FIG. 36B  FIG. 36C  FIG. 36D  FIG. 36E UVF+ > UVF−
and/or
UVf+ < UVf−
and/or
UR+ > UR−

UVF=VVF=WVF
UVf=VVf=WVf
UR=VR=WR

| Cac | SMALL ⟷ LARGE |
| --- | --- |
| ΔAi | LARGE ⟷ SMALL |

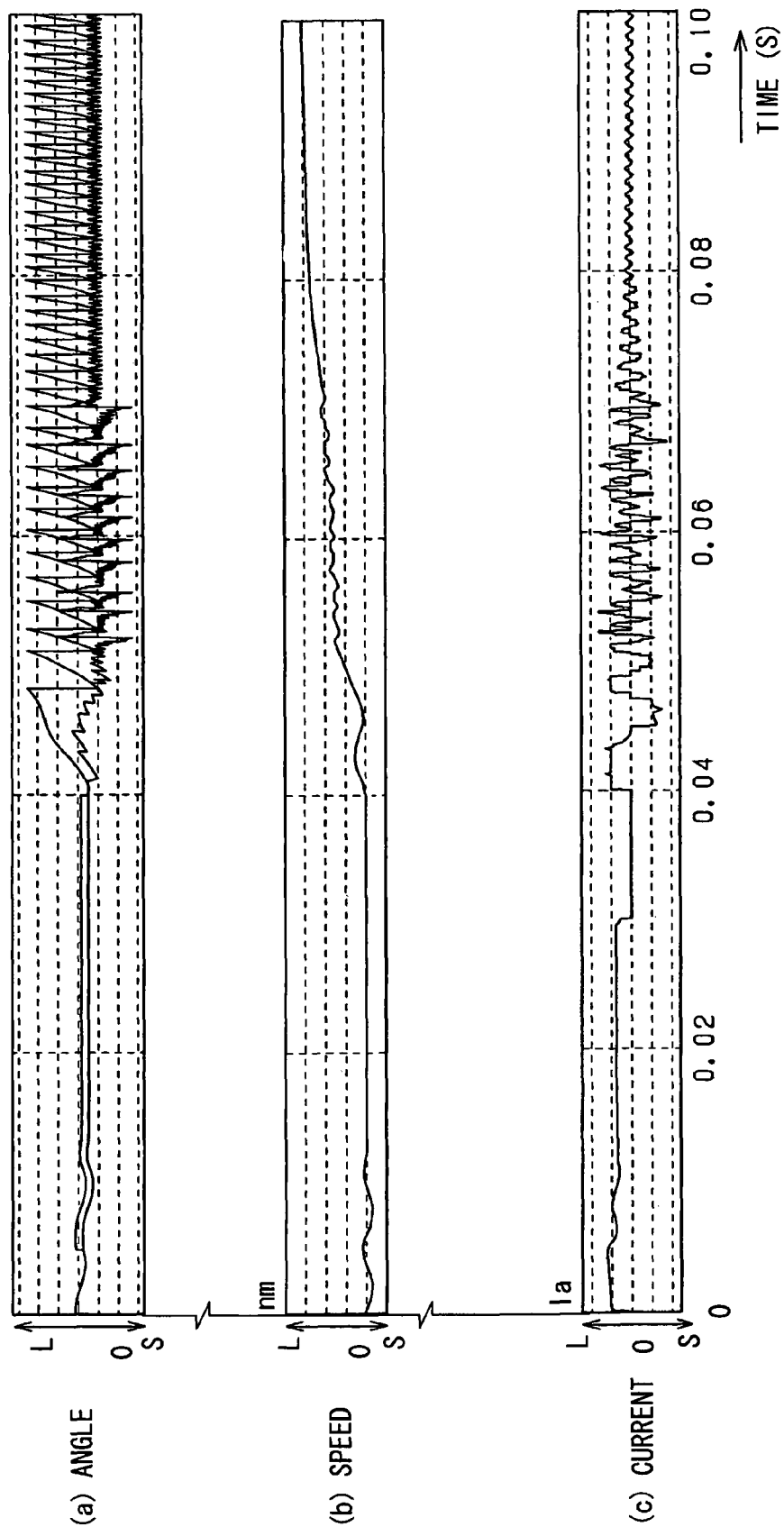

| Ai | SMALL ← A1 | 0 | A2 → LARGE |
|---|---|---|---|
| ΔAi | LARGE ← | 0 — 0 | → SMALL |

APPARATUS AND METHOD FOR DRIVING ROTARY MACHINE

CROSS REFERENCE TO RELATED APPLICATION

This application is based on an incorporates herein by reference Japanese patent applications No. 2006-323947 filed on Nov. 30, 2006, No. 2006-329430 filed on Dec. 6, 2006, No. 2007-25840 filed on Feb. 5, 2007, No. 2007-25841 filed on Feb. 5, 2007, No. 2007-25842 filed on Feb. 5, 2007, No. 2007-40958 filed on Feb. 21, 2007, and 2007-232989 filed on Sep. 7, 2007.

FIELD OF THE INVENTION

The present invention relates to an apparatus and a method for driving rotary electric machines such as a brushless DC motor, wherein the rotor position of the rotary machine is estimated to determine the energization time point for driving the rotary machine.

BACKGROUND OF THE INVENTION

Some of conventional driving apparatuses adopt a position sensorless method so designed as to estimate the rotor position of a brushless DC motor and thereby obtain the commutation time point of the motor and drive it. If a trouble occurs in such a driving apparatus or load fluctuation occurs, it can be brought into a state of loss of synchronism in which it cannot drive the motor as intended any more.

JP-A-2004-104935 discloses a technology for, when it is detected that a motor has been brought into a state of loss of synchronism and has stopped, resuming drive control on the motor. However, according to this technique, in case of a motor or the like for driving an electric vehicle, it is inappropriate to stop the rotation of the motor while the vehicle is traveling even though it has been brought into a state of loss of synchronism. The rotation of the motor must be maintained as much as possible. In this technique, after it is detected that a motor has completely lost synchronism, the loss of synchronism is coped with.

JP 4-317587A, U.S. Pat. No. 5,432,414 (JP 5-284781A) and JP 7-327390A disclose technologies for starting the motor by varying a frequency of excitation (energization) of the motor. Those technologies are proposed, because a motor is temporarily rotated in a reverse direction or torque produced in a motor is too large, and this causes over-speed and loss of synchronism, resulting in a lengthened starting time in the conventional apparatus. However, the proposed circuit for varying an excitation frequency is complicated, and this inevitably increases the size of the circuit. For example, when an excitation frequency is varied by digital processing, the number of bits of a counter for counting cycles corresponding to a frequency is increased.

JP 11-18478A disclose a technology to detect a time point at which an electrical angle of a motor becomes equal to a predetermined electrical angle based on an induced voltage developed as a terminal voltage of the motor. According to this technology, limitation is imposed on a permitted period for which detection of a time when the predetermined electrical angle occurs is permitted. However, a detected value of the rotational speed of a motor transitions to too high a value or too low a value and is fixed there. In these cases, it is difficult to control the rotating state of the motor as desired. When it transitions to too high a value or too low a value, a time when a predetermined electrical angle occurs does not fall within the permitted period. There are cases where, for example, power supply voltage or the load on a motor abruptly fluctuates and this causes the rotational speed of the motor to abruptly fluctuate. Also, in these cases, a time when a predetermined electrical angle occurs may temporarily fall outside the permitted period. For this reason, if, when a time when a predetermined electrical angle occurs does not fall within a permitted period, the rotating state is determined to be abnormal. There is a possibility that both a state (loss of synchronism state) in which it is difficult to control the rotating state as desired and a temporary rotational fluctuation state caused by load variation or the like are determined to be abnormal. It is thus difficult, for example, to continuously control a rotary machine if only load variation occurs.

US 2005/0258788 (JP 2005-333689A) discloses determination of an electrical angle of a motor by detecting induced voltages, that is, terminal voltages. When a three-phase motor is started, all switching elements of an inverter are OFF, and thus each phase of the three-phase motor is in a high-impedance state. For this reason, a situation in which a neutral point voltage is equal to the potential of each phase of the three-phase motor can occur. If noise is mixed when the induced voltage is detected in this state, the neutral point voltage and the voltage of each phase frequently cross each other. Eventually, the zero-crossing time is frequently erroneously detected. For this reason, for example, a system required to operate an inverter based on a detection signal with respect to zero-crossing time point from immediately after start of a three-phase motor cannot appropriately meet this requirement.

Further, in US 2005/0258788, the time required for the rotor to rotate by a predetermined interval of electrical angle is determined from time intervals between occurrences of time point with which the above zero-crossing occurs. Time point with which the time required passes after an occurrence of zero-crossing time point is taken as specified time point with which an angle that provides a basis for switching operation occurs. When a specified time point is set by the above method when the three-phase motor is started, the specified time point is set by shortening the predetermined interval of electrical angle used in the above computation of the time required. If this time point is calculated in the initial stage of startup as under normal conditions, this time point is unexceptionally delayed from a time point with which a reference angle occurs. In this case, the specified time point is set by determining a time required from an occurrence of zero-crossing time point to when a reference angle occurs based on a time interval between occurrences of the zero-crossing time point. The inventors found that, to make this setting with accuracy, the rotational speed of the motor must be stable. For this reason, the time point with which the reference angle occurs cannot be set with accuracy not only when the motor is started but also generally when the rotational speed largely fluctuates. This can lead to degraded controllability of the motor.

JP 2642357B1 discloses an example of a conventional control apparatus for multi-phase rotary machines. In another technique for controlling a rotary machine (three-phase brushless motor), a 120°-energization method illustrated in FIG. 50 is proposed. In this figure, (a) illustrates the transition of terminal voltages Vu, Vv, Vw; (b) illustrates the transition of comparison signals PU, PV PW as a result of comparisons of the terminal voltages Vu, Vv, Vw indicated by solid lines in (a) with a reference voltage Vref; (c) illustrates the transitions of a one-bit combined signal PS obtained by logically combining the comparison signals PU, PV, PW; and (d) illustrates the transition of a detection signal Qs obtained by shaping the waveform of the combined signal PS. With time point (zero-crossing time point) with which the terminal voltages Vu, Vv, Vw indicated by (a) agree with the reference voltage Vref, the output of the comparison signals PU, PV, PW is inverted. In reality, however, the output of the comparison signals PU, PV, PW is also inverted when the operation of the switching elements of an inverter (power conversion circuit) connected with the brushless motor is changed. This inversion is caused by the passage of a current through diodes connected in parallel with the switching elements. For this reason, the rising edges and the falling edges of the combined signal PS obtained by logically synthesizing the comparison signals PU, PV, PW coincide with not only zero-crossing time point. Some of them coincide with time point with which a current is supplied though the diodes. Meanwhile, all the rising edges and the falling edges of the detection signal Qs obtained as a result of waveform shaping coincide with zero-crossing time point.

The electrical angle of the brushless motor is uniquely determined by zero-crossing time point. For this reason, the following can be implemented by changing the operating state of switching elements at the time (specified time point) when a time required for a motor to rotate by a predetermined angular interval (e.g., 30°) from the zero-crossing time has passed. The brushless motor can be controlled by a 120°-energization method. More specifically, a time-series pattern with respect to the operation of switching elements is predetermined. Therefore, control by the 120°-energization method can be achieved by operating the switching elements according to the above pattern each time the specified time point occurs.

Since the detection signal Qs is a one-bit signal, it is impossible to discriminate one zero-crossing time from another in the three-phase brushless motor according to the signal. For this reason, if the rotating state of a brushless motor becomes abnormal or noise is mixed in a terminal voltage Vu, Vv, Vw or the like, there is a possibility that the controllability of the brushless motor is significantly degraded. More specific description will be given. Even if the brushless motor is rotated in reverse, for example, it is difficult to detect this reverse rotation from the detection signal Qs. Therefore, there is a possibility that change of the operation of the switching elements when a time required from a rising edge or a falling edge of the detection signal Qs has passed (specified time point) is continued as under normal conditions. In this case, the brushless motor cannot be appropriately controlled.

There is known a technique for carrying out the following for the purpose of controlling the output of the brushless motor, controlling and limiting a current supplied to the brushless motor, or for other like purposes. During a permitted period for the on operation of switching elements, defined based on the above specified time point, PWM modulation processing is carried out to repeatedly turn on and off the switching elements. In this case, however, a problem arises. In PWM modulation processing, switching elements are frequently switched from ON state to OFF state, and a current is thereby frequently passed through diodes. Eventually, the comparison signals PU, PV, PW and the combined signal PS are frequently inverted. At this time, it is difficult to generate the detection signal Qs as an appropriate signal synchronized with zero-crossing time point. Therefore, it is difficult to appropriately set a specified time point.

SUMMARY OF THE INVENTION

It is therefore a first object of the present invention to provide a rotary machine driving apparatus and method, wherein drive control can be restored without stopping the operation of a rotary machine driven by a sensorless method before the rotary machine is completely brought into a state of loss of synchronism. For attaining the first object, a state of rotation of the rotary machine is monitored to detect a sign of the rotary machine transitioning to a state of loss of synchronism, and driving of the rotary machine is temporarily stopped to bring the rotary machine into a free running state when the sign is detected. Thereafter, normal control for driving the rotary machine is resumed.

It is a second object of the present invention to provide a rotary machine driving apparatus and method, wherein a rotary machine can be started in a short time by a simple construction. For attaining the second object, forced commutation of a rotary machine is carried out, and a current supplied to a winding of the rotary machine is limited to an upper limit level set higher than a level at which a current flows when the rotary machine is in a normal rotating state, when the forced commutation is carried out.

It is a third object of the present invention to provide a rotary machine driving apparatus that is capable of more appropriately detecting a rotating state of a rotary machine based on an induced voltage of the motor. For attaining the third object, a permitted period for which detection of a predetermined electrical angle based on a detected value of a terminal voltage of a rotary machine is permitted, and a rotating state of the rotary machine is determined to be abnormal when the number of times the predetermined electrical angle continuously occurs either ahead of or behind the permitted period becomes equal to or higher than a threshold value.

It is a fourth object of the present invention to provide a rotary machine driving apparatus that avoids erroneous detection of a zero-crossing time point at which a neutral point voltage becomes equal to a reference voltage. For attaining the fourth object, a terminal voltage of a rotary machine is compared with a reference voltage with respect to magnitude to detect a zero-crossing time point when the reference voltage, which is either a neutral point voltage of the rotary machine or an equivalent thereof, and an induced voltage of the rotary machine agree with each other. A switching element for supplying current to the rotary machine is operated based on the zero-crossing time point. At least one of a value of the terminal voltage to be compared when a rotational speed of the rotary machine is substantially zero and a value of the reference voltage is offset-corrected so as to differentiate the values of the terminal voltage and the reference voltage.

It is a fifth object of the present invention to provide a rotary machine driving apparatus, wherein information pertaining to the electrical angle of a rotary machine can be acquired with higher accuracy based on a result of comparison of an induced voltage of the rotary machine with a reference voltage. For attaining the fifth object, a terminal voltage of each phase of a rotary machine is compared with a reference voltage, and information pertaining to an electrical angle of the rotary machine is acquired based on a result of comparison when a zero-crossing time point occurs in a present operating state of switching elements and an actual result of comparison with respect to each phase. It may be determined whether an abnormality is present in a rotating state of the rotary machine based on a detected value of an induced voltage of the rotary machine, and all the phases of the rotary machine may be conducted to either the positive pole or the negative pole of a power supply and thereby forcibly stopping the rotation of the rotary machine when an abnormality is detected.

It is a sixth object of the present invention to provide a rotary machine driving apparatus, wherein when switching elements of a power conversion circuit are operated to control a rotary machine, more appropriately determining time point with which a reference angle occurs based on a zero-crossing time point with which an induced voltage of the rotary machine becomes equal to a reference voltage regardless of fluctuation in rotational speed. For attaining the sixth object, information pertaining to a change in a rotational speed of a rotary machine is extracted from a result of detection of the zero-crossing time point, and a specified time point for controlling the rotary machine is variably set based on the information pertaining to the change in the rotational speed. The information is acceleration. An amount of energization to the rotary machine is limited according to the acceleration. The rotary machine is supplied with a current from one part of phases to another part of phases thereof before the rotary machine is started so that a rotation angle of the rotary machine is fixed at a predetermined angle. At least one of the one part of phases and the another part of phases includes a plurality of phases.

BRIEF DESCRIPTION OF THE DRAWINGS

The above and other objects, features and advantages of the present invention will become more apparent from the following detailed description made with reference to the accompanying drawings. In the drawings:

FIG. 27A is a signal diagrams illustrating a method for setting a maximum advance counter in an eighth embodiment;

FIG. 27B is a signal diagrams illustrating a count operation of a maximum advance counter;

FIG. 36A to 36E are signal diagrams illustrating transition of reference voltage and terminal voltages that occurs when a brushless motor whose rotation has been stopped is started;

FIG. 60 is a signal diagram illustrating result of simulation on the way rotational speed is increased when a motor is started without correction;

DETAILED DESCRIPTION OF THE EMBODIMENTS

First Embodiment

Figure 1:
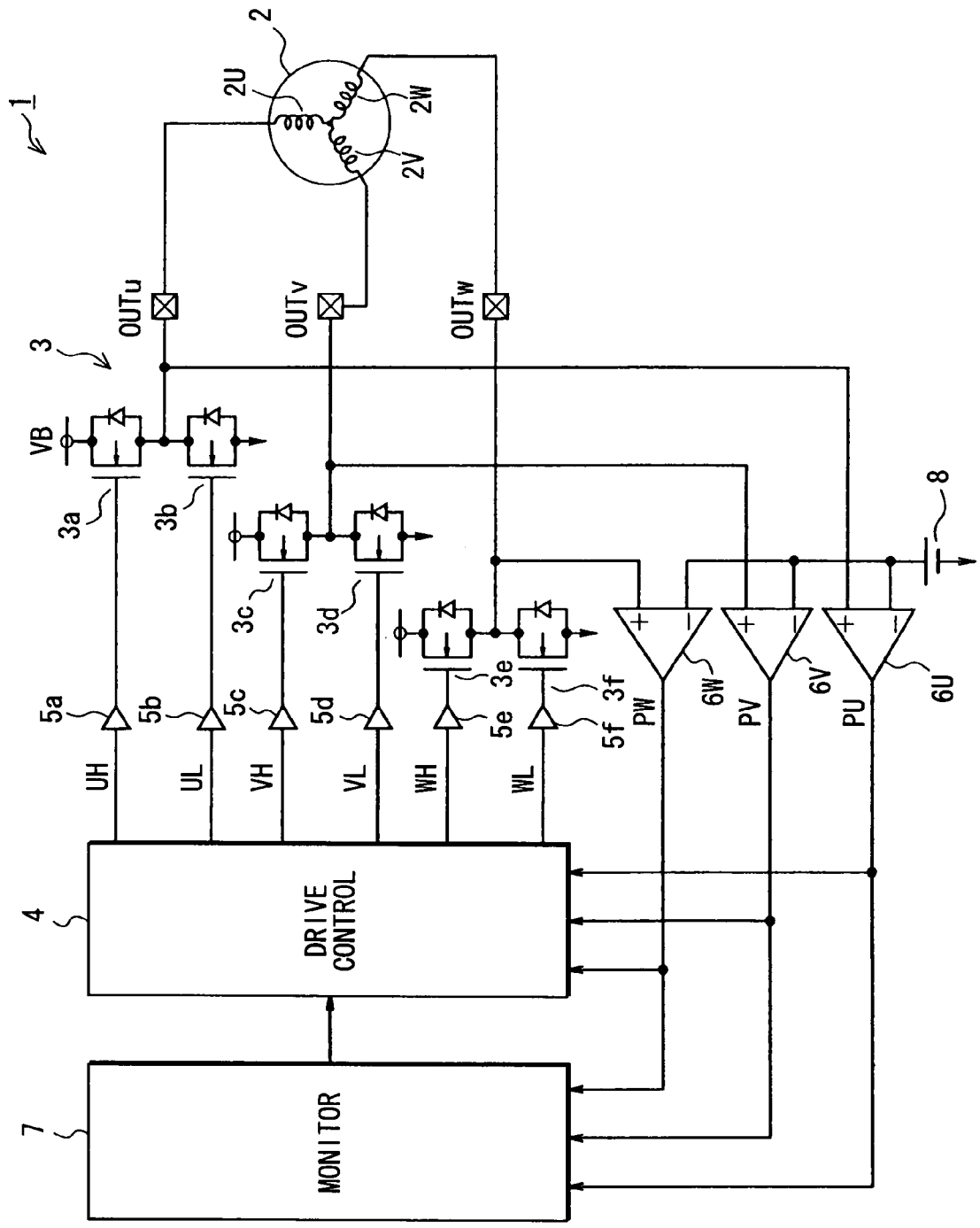
FIG. 1 is a circuit diagram illustrating a rotary machine driving apparatus in a first embodiment of the invention.

Referring to FIG. 1, a rotary machine driving apparatus 1 is supplied with driving power voltage VB from a battery (not shown) for vehicle driving power. A brushless DC motor 2, which is a rotary machine, is driven through an inverter unit 3. The inverter unit 3 is constructed as a power conversion circuit by, for example, connecting six N-channel power MOSFETs 3a to 3f in a three-phase bridge configuration. The output terminals of the respective phases of the inverter unit 3 are respectively connected to the stator coils (windings) 2U, 2V, 2W of the respective phases of the motor 2. The arrows facing downward in the figure indicate ground.

The inverter unit 3 is controlled by a drive control circuit (drive controlling means) 4 constructed of a microcomputer or a logic circuit. Driving signals are outputted to the gates of the FETs 3a to 3f through gate drive circuits 5a to 5f. Comparators 6U, 6V, 6W compare the output voltage of each phase of the inverter unit 3 with virtual neutral point potential. Then, they output comparison signals PU, PV, PW to the drive control circuit 4 and a loss-of-synchronism monitoring circuit (loss-of-synchronism predicting means) 7. The (+) terminals of the comparators 6U, 6V, 6W are respectively connected to the output terminals OUTu, OUTv, OUTw of the respective phases of the inverter unit 3. The (−) terminals of the same are connected with a reference voltage source 8 equivalent to the virtual neutral point potential (or VB/2) in common.

The drive control circuit 4 generates a commutation pattern signal for the inverter unit 3 based on the comparison signals PU, PV, PW and outputs it to the gate of each FET 3 through the corresponding gate drive circuit 5. Similarly with the drive control circuit 4, the loss-of-synchronism monitoring circuit 7 is constructed of a microcomputer or a logic circuit. It detects a sign (possibility) of the motor 2 transitioning to a state of loss of synchronism based on the above comparison signals PU, PV, PW. When the sign is detected, it outputs a drive stop signal to the drive control circuit 4 only for a predetermined time. As long as the drive stop signal is being outputted, the drive control circuit 4 stops drive control of the inverter unit 3 to keep the motor 2 in a free running state.

Figure 2:
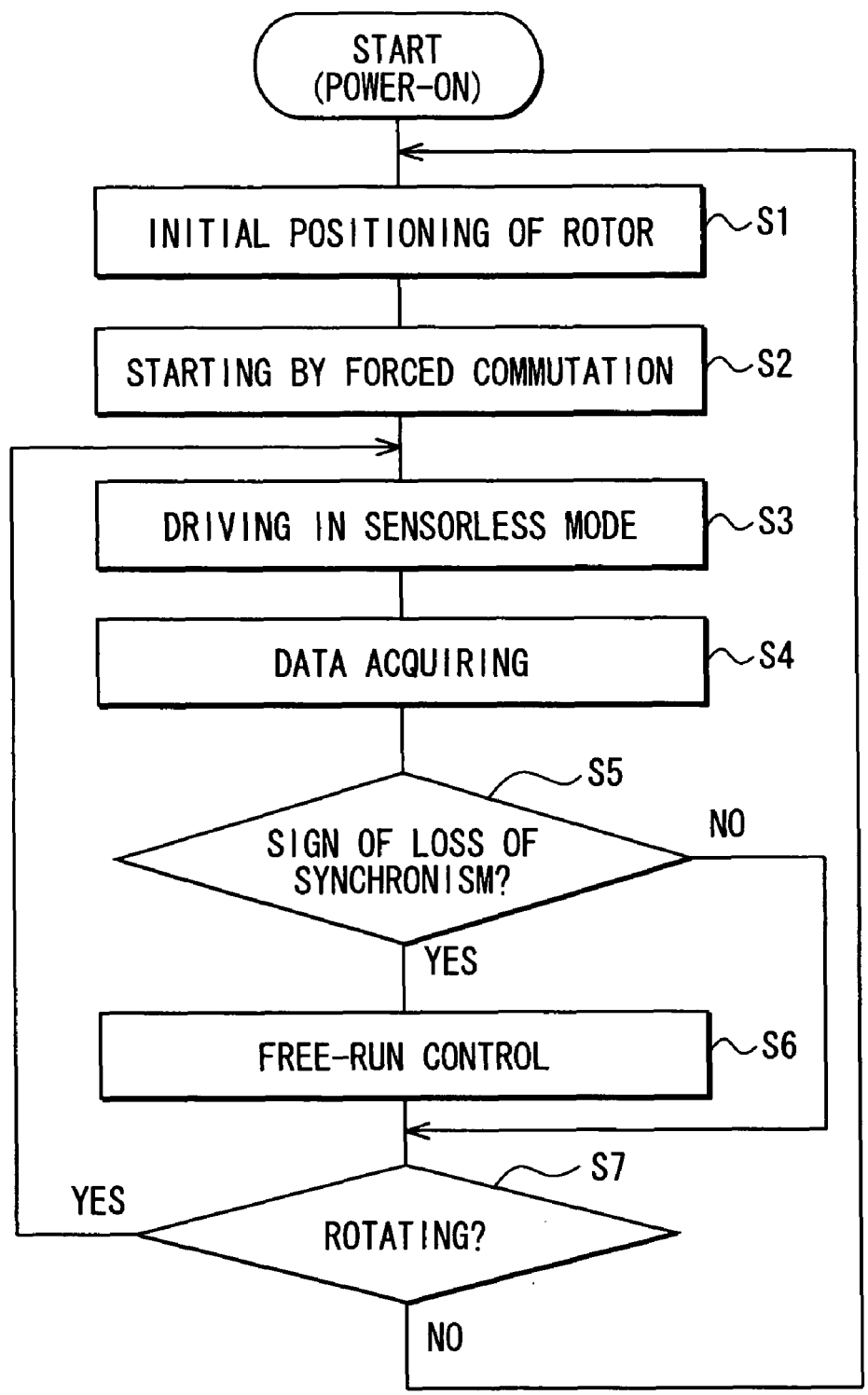
FIG. 2 is a flowchart illustrating processing carried out by a drive control circuit and a loss-of-synchronism monitoring circuit.

The drive control circuit 4 and the loss-of-synchronism monitoring circuit 7 carries out processing of FIG. 2. When power to the driving apparatus 1 is turned on, the drive control circuit 4 excites the windings 2U, 2V, 2W of the motor 2 by direct current to position its rotor (step 1: S1). Thereafter, the windings 2U, 2V, 2W are energized according to a predetermined commutation pattern, and thus the motor 2 is started by forced commutation (S2).

When the number of revolutions of the motor 2 is increased to some degree after it is started, induced voltage developed in the windings 2U, 2V, 2W can be observed. Consequently, the drive control circuit 4 changes the driving scheme for the motor 2 to sensorless mode (S3). That is, a commutation pattern signal for the inverter unit 3 is generated based on the comparison signals PU, PV PW, and gate signals UH to WL are outputted to the gates of the individual FETs 3a to 3f. The zero-crossing time point of induced voltage has a phase delay of an electrical angle of 30° from appropriate energization time point. Therefore, the drive control circuit 4 adjusts this phase delay when it generates a commutation pattern signal.

While the motor 2 is being driven in the sensorless mode, the loss-of-synchronism monitoring circuit 7 acquires data for predicting loss of synchronism (S4). Based on this data, it checks whether or not there is a sign (possibility) of loss of synchronism in the driving state of the motor 2 (S5). When it is determined that there is no sign of loss of synchronism ("NO"), the processing proceeds to S7.

At S7, the drive control circuit 4 checks whether or not the motor 2 is rotating at this point of time based on the comparison signals PU, PV, PW. When the motor is rotating ("YES"), the processing returns to S3, and sensorless mode is continued. When the motor 2 is at a stop ("NO"), the processing returns to S1, and the motor 2 is restarted by carrying out the processing of initial positioning and then forced commutation.

Figure 3:
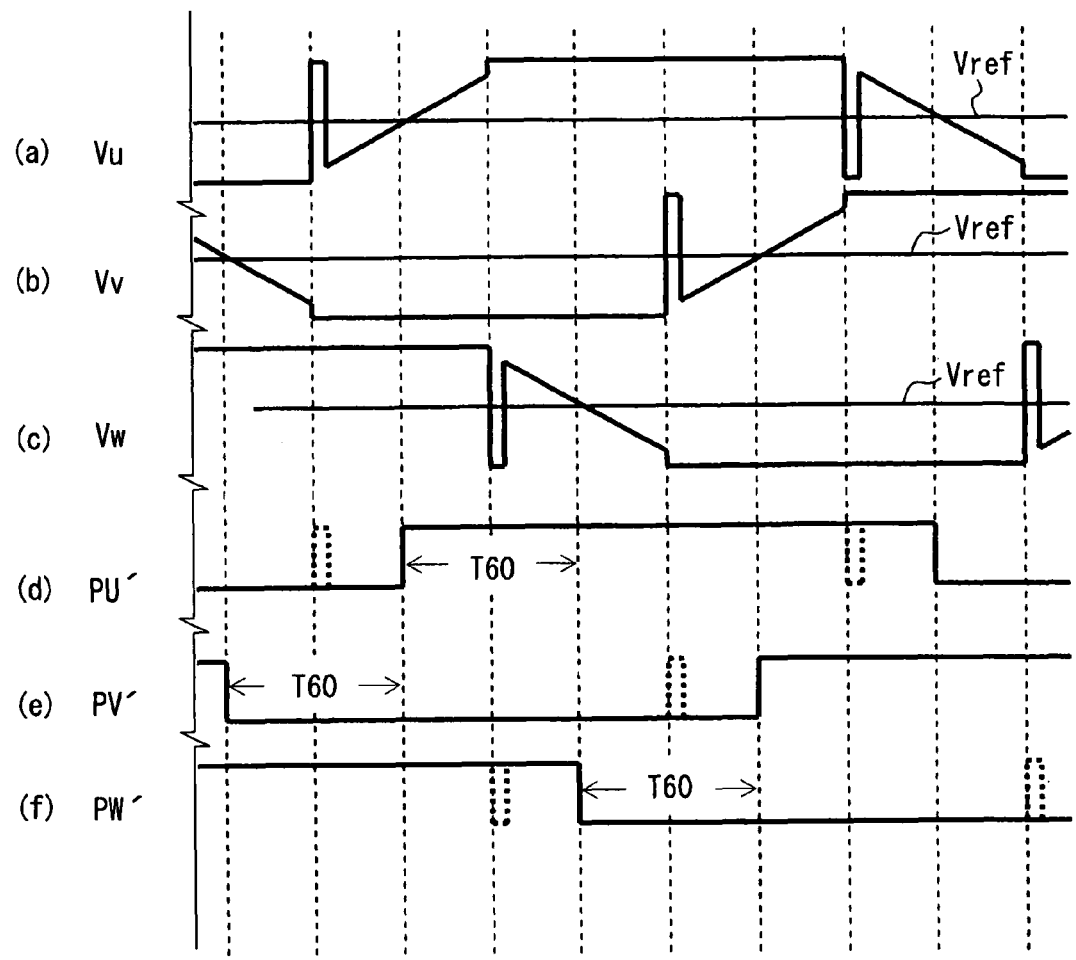
FIG. 3 is a signal diagram illustrating output voltage waveforms of an inverter unit observed when a motor is rotating.

The prediction and detection of loss of synchronism at S4 and S5 are carried out as described below. FIG. 3 illustrates the waveforms of the output voltages of the inverter unit 3 observed when the motor 2 is rotating. When a three-phase motor is driven, its voltage waveforms are as follows. Two phases energized between high side and low side are brought to high level and low level, and the remaining one phase not energized is in a high impedance state. During this period, induced voltages Vu, Vv, Vw develop in the windings 2U, 2V and shows transient voltage change between high level and low level. In FIG. 3, the induced voltages Vu, Vv, Vw are depicted as though it is linearly increased or decreased during the above period. In reality, however, the induced voltages sinusoidally change.

The intervals (between different phases) at which the zero-crossing point of induced voltage is produced for a non-energization period in each phase are a period T60 equivalent to an electrical angle of 60°. When a commutation pattern is changed, as illustrated in FIG. 3, (a) to (c), a current flows back through the flywheel diodes of the FETs 3a to 3f for an instantaneous period, and a "zero-crossing" point is produced. Therefore, the above period is reflected in the comparison signals PU to PW outputted by the comparators 6U to 6W. However, this period is disregarded by waveform processing in the drive control circuit 4 and the loss-of-synchronism monitoring circuit 7. As a result, position signals PU', PV', PW' are generated as illustrated in FIG. 3, (d) to (f).

The loss-of-synchronism monitoring circuit 7 detects the zero-crossing interval period T60 between phases based on the position signals PU', PV', PW'. Then, it checks whether or not the period T60 is equal to the time corresponding to the normal number of revolutions of the motor 2. For example, when the normal number of revolutions of the motor 2 is 10,000 rpm at a rated speed and the number of poles of the motor 2 is N, ⅙ of the rotation period per unit time is (2/N)ms. Therefore, when the zero-crossing interval period T60 becomes longer than (2/N)ms by a predetermined time, the loss-of-synchronism monitoring circuit 7 determines that the motor 2 is likely to transition to a state of loss of synchronism ("YES" at S5). Then, it outputs a drive stop signal to the drive control circuit 4.

Then, the drive control circuit 4 stops drive control on the motor 2 for the period for which the drive stop signal is being outputted. Thus, it keeps the motor 2 in a free running state (free running control, S6). The time for which the motor 2 is kept in a free running state at this time is, for example, several hundreds of μs to several ms or so. After the motor 2 is kept in a free running state only for the predetermined time, the drive control circuit 4 proceeds to S7. When the rotation of the motor 2 has not been stopped ("YES"), it continues drive control in the sensorless mode.

According to the first embodiment, the following is implemented. The loss-of-synchronism monitoring circuit 7 of the rotary machine driving apparatus 1 monitors the state of rotation of the brushless DC motor 2 to detect a sign of the motor 2 transitioning to a state of loss of synchronism. When the sign is detected, the drive control circuit 4 temporarily stops driving of the motor 2 and brings it into a free running state. Thereafter, it carries out control so as to resume driving of the motor 2. Therefore, it is possible to prevent the motor from stopping as a result of the motor having completely lost synchronism, and to continue rotational driving of the motor.

Specifically, the loss-of-synchronism monitoring circuit 7 detects the speed of the motor 2 and compares the detected speed with the normal speed of the motor 2. When the difference between them becomes equal to or higher than a predetermined value, it detects a sign of transition to a state of loss of synchronism. When the motor 2 is likely to lose synchronism, the speed of the motor 2 rapidly fluctuates. The loss-of-synchronism monitoring circuit 7 detects a period T60 equivalent to an electrical angle of 600 based on the zero-crossing time point of the induced voltage of the motor 2. Then, it compares the length of the detected period T60 with a period equivalent to an electrical angle of 60° at the normal speed. Therefore, a sign of transition to a state of loss of synchronism can be easily detected.

Second Embodiment

Figure 4:
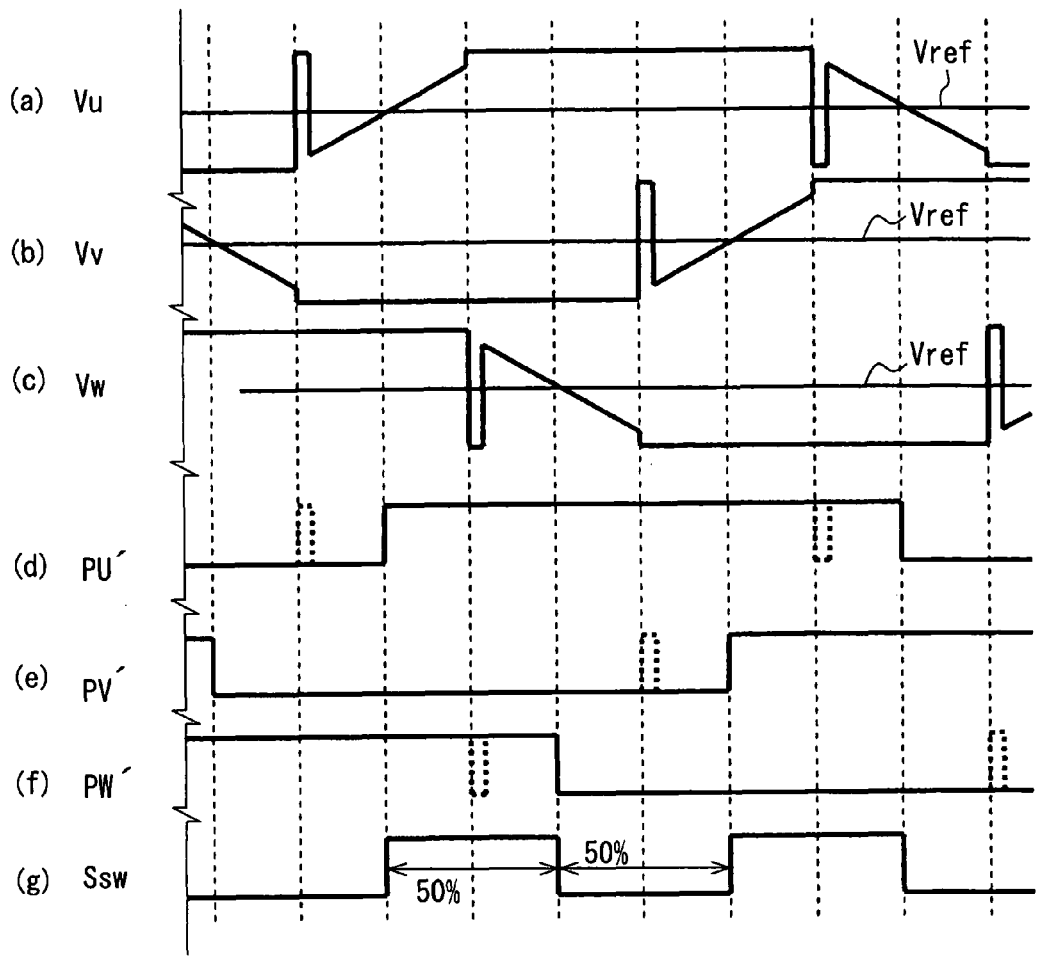
FIG. 4 is a signal diagram illustrating a second embodiment of the invention.
Figure 5:
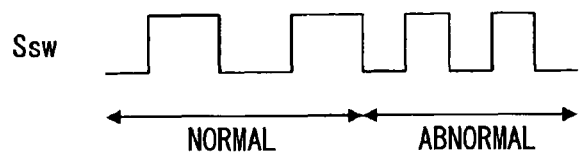
FIG. 5 is a signal diagram explaining fluctuation in a switching signal when switching is made earlier.
Figure 6:
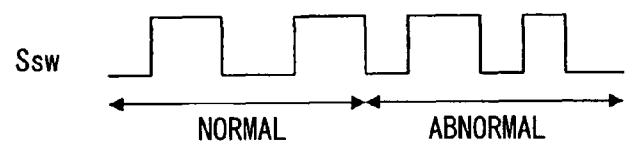
FIG. 6 is a signal diagram explaining fluctuation in a switching signal when switching is made irregularly.

In a second embodiment illustrated in FIGS. 4 to 6, a different detecting scheme is used to predict loss of synchronism, which is carried out at S4 and S5 in FIG. 2. The loss-of-synchronism monitoring circuit 7 in the second embodiment carries out logic combination therein based on the position signals PU', PV', PW' and generates a switching signal Ssw as illustrated in FIG. 4, (g).

The switching signal changes to high level during a period for which position signals PU', PV', PW' of any two phases are brought to high level. It thereby repeatedly changes to high and low levels for a period equivalent to an electrical angle of 60°. When the motor 2 is rotating at the normal speed, the output voltage of each phase of the inverter unit 3 repeats a predetermined pattern. Therefore, the switching signal Ssw is a rectangular wave signal with a duty cycle of 50%. When a pattern different from the predetermined pattern is produced, there is a high possibility of transition to loss of synchronism. Therefore, the loss-of-synchronism monitoring circuit 7 monitors the output state of the switching signal to predict loss of synchronism.

The waveform of the switching signal illustrated in FIG. 5 indicates a case where the commutation time point of the motor 2 becomes earlier than the normal speed. This is an abnormal state in which the period of the switching signal is rapidly shortened. Conversely, if the commutation time point becomes slower, the period of the switching signal is lengthened. The waveform of the switching signal illustrated in FIG. 6 indicates a case where the commutation time point of the motor 2 is not changed as expected or regularly. This is also an abnormal state in which the period of the switching signal is temporarily shortened. When any of these states are detected over a predetermined time, that is considered as a sign of the motor 2 losing synchronism, "YES" determination is made at S5.

According to the second embodiment, the loss-of-synchronism monitoring circuit 7 carries out the following processing. When a period for which a pattern of development of the output voltage of each phase of the inverter unit 3 disagrees with a predetermined pattern becomes equal to or larger than a predetermined value, it detects a sign of transition to a state of loss of synchronism. Therefore, the sign can be reliably detected.

Third Embodiment

Figure 7:
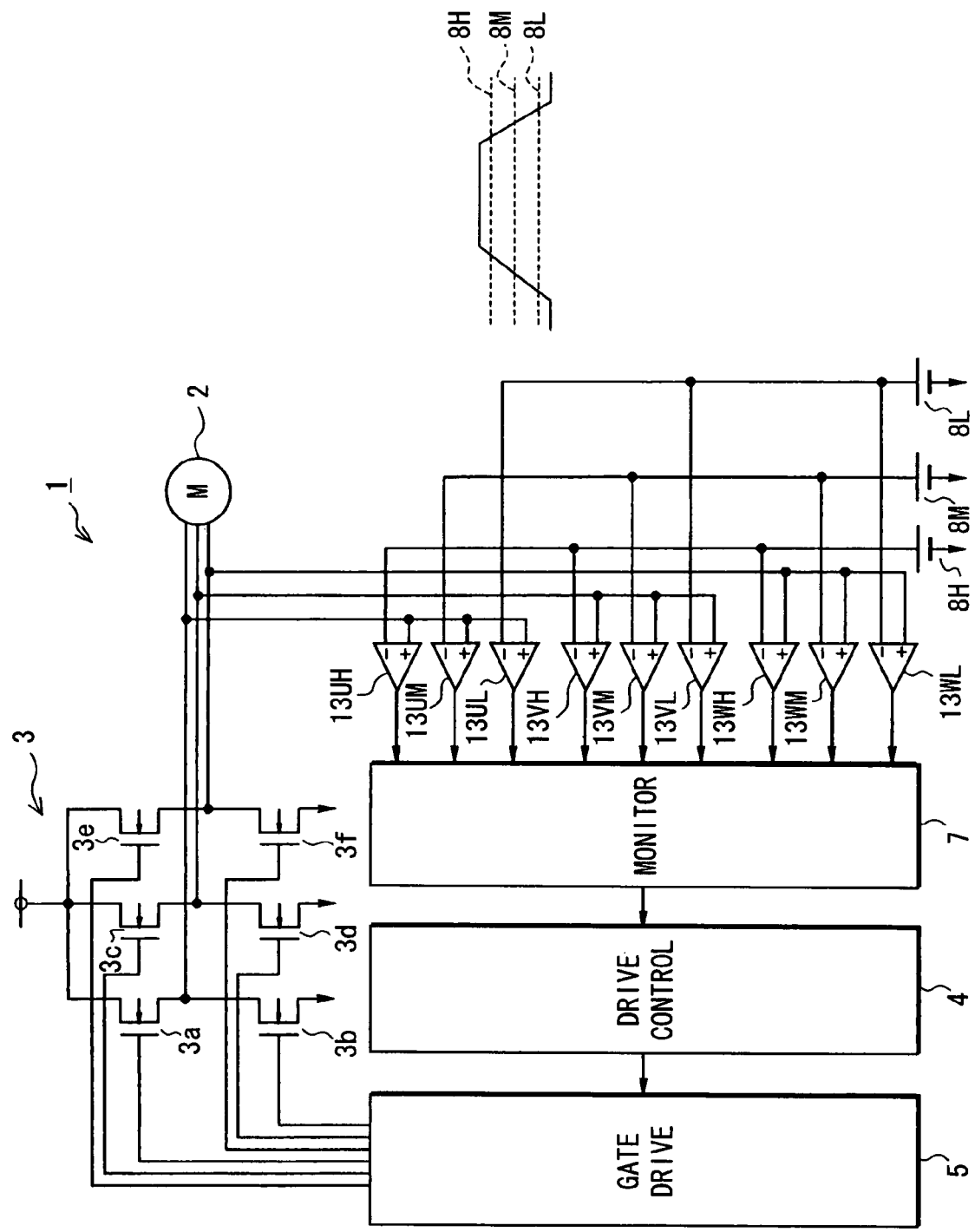
FIG. 7 is a circuit diagram illustrating a third embodiment of the invention; corresponding to FIG. 1.
Figure 8:
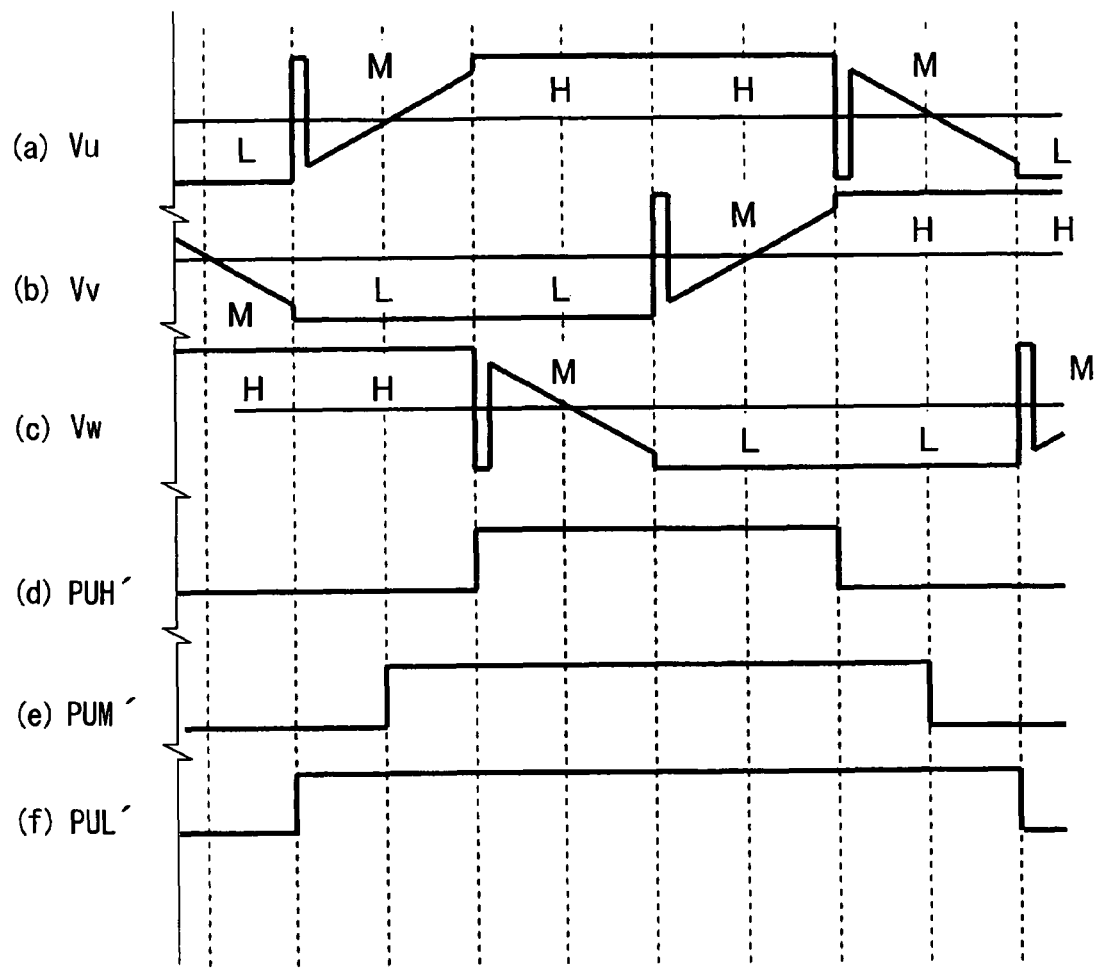
FIG. 8 is a signal diagram corresponding to FIG. 3.

In a third embodiment illustrated in FIG. 7 and FIG. 8, a loss-of-synchronism monitoring circuit (loss-of-synchronism predicting means) 7 monitors a pattern of development of induced voltage of each phase. For this purpose, three comparators 13 are provided for each phase.

Similarly with the comparators 6U, 6V, 6W in the first embodiment, comparators 13UM, 13VM, 13VM compare the output voltages of the inverter unit 3 with the virtual neutral point potential of a reference voltage source 8M. Comparators 13UH, 13VH, 13WH compare the above output voltages with the high-side threshold value of a reference voltage source 8H set higher than the potential of the reference voltage source 8M. Comparators 13UL, 13VL, 13WL compare the above output voltages with the low-side threshold value of a reference voltage source 8L set lower than the potential of the reference voltage source 8M.

Though not shown in FIG. 7, the comparison signals PU, PV, PW outputted by the comparators 13UM, 13VM, 13VM are supplied to the drive control circuit 4 as in the first embodiment. In FIG. 7, the flywheel diodes of the FETs 3a to 3f are not illustrated, and a gate drive circuit 5 (5a to 5f) is illustrated in a block form.

With respect to operation common to all the phases, reference numerals will not be suffixed with "U, V, or W" in the following description. The loss-of-synchronism monitoring circuit 7 monitors the energization pattern for each phase based on position signals PH', PM', PL' obtained from comparison signals PH, PM, PL outputted by the comparators 13H, 13M, 13L. At this time, it discriminates the energization pattern into three levels: high level SH, intermediate level (high impedance) SM, and low level SL. FIG. 8, (d), (e), (f) illustrate position signals PUH', PUM', PUL' of U-phase.

More specifically, high level SH and low level SL are respectively determined by SH=PH' and SL=/PL'. ("/" represents negation.) Intermediate level SM is determined as follows.

$SM=(/PH'\cdot PM')+(/PM'\cdot PL')$

Since intermediate level SM can be determined, the following can be implemented. When the rotation of the motor 2 is normal (in steady-state), the loss-of-synchronism monitoring circuit 7 can recognize that the energization pattern in each of the U, V, and W-phases transitions from state 1 to state 6, tabled below, every 60° of electrical angle. Here, "M" represents high impedance.

| | State | | | | | |
|---|---|---|---|---|---|---|
| | 1 | 2 | 3 | 4 | 5 | 6 |
| U | L | L | M | H | H | M |
| V | H | M | L | L | M | H |
| W | M | H | H | M | L | L |

Consequently, the loss-of-synchronism monitoring circuit 7 monitors whether or not the above cycle of from state 1 to state 6 is repeated in a correct (normal) pattern. If there is deviation from the correct pattern, it determines that there is a sign of loss of synchronism.

According to the third embodiment, the loss-of-synchronism monitoring circuit 7 carries out the following processing. In detecting a pattern of development of output voltage of each phase for the motor 2, it discriminates the output voltage into three levels: high level, low level, and non-energization level (intermediate level). Therefore, the state of rotation of the motor can be more definitely monitored.

In the third embodiment, intermediate level SM may be further divided into two levels to subdivide a pattern of output voltage.

$SMH=/PH'\cdot PM'$ $SML=/PM'\cdot PL'$

Further, the comparators 13UM, 13VM, 13VM may be removed, and determination may be carried out by $SM=/PH'\cdot PL'$.

With respect to states 1 to 6, the following measure may be taken. Only a period "M" for which high impedance is achieved is selectively detected, and it is monitored whether or not the developmental pattern for the period "M" is normally cycled.

Fourth Embodiment

Figure 9:
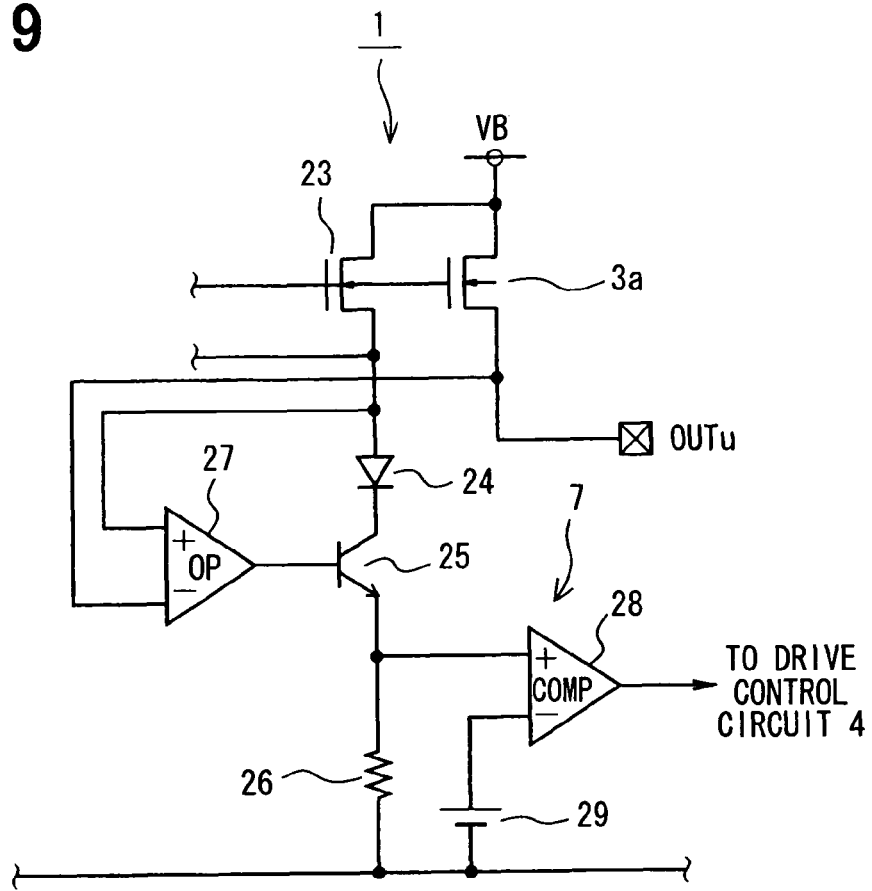
FIG. 9 is a circuit diagram illustrating a fourth embodiment of the invention partly corresponding to FIG. 1.
Figure 10:
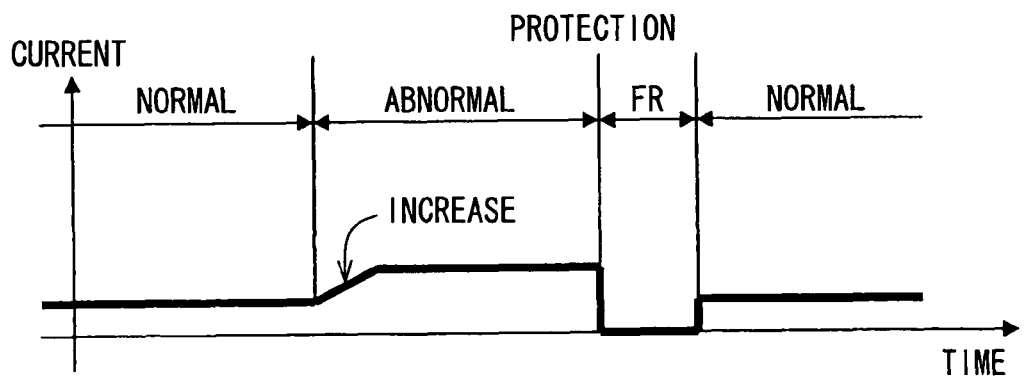
FIG. 10 is an operation diagram illustrating a state in which a current fluctuates before a motor loses synchronism.

In a fourth embodiment illustrated in FIGS. 9 and 10, a rotary machine driving apparatus 1 is so constructed that a loss-of-synchronism monitoring circuit (loss-of-synchronism predicting means) 7 detects a current supplied to a motor 2, and predicts loss of synchronism based on the state of fluctuation in the current. The drain and gate of FET 3a of the inverter unit 3 are respectively connected with the drain and gate of a current sensing N-channel power MOSFET 23. They are simultaneously turned on/off by a common gate signal. The FETs 3a, 23 are so set that, when they are turned on, the ratio of currents respectively passing therethrough is 100:1 to 5000:1 or so.

The source of the FET 23 is connected to a ground wire through a diode 24, the collector-emitter of an NPN transistor 25, and a resistor 26, and is further connected to the (+) terminal of an operational amplifier 27. The (−) terminal of the operational amplifier 27 is connected to the source of the FET 3a, and its output terminal is connected to the base of the transistor 25. The emitter of the transistor 25 is connected to the (+) terminal of a comparator 28, and the (−) terminal of the comparator 28 is connected to a voltage source 29 for supplying reference voltage for comparison. The comparator 28 is so constructed that its output signal is inputted to the drive control circuit 4.

When the FETs 3a, 23 are simultaneously turned on, drain currents corresponding to their current ratio are respectively passed through them. In this case, their source voltages become equal to each other due to the operation (imaginary shorting) of the operational amplifier 27. Even though the resistor 26 is connected to the current sensing FET 23, therefore, their current ratio is kept as specified.

The current supplied when the FET 23 is turned on flows to the resistor 26 by way of the diode 24 and the transistor 25. The terminal voltage of the resistor 26 is compared with the reference voltage of a voltage source 29 by the comparator 28. When the level of the former becomes higher, the comparator 28 changes the output signal to high level.

As illustrated in FIG. 10, a current supplied to the motor 2 fluctuates before it transitions to a state of loss of synchronism. However, the current depicted in this figure is not a current detected by the FET 23 but the total through a direct-current power supply line. When the motor 2 is rotating in a normal (steady) state, the current hardly fluctuates and is substantially constant. When some trouble occurs in the rotation of the motor 2 and its output torque largely fluctuates or on other like occasions, fluctuation in the current is also increased in conjunction therewith. Therefore, the loss-of-synchronism monitoring circuit 7 predicts loss of synchronism by detecting current fluctuation (increase) at this time.

More specifically, when the comparator 28 changes the output signal to high level, the drive control circuit 4 is triggered by this level change and brings the motor 2 into a free running state. These processing correspond to the processing of S4 to S6 in FIG. 2.

According to the fourth embodiment, the loss-of-synchronism monitoring circuit 7 detects a current supplied to the motor 2. When fluctuation in the current becomes equal to or higher than a predetermined value, it detects a sign of loss of synchronism. Therefore, loss of synchronism can be reliably predicted.

In the first to fourth embodiments, loss of synchronism may be predicted by combining loss of synchronism predicting methods in various embodiments and applying an OR condition. The embodiments are applicable not only to those for driving the drive motor of an electric vehicle. It can be widely utilized in applications in which it is difficult to stop a brushless DC motor by loss of synchronism when the motor is driven by a sensorless method.

Fifth Embodiment

Figure 11:
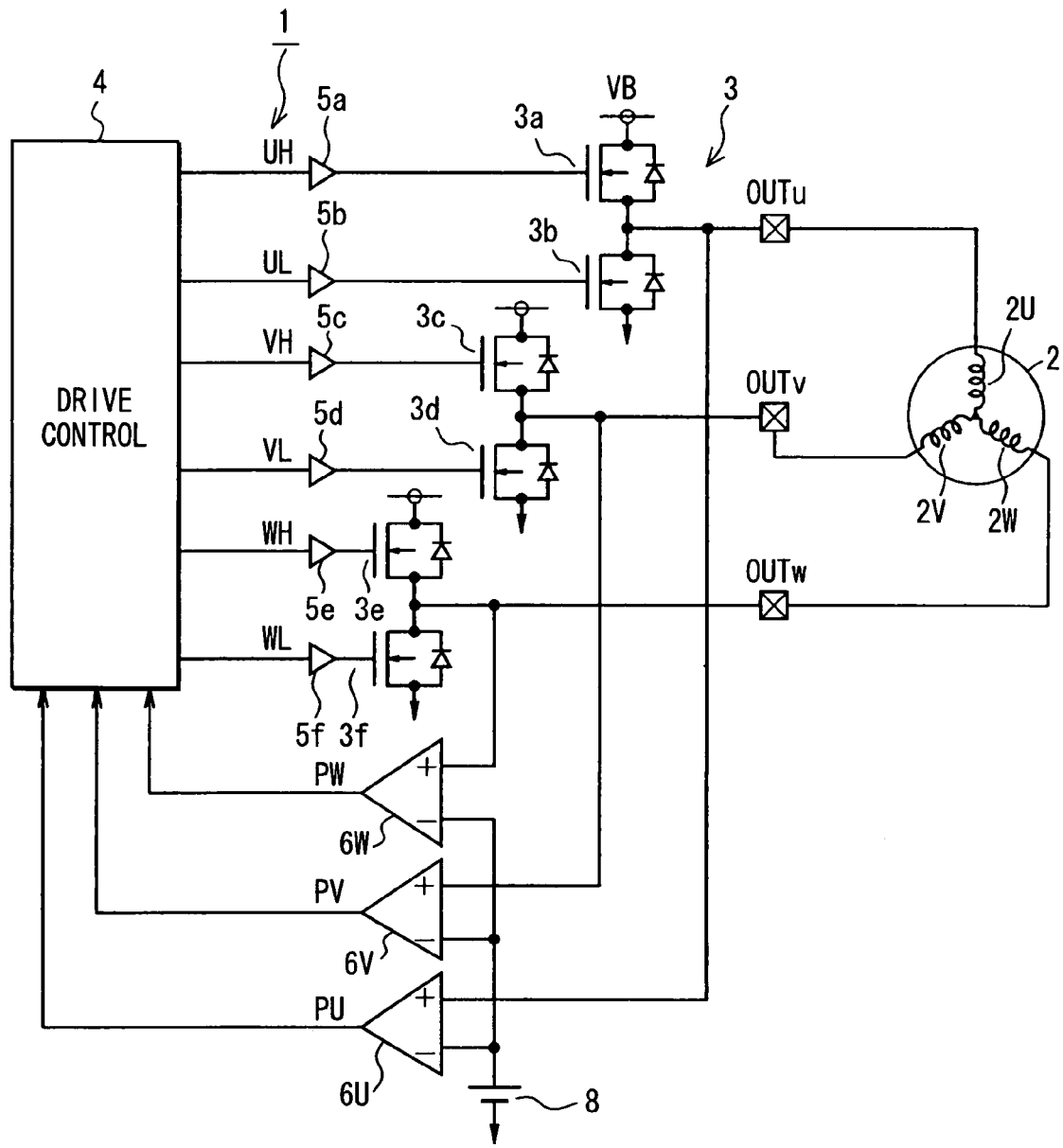
FIG. 11 is a circuit diagram illustrating a rotary machine driving apparatus in a fifth embodiment of the invention.
Figure 12:
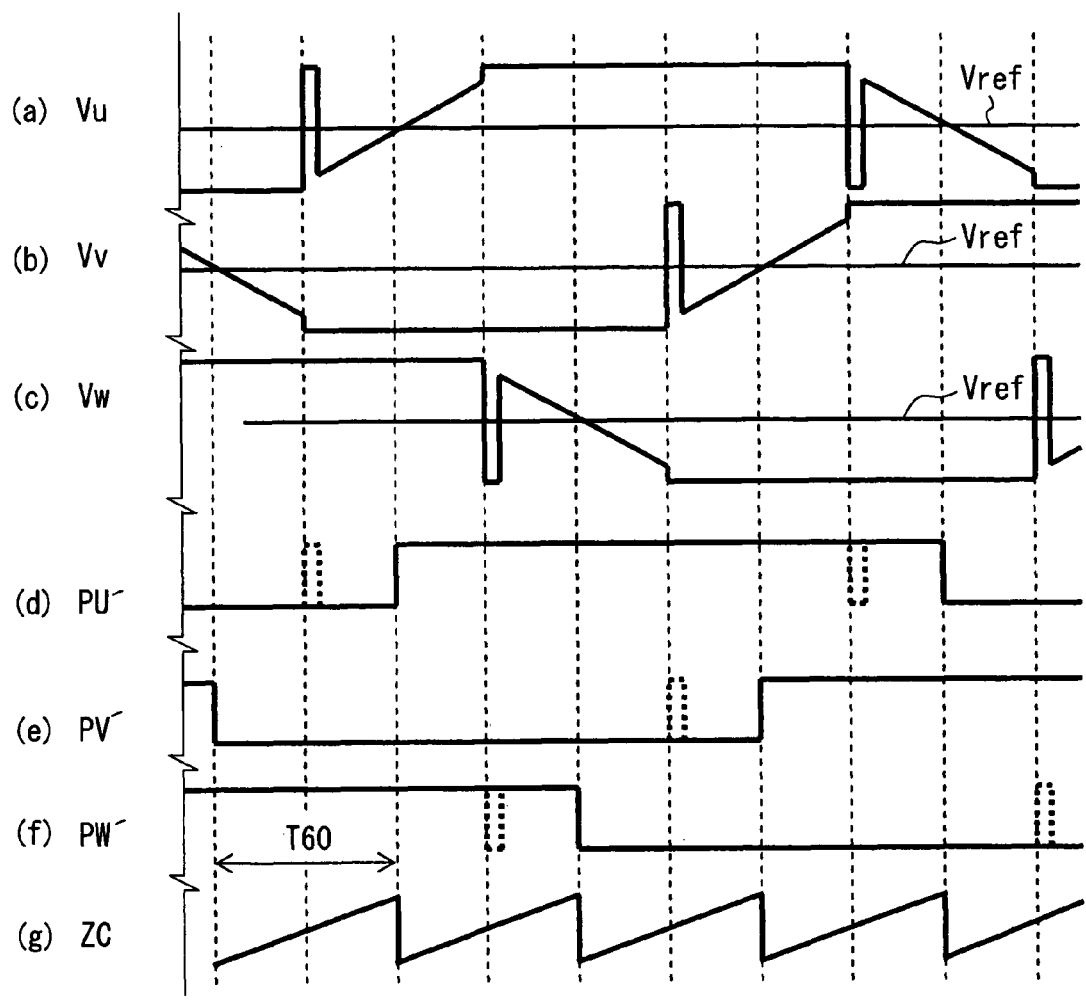
FIG. 12 is a signal diagram illustrating voltages of respective phases and position signals of a rotor observed when a motor is rotating in a normal condition.

In a fifth embodiment illustrated in FIG. 11, a rotary machine driving apparatus 1 is configured to drive a motor for driving, for example, a mini disk (MD) or a hard disk drive (HDD). This rotary machine driving apparatus 1 is similar to that of the first embodiment (FIG. 1), but has no loss-of-synchronism monitoring circuit. However, a drive control circuit 4 includes an internal counter (not illustrated) to measure an interval between the edges of the position signals PU', PV', PW' to measure a zero-cross period T60 corresponding to electrical angle of 60° as illustrated in FIG. 12, (g). The zero-cross time point of the induced voltage has a phase delay of an electrical angle of 30° from an appropriate energization time point. Therefore, the drive control circuit 4 generates a commutation pattern by compensating for the phase delay. The time interval corresponding to the electric angle of 30° may be determined as T60/2. The waveforms of the output voltage of the inverter unit 3 observed when the motor 2 is rotating are illustrated in FIG. 12. When the three-phase motor 2 is driven, its voltage waveforms are similar to that of the first embodiment (FIG. 3).

Figure 13:
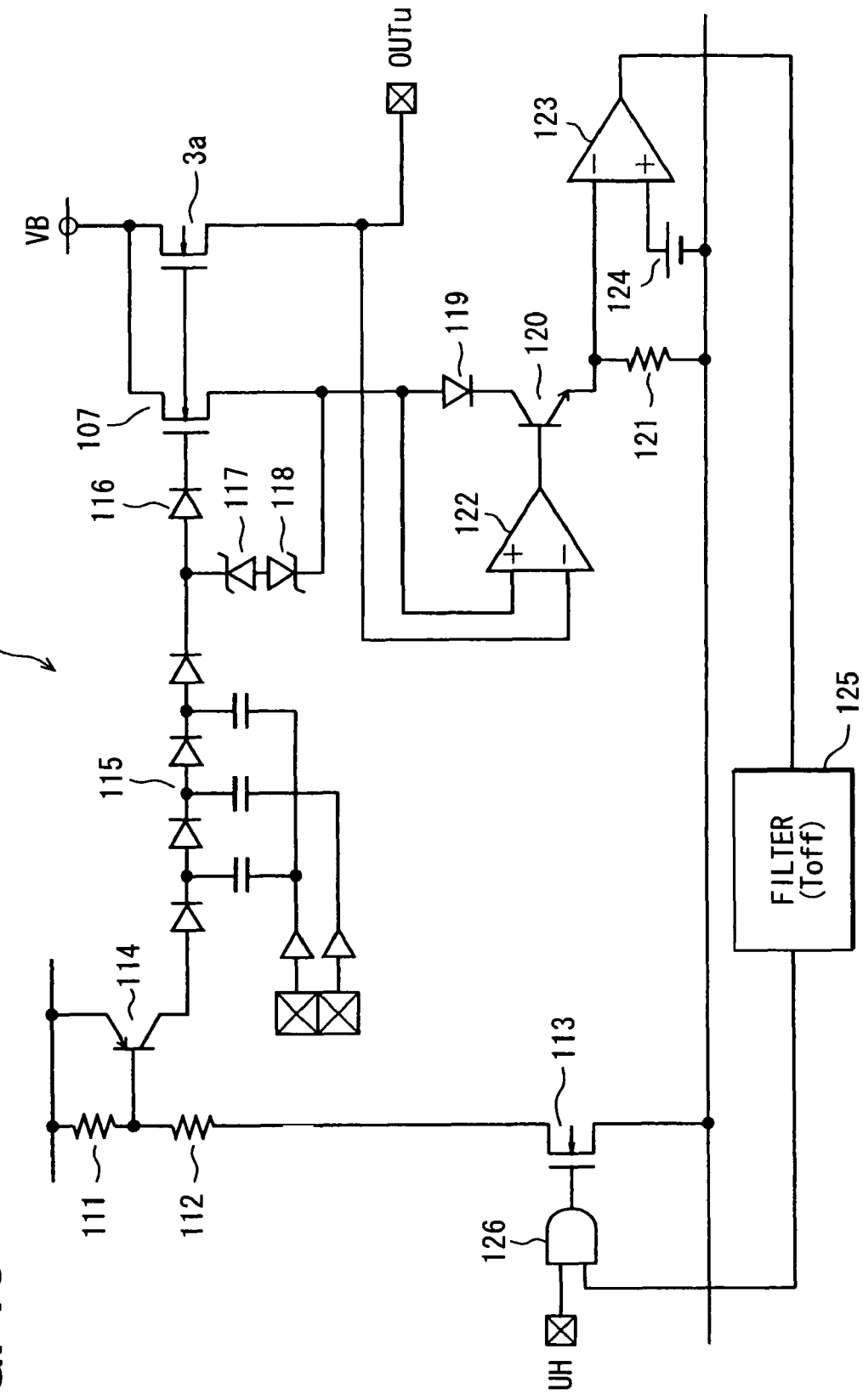
FIG. 13 is a circuit diagram illustrating a gate drive circuit.

High side gate drive circuits 5a, 5c, 5f are constructed similarly to each other. For instance, the gate drive circuit 5a is constructed as illustrated in FIG. 13. The drain and gate of the FET 3a that constructs the inverter unit 3 are respectively connected with the drain and gate of a current sensing N-channel power MOSFET 107. They are simultaneously turned on and off by a common gate signal. The FETs 3a, 107 are so set that, when they are turned on, the ratio of currents respectively passing therethrough is, for example, 100:1 to 5000:1 or so.

Between the power supply line (VB) and a ground wire, there is connected a series circuit of resistors 111 and 112 and an N-channel MOSFET 113. The common connection point of the resistors 111 and 112 is connected with the base of a PNP transistor 114, and the emitter of the transistor 114 is connected to the power supply line. The collector of the transistor 114 is connected to the gates of the FETs 107 and 3a through a booster circuit section 115 and a diode 116.

Between the anode of the diode 116 and the source of the FET 107, two Zener diodes 117 and 118 are connected in series so that they are in opposite direction to each other. The booster circuit section 115 is for carrying out a voltage boosting operation to obtain a gate voltage required to drive the high-side N-MOSFETs 3a and 107. It is constructed of a conventional charge pump circuit constructed of a combination of diodes and capacitors.

The source of the FET 107 is connected to the ground wire through a diode 119, the collector-emitter of an NPN transistor 120, and a resistor 121, and is further connected to the (+) terminal of an operational amplifier 122. The (−) terminal of the operational amplifier 122 is connected to the source of the FET 3a, and its output terminal is connected to the base of the transistor 120. The emitter of the transistor 120 is connected to the (−) terminal of a comparator 123, and the (+) terminal of the comparator 123 is connected to a voltage source 124 for supplying reference voltage for comparison. The output signal of the comparator 123 is supplied to either input terminal of an AND gate 126 through a filter 125.

The AND gate 126 is so constructed that the following is implemented. When the output signal of the comparator 23 is at high level, it outputs a gate signal UH, outputted by the drive control circuit 4, to the FETs 3a and 107. When the output signal transitions to low level, it inhibits the output of the gate signal UH. When a gate driving signal of high level is supplied to the FET 113, the FET 113 is turned on and, as a result, the transistor 114 is also turned on. Thus, a gate driving voltage relative to the source of the FET 107 is applied to the gates of the FETs 3a and 107, the FETs 3a and 107 are turned on again.

The FETs 3a and 107 are in a current mirror configuration, and their source voltages become equal to each other due to the operation (imaginary shorting) of the operational amplifier 122. Even though the resistor 121 is connected to the current sensing FET 107, therefore, their current ratio is kept as specified. When the FETs 3a and 107 are turned on, the current supplied to the FET 107 flows to the resistor 121 by way of the diode 119 and the transistor 120. The terminal voltage level of the resistor 121 is compared with the reference voltage of the voltage source 124 by the comparator 123.

Figure 14:
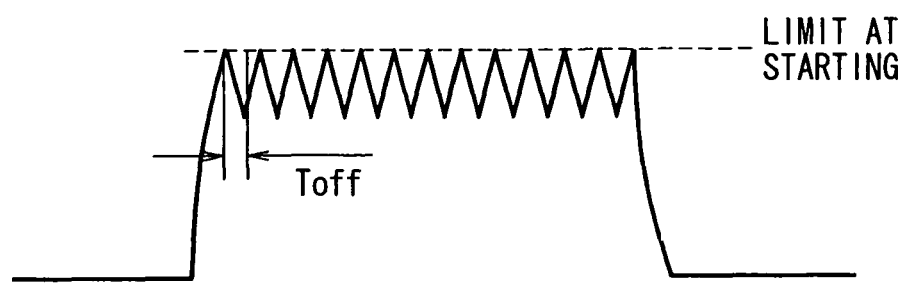
FIG. 14 is a signal diagram illustrating a waveform developed when a gate drive circuit limits a starting current.

The time constant of the filter 125 is so set that the following is implemented as illustrated later in FIG. 14. Noise with a frequency higher than the off time Toff when a driving current is interrupted by the AND gate 126 is cut.

Operation of this embodiment is described with reference to FIG. 14 to FIG. 17. The drive control circuit 4 carries out processing illustrated in FIG. 17, which is similar to that of the first embodiment (FIG. 2), when the motor 2 is started. Part of the processing includes that carried out by hardware. The drive control circuit 4 excites the windings 2U, 2V, 2W of the motor 2 by direct current to position its rotor (S1). Then, the windings 2U, 2V, 2W are energized according to a predetermined commutation pattern, and thus the motor 2 is started by forced commutation (S2).

The drive control circuit 4 is so constructed that, when forced commutation is carried out, it performs advanced energization, that is, energization at advanced or lead angle. That is, relative to the position of the rotor positioned at S1, commutation is carried out with time point that is advanced by 30° from normal appropriate commutation time point. By carrying out the advanced energization when a motor 2 is started, the torque of the motor 2 is reduced. Therefore, the effect of suppressing the occurrence of over-speed is obtained.

When the number of revolutions of the motor 2 is increased to some degree after it is started, induced voltage developed in the windings 2U, 2V, 2W can be observed. Consequently, the drive control circuit 4 changes the driving scheme for the motor 2 to sensorless mode (S3). That is, a commutation pattern signal for the inverter unit 3 is generated based on the comparison signals PU, PV, PW, and gate signals UH to WL are outputted to the gates of the individual FETs 3a to 3f. The energization phase angle in sensorless mode is advanced by 30° relative to the zero-crossing point of induced voltage.

When forced commutation is carried out at S2, the output signal of the comparator 123 varies in the gate drive circuit 5a according to the current supplied to the motor 2 detected by the FET 107. The reference voltage of the voltage source 124 is set to such a level that an excessive current supplied when the motor 2 is started is limited as illustrated in FIG. 14. In this embodiment, it is set to a voltage equivalent to a current of 2 A, for example.

Figure 15:
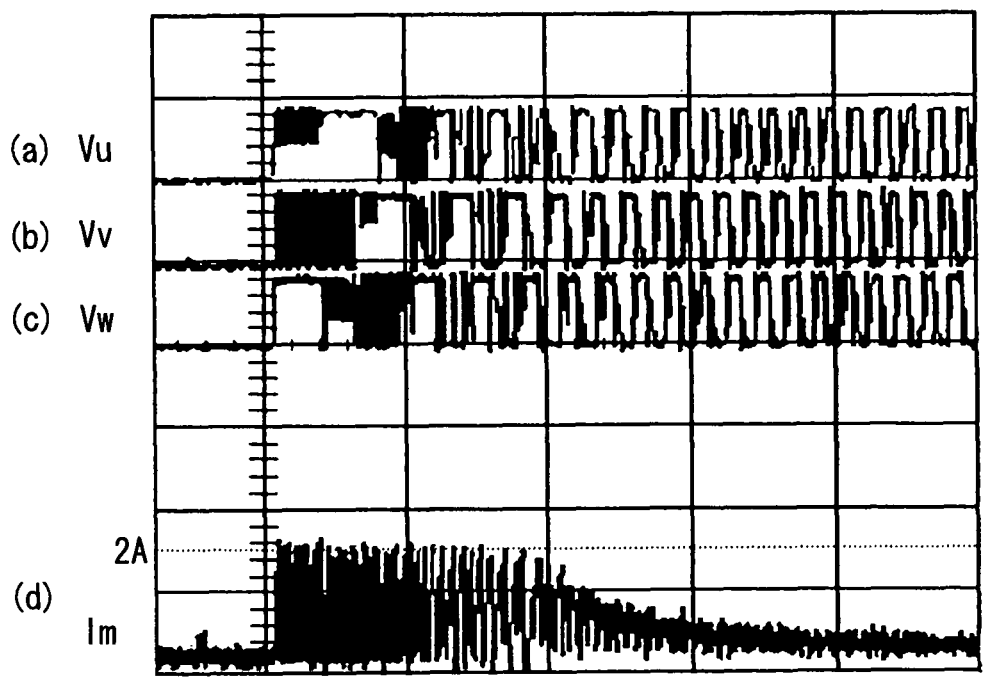
FIG. 15 is a signal diagram illustrating voltages of the respective phases and a motor current observed when a current supplied when a motor is actually started is limited to 2 A.

FIG. 15 illustrates voltages Vu to Vw of the respective phases and a motor current Im observed when a current supplied when the motor 2 is actually started is limited to 2 A. As illustrated in FIG. 15, (d), the current Im passing when the motor 2 is rotating in a normal is less than 1 A. The limit level of 2 A provides an upper limit set with respect to a current at too large a level passing only at the time of starting.

When the motor current Im exceeds the limit level, the output current of the comparator 123 changes to low level, and the AND gate 126 prevents the output of the gate signal UH. Thus, the high-side FETs 3a, 3c, 3e of the inverter unit 3 are turned off, and energization of the motor 2 is stopped. As a result, the detected current value lowers, and the output current of the comparator 123 returns to high level. In conjunction therewith, the AND gate 126 resumes the output of the gate signal UH and the motor 2 is energized.

Change in the detected current is provided with a predetermined gradient by the inductance of the windings 2U to 2W of the motor 2. As illustrated in FIG. 14, the detected current at the time of start varies like a saw-tooth wave in proximity to the limit level and the current is limited.

Figure 16:
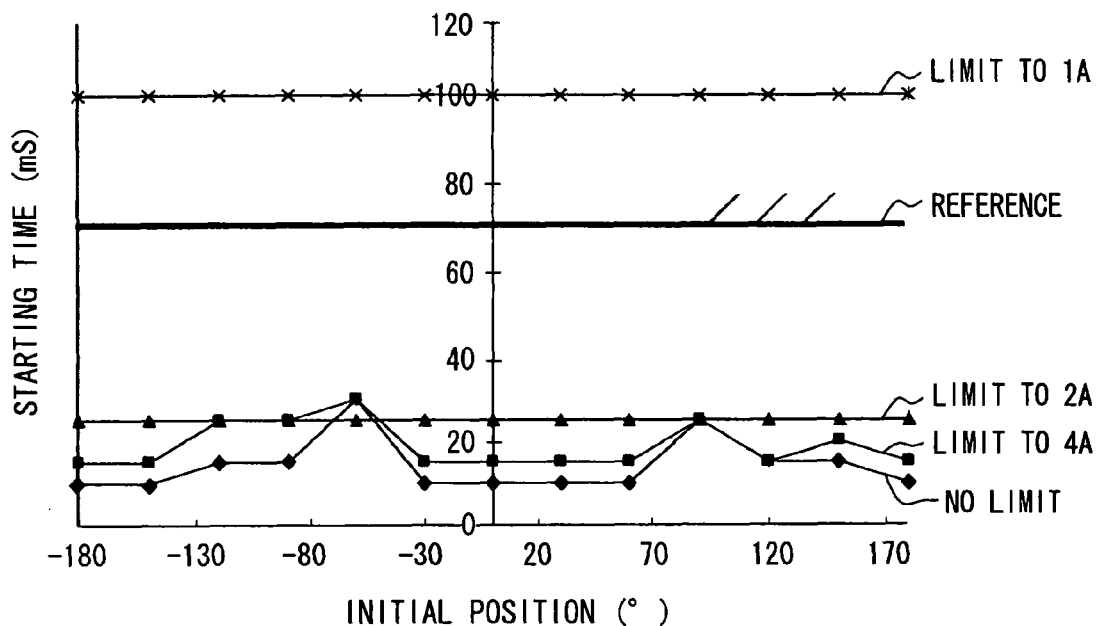
FIG. 16 is an explanatory diagram illustrating change in starting time observed when a current is not limited and limited to various limit levels when a motor is started.
Figure 17:
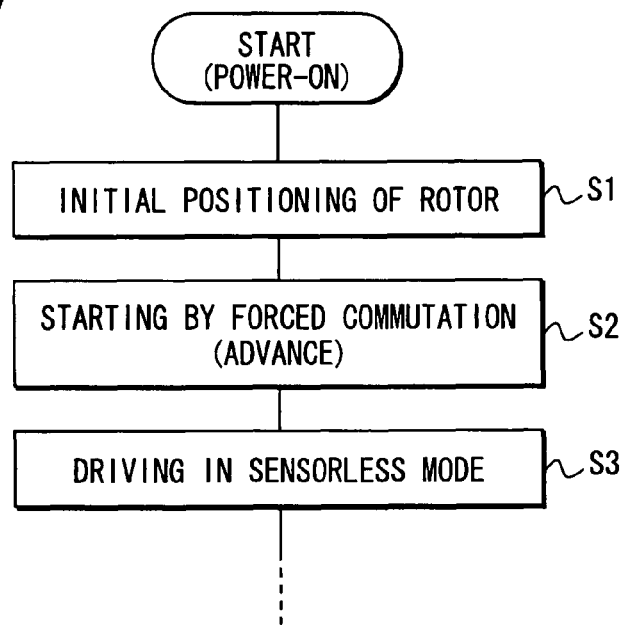
FIG. 17 is a flowchart illustrating a part of processing carried out by the drive control circuit when the motor is started.

FIG. 16 illustrates change in starting time (ms) observed in a case where a current is not limited when the motor 2 is started and in the cases where a current is limited to the limit levels of 1 A, 2 A, and 4 A. The "starting time" cited here is defined as a time until the rotation of the motor 2 reaches 90% of its normal number of revolutions (e.g., 10,000 rpm). The horizontal axis represents the initial position (deg) of the rotor.

When this initial position changes, the starting time may also vary. When the limit level is set to 1 A, this limit level is too low, and required starting torque cannot be obtained. The starting time is 100 ms over the entire range of initial position, and this is much greater than, for example, 70 ms, which is a standard value required from products. In the case of "No limit" and in the cases where the current is limited to 2 A and 4 A, the starting time is significantly lower than the above required standard over the entire range of initial position.

The three cases where the starting time is shorter than the required standard will be evaluated. In the case of the limit level of 2 A, the starting time is 25 ms over the entire range of initial position. In the cases of "No limit" and the limit level of 4 A, the starting time may be shorter than in the case of the limit level of 2 A depending on the initial position. However, the worst values (30 ms) in both cases are larger than in the case of the limit level of 2 A. Therefore, the case of the limit level of 2 A is considered to be most favorable for products.

In some other examples of measurement, the starting time is longer in the case of "No limit" where a current largely fluctuates and in the case of the limit level of 4 A than in the case of the limit level of 2 A.

According to this embodiment, the following is implemented when the rotary machine driving apparatus 1 starts the brushless DC motor 2 by forced commutation. The gate drive circuits 5 limit the current supplied to the windings 2U to 2W of the motor 2 to an upper limit level set higher than a level at which a current is supplied when the motor 2 is in a normal or stable rotating state. Therefore, it is possible to suppress over-speed to shorten a starting time without preventing the stable rotation of the motor.

When the drive control circuit 4 carries out forced commutation after positioning the rotor, it carries out control so that the energization phase angle for the windings 2U to 2W is advanced by a predetermined amount. Therefore, a starting time can be further shortened.

The fifth embodiment can be modified in many ways. For instance, the limit levels for starting currents and the normal number of revolutions may be appropriately modified according to the rating of a motor used or the like. Advanced energization in forced commutation may be carried out as required. The rotary machine driving apparatus is applicable not only to those for driving the motor of a mini disk (MD) or a hard disk drive (HDD). It can be widely utilized in applications in which it is difficult to stop the rotation of the motor by loss of synchronism, when the brushless DC motor is driven by the sensorless method.

Sixth Embodiment

Figure 18:
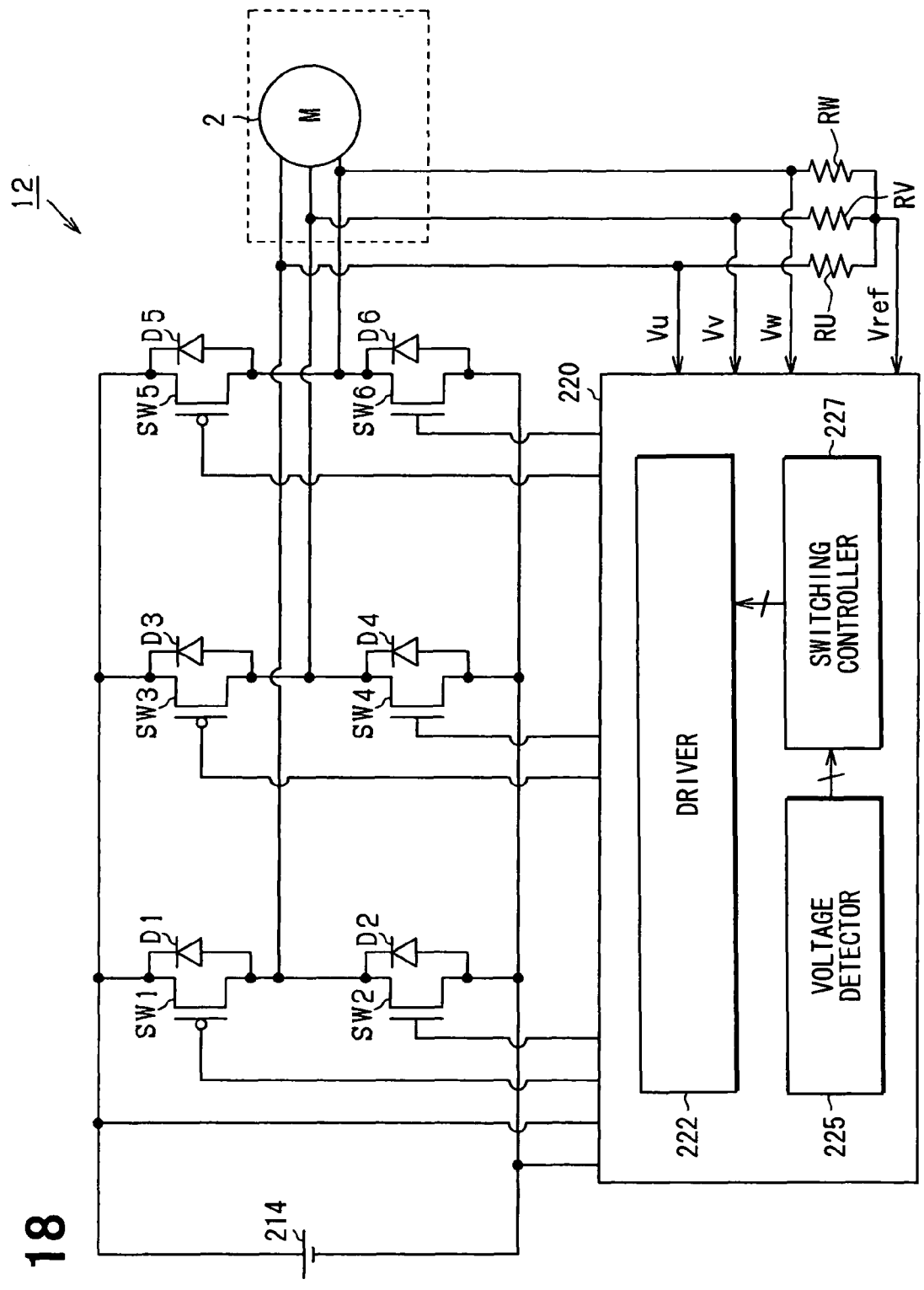
FIG. 18 is a circuit diagram illustrating a rotary machine driving apparatus for a brushless motor in a sixth embodiment.

In a sixth embodiment illustrated in FIG. 18, a rotary machine driving apparatus is provided for a brushless DC motor 2, which may be provided in a vehicle as a rotary machine.

The motor 2 is a three-phase motor and an actuator of a fuel pump for an internal combustion engine mounted in a motorcycle. The three phases (U-phase, V-phase, W-phase) of the brushless motor 2 are connected with an inverter 12. The inverter 12 is a three-phase inverter and applies the voltage of a battery 214 to the three phases of the brushless motor 2. To provide conduction between each of the three phases and the positive pole and negative pole of the battery 214, the inverter 12 is so constructed that it includes a parallel connection unit having: switching elements SW1, SW2 (U-phase arm), switching elements SW3, SW4 (V-phase arm), and switching elements SW5, SW6 (W-phase arm). The junction point between the switching element SW1 and the switching element SW2 connected in series is connected with the U-phase of the brushless motor 2. The junction point between the switching element SW3 and the switching element SW4 connected in series is connected with the V-phase of the brushless motor 2. The junction point between the switching element SW5 and the switching element SW6 connected in series is connected with the W-phase of the brushless motor 2. These switching elements SW1 to SW6 are respectively connected in parallel with flywheel diodes D1 to D6.

The high side switching element SW1, SW3, SW5 of each arm is constructed of a P-channel MOS transistor, and the low side switching element SW2, SW4, SW6 of each arm is constructed of an N-channel MOS transistor. The flywheel diodes D1 to D6 are constructed of parasitic diodes of the MOS transistors.

A drive control circuit 220 operates the inverter 12 and thereby controls the output of the brushless motor 2. Specifically, the drive control circuit 220 includes a driver 222, a voltage detector 228, and a switching controller 227. The voltage detector 228 detects the voltage VB of the battery 214.

The switching controller 227 turns on and off the switching elements SW1 to SW6 through the driver 222. In this example, it basically carries out switching control by a 120°-energization method. More specifically, utilizing the time point with which the terminal voltages Vu, Vv, Vw of the respective phases of the brushless motor 2 become equal to the induced voltage, the switching controller 227 detects the following. It detects a time (zero-crossing time) when the induced voltage becomes equal to the virtual neutral point voltage (reference voltage Vref) of the brushless motor 2. Then, it changes the operation of the switching elements SW1 to SW6 with time point (specified time point) delayed from zero-crossing time point by a predetermined electrical angle, e.g., 30 degrees (°). However, when a current (amount of energization) passed to the brushless motor 2 is limited, the period for which the switching elements SW1 to SW6 are turned on is not set to a 120°-period. Instead, PWM control is carried out in this period.

The switching controller 227 may be constructed of a logic circuit or may be constructed of a central processing unit and a storage unit for storing a program.

FIG. 2 illustrates the way switching control is carried out under normal conditions. Specifically, (a) illustrates the transition of the terminal voltages Vu, Vv, Vw of the motor 2; (b) illustrates the transition of comparison signals Uc, Vc, Wc; (c) illustrates the transition of zero-crossing detection signals; (d) illustrates the transition of the values on various counters; and (e) illustrates the transition of actuating signals for the switching elements SW1 to SW6. The actuating signals illustrated in (e) include actuating signals U+, V+, W+ for the high side switching elements SW1, SW3, SW5 of the respective arms and actuating signals U−, VW− for the low side switching elements SW2, SW4, SW6. In this example, the high side switching elements SW1, SW3, SW5 of the respective arms are P-channel transistors; therefore, the periods for which these actuating signals U+, V+, W+ are at logical L are the periods for which they are on.

Upward solid lines in (d) indicate the value Cm of the zero-crossing measuring counter for measuring a time interval between adjacent zero-crossing times. As illustrated in the figure, the counter is initialized each time the zero-crossing time occurs, and newly starts time counting operation. A time interval between adjacent or successive zero-crossing times has correlation with rotational speed. For this reason, the value of the counter immediately before it is initialized (the maximum value of the counter) provides a parameter having correlation with rotational speed.

Downward solid lines in (d) indicate the value Cs of a specified time point setting counter that counts a time required until zero-crossing time point becomes equal to specified time point and thereby sets a specified time point. The specified time point setting counter takes the value of the counter before initialization as its initial value at the zero-crossing time and decrements it. Then, it sets the time point with which the value is zeroed as a specified time point. At this time, the following operation is performed.

When the time interval between zero-crossing time point and specified time point is 30°, for example, the decrement speed is set to twice the increment speed of the measuring counter. In consideration of that the time interval between adjacent zero-crossing times is 60°, it can be thought that this setting makes it possible to make the time point with which the value Cs of the specified time point setting counter becomes 0 delayed by 30° from the zero-crossing time point.

The two-dot chain lines in (d) indicate the value Cp of a permission start counter. The permission start counter determines the time of the beginning of a period (permitted period) for which detection of the zero-crossing time based on the comparison of the terminal voltages Vu, Vv, Vw and the reference voltage Vref is permitted. The permitted period is provided to avoid the following event and for other like purposes. In a period for which a current is supplied through the diodes D1 to D6, the terminal voltages Vu, Vv, Vw become equal to the reference voltage Vref and thus this occasion is erroneously determined to be the zero-crossing time. This counter also takes the value of the counter before initialization as its initial value at the zero-crossing time and decrements it. Then, it sets the time point with which the value is zeroed as the time of the beginning of a permitted period. When the time of the beginning of a permitted period is set to a time at 45° from the zero-crossing time, for example, the decrement speed can be set to 3/2 times the increment speed of the measuring counter.

The one-dot chain lines in (d) indicate the value Cps of a permitted period setting counter for determining the above permitted period. When the value of the permission start counter is zeroed, the permitted period setting counter takes the value of the measuring counter before the previous initialization as its initial value and decrements it. It sets the period until the value is zeroed as the permitted period. When the permitted period is a period of 30°, for example, the decrement speed can be set to twice the increment speed of the measuring counter.

In the period for which the value of the permitted period setting counter is not less than zero, the comparison signals Uc, Vc, Wc are made valid. When the comparison signals Uc, Vc, Wc are inverted in this period, the zero-crossing detection signals of the corresponding phases are inverted. At the zero-crossing time when the zero-crossing detection signal is inverted, the decrement of the specified time point setting counter is started. When its value is zeroed, the operation of the switching elements SW1 to SW6 is changed.

Figure 20:
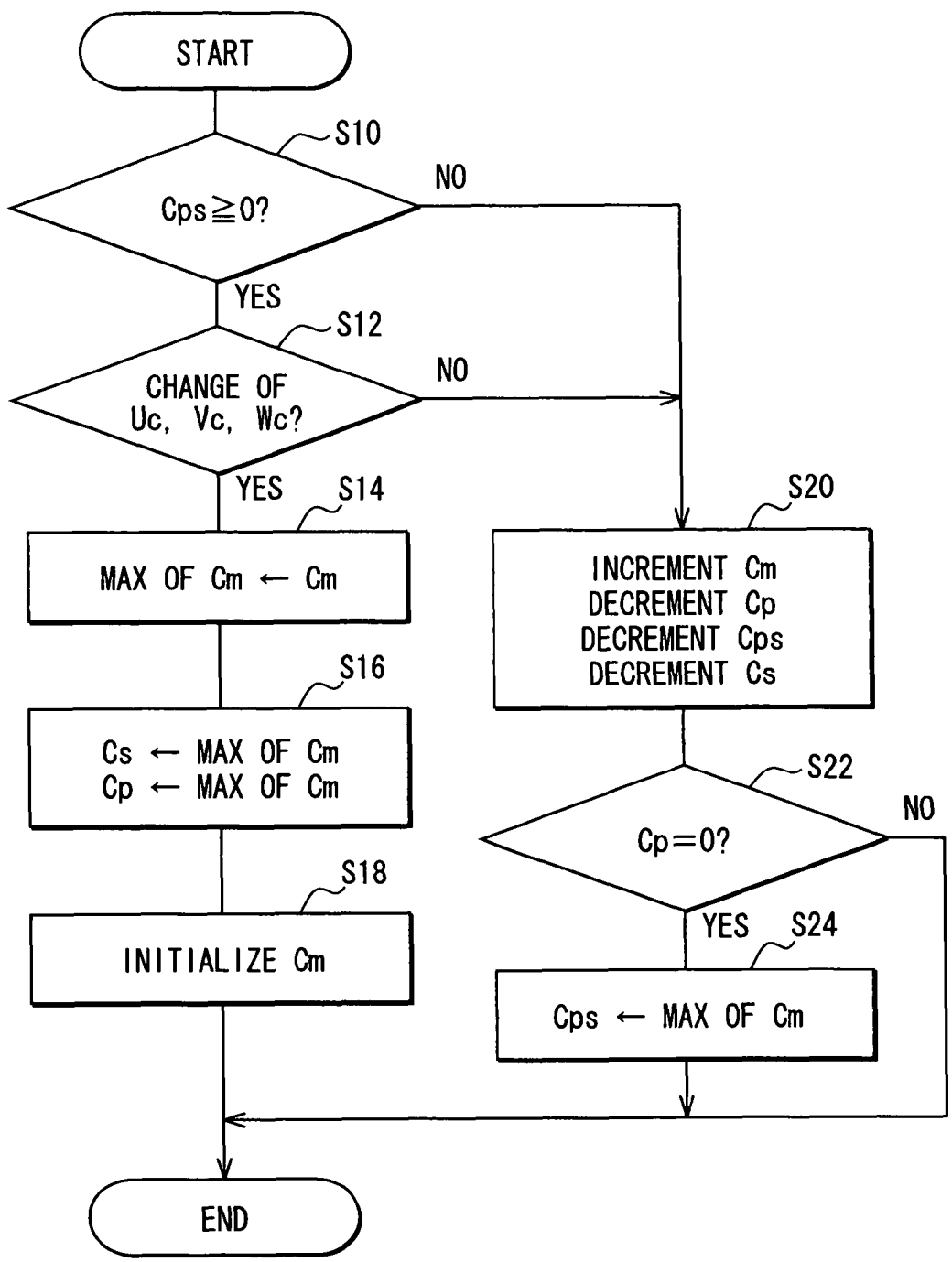
FIG. 20 is a flowchart illustrating processing for setting counters for 120°-energization control.

The switching control processing in this embodiment is described next with reference to FIG. 20 and FIG. 21. The processing of FIG. 21 for setting the counter values on the above four counters of is repeatedly carried out by the drive control circuit 220, for example, in a predetermined cycle.

This series of processing is carried out as follows. At S10, it is checked whether or not the value Cps of the permitted period setting counter is equal to or higher than zero. When it is determined that the value is not less than zero, it is checked at S12 whether or not any of the comparison signals Uc, Vc, Wc has been changed or inverted. This processing is for detecting the zero-crossing time. When it is determined at S12 that any of the comparison signals has been changed, the current value Cm of the measuring counter is taken as the maximum value of the counter at S14. At S16, subsequently, the maximum value of the counter is taken as the values Cs and Cps of the specified time point setting counter and the permitted period setting counter. At S18, the measuring counter is initialized (Cm=0).

When a negative determination is made at S10 or S12, the measuring counter (Cm) is incremented at S20. At the same time, the permission start counter (Cp), permitted period setting counter (Cps), and specified time point setting counter (Cs) are decremented. At S22, subsequently, it is checked whether or not the value Cp of the permission start counter is zero. This processing is for checking whether or not it is the time of the beginning of a permitted period. When it is determined that the value Cp of the permission start counter is zero, the maximum value Cm of the counter is taken as the value Cps of the permitted period setting counter at S24. Hereafter, detection of the zero-crossing time based on the comparison signals Uc, Vc, Wc is permitted until the value Cps of the permitted period setting counter is zeroed.

When a negative determination is made at S22 or when the processing of S18 or S24 is completed, this series of processing is once terminated.

Figure 21:
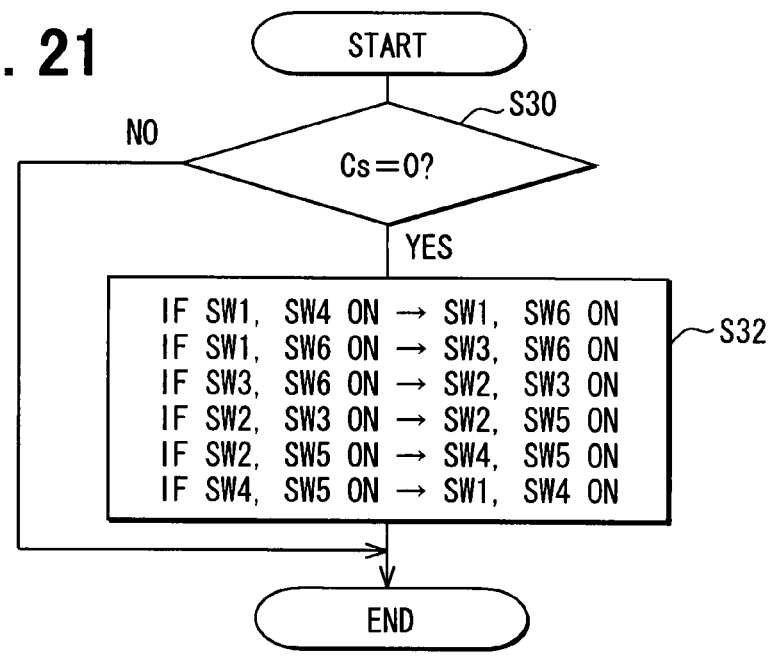
FIG. 21 is a flowchart illustrating a mode for operating switching elements.

Changing the state of the switching elements SW1 to SW6 to ON is carried out by the processing illustrated in FIG. 21. This processing is repeatedly carried out by the drive control circuit 220, for example, in a predetermined cycle.

At S30, it is checked whether or not the value Cs of the specified time point setting counter is zero. This processing is for determining whether or not the specified time point has occurred. When it is determined that the value Cs of the specified time point setting counter has been zeroed, the operating state of the switching elements SW1 to SW6 is changed at S32. In this example, the operating state is changed as follows. When the switching elements SW1, SW4 are ON before change, the operating state is so changed that the switching elements SW1, SW6 are brought into ON. When the switching elements SW1, SW6 are ON before change, the operating state is so changed that the switching elements SW3, SW6 are brought into ON. When the switching elements SW3, SW6 are ON before change, the operating state is so changed that the switching elements SW2, SW3 are brought into ON. When the switching elements SW2, SW3 are ON before change, the operating state is so changed that the switching elements SW2, SW5 are brought into ON. When the switching elements SW2, SW5 are ON before change, the operating state is so changed that the switching elements SW4, SW5 are brought into ON. When switching elements SW4, SW5 are ON before change, the operating state is so changed that the switching elements SW1, SW4 are brought into ON.

In this embodiment, switching control by a 120°-energization method is carried out by brining the time point with which the switching elements SW1 to SW6 are changed into one-to-one correspondence with zero-crossing time point.

In a vehicle, the voltage of the battery 214 is prone to fluctuate. When the voltage of the battery 214 fluctuates, the rotational speed of the brushless motor 2 changes. At this time, the time interval between adjacent zero-crossing times (the maximum value of the counter) cannot accurately represent the rotational speed in proximity to the present zero-crossing time. Therefore, a permitted period cannot be set in a desired electrical angle range depending on the above time interval. For this reason, when the brushless motor 2 is accelerated, for example, there is a possibility that the zero-crossing time occurs in advance of the permitted period. When the brushless motor 2 is decelerated, for example, there is a possibility that the zero-crossing time occurs behind the permitted period.

In this embodiment, to cope with this, the setting of a permitted period is corrected in correspondence with change in the rotational speed of the brushless motor 2. In consideration of that rotational speed is changed by change in the voltage VB of the battery 214, specifically, the setting of a permitted period is corrected in correspondence with change in the voltage of the battery 214.

Figure 22:
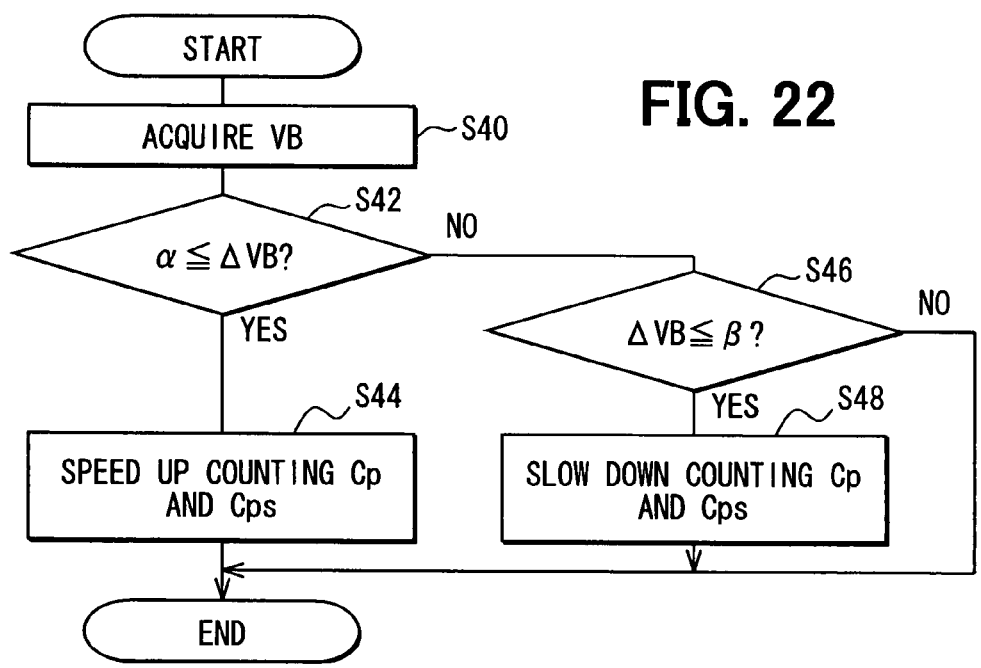
FIG. 22 is a flowchart illustrating processing for correcting a count speed of counters.

This correction to the setting of a permitted period is carried out as illustrated in FIG. 22. This processing is repeatedly carried out by the drive control circuit 220, for example, in a predetermined cycle.

Figure 23:
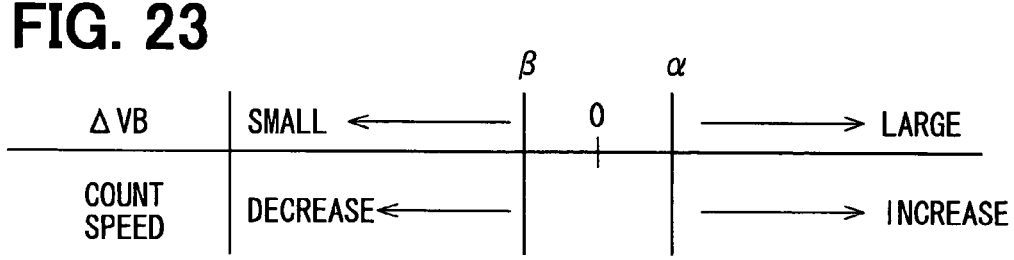
FIG. 23 is a characteristic diagram illustrating a relation between a voltage variation and a count speed correction coefficient.

At S40, the voltage VB of the battery 214 is acquired. At S42, subsequently, it is checked whether or not a variation $\Delta VB$ in the voltage VB of the battery 214 is equal to or higher than a first threshold value $\alpha$. This processing is for determining whether or not the present situation is a possible situation in which the following takes place. As a result of the brushless motor 2 being accelerated, the zero-crossing time occurs ahead of the permitted period determined by the rotational speed. This threshold value $\alpha$ is set based on the minimum value at which the above situation occurs. When it is determined that the variation $\Delta VB$ is equal to or higher than the threshold value $\alpha$, the count speed of the permission start counter and the permitted period setting counter is increased at S44. As illustrated in FIG. 23, specifically, the count speed is increased with increase in the variation $\Delta VB$. In this example, the following measure can be taken. A correction coefficient is predetermined for each discrete value of variation $\Delta VB$, and the count speed is changed stepwise. Instead, the count speed may be continuously changed according to the variation $\Delta VB$. This processing is for implementing the following in a situation in which the rotational speed of the brushless motor 2 is increased. A permitted period is set in substantially the same electrical angle range as when the rotational speed is constant.

When the variation $\Delta VB$ is less than the threshold value $\alpha$, it is determined at S46 whether or not the variation $\Delta VB$ is equal to or lower than a second threshold value $\beta$. This processing is for determining whether or not the present situation is a possible situation in which the following takes place. As a result of the brushless motor 2 being decelerated, the zero-crossing time occurs behind a permitted period determined by the rotational speed. This threshold value $\beta$ is set based on the maximum value at which the above situation occurs. When it is determined that the variation $\Delta VB$ is equal to or lower than the threshold value $\beta$, the count speed of the permission start counter and the permitted period setting counter is decreased at S48. As illustrated in FIG. 23, specifically, the count speed is decreased with decrease in the variation $\Delta VB$. The count speed is decreased when the variation takes a negative value and with increase in its absolute value. This processing is for implementing the following in a situation in which the rotational speed of the brushless motor 2 is reduced. A permitted period is set in substantially the same electrical angle range as when the rotational speed is constant.

When it is determined at S46 that the variation $\Delta VB$ is larger than the threshold value $\beta$ or when the processing of S44 or S48 is completed, this series of processing is once terminated. According to the above processing, the zero-crossing time can be appropriately detected even when the rotational speed of the brushless motor 2 is changed by variation in the voltage VB of the battery 214.

There are cases where the rotational speed of the brushless motor 2 based on a detected value of zero-crossing time point becomes excessively high or low. This leads to a state in which it is difficult to appropriately control the rotating state of the brushless motor 2 (loss of synchronism state). In this state, it is desirable to restart the brushless motor 2. Before this state occurs, the rotational speed of the brushless motor 2 is continuously increased or reduced. For this reason, a phenomenon that the zero-crossing time deviates from a permitted period tends to consecutively occur more than once. In this embodiment, consequently, the following processing is carried out when the number of times when the zero-crossing time continuously occurs either ahead of or behind a permitted period becomes equal to or higher than a threshold value. The rotating state of the brushless motor 2 is determined to be abnormal, and processing is carried out to restart the brushless motor 2.

Figure 24:
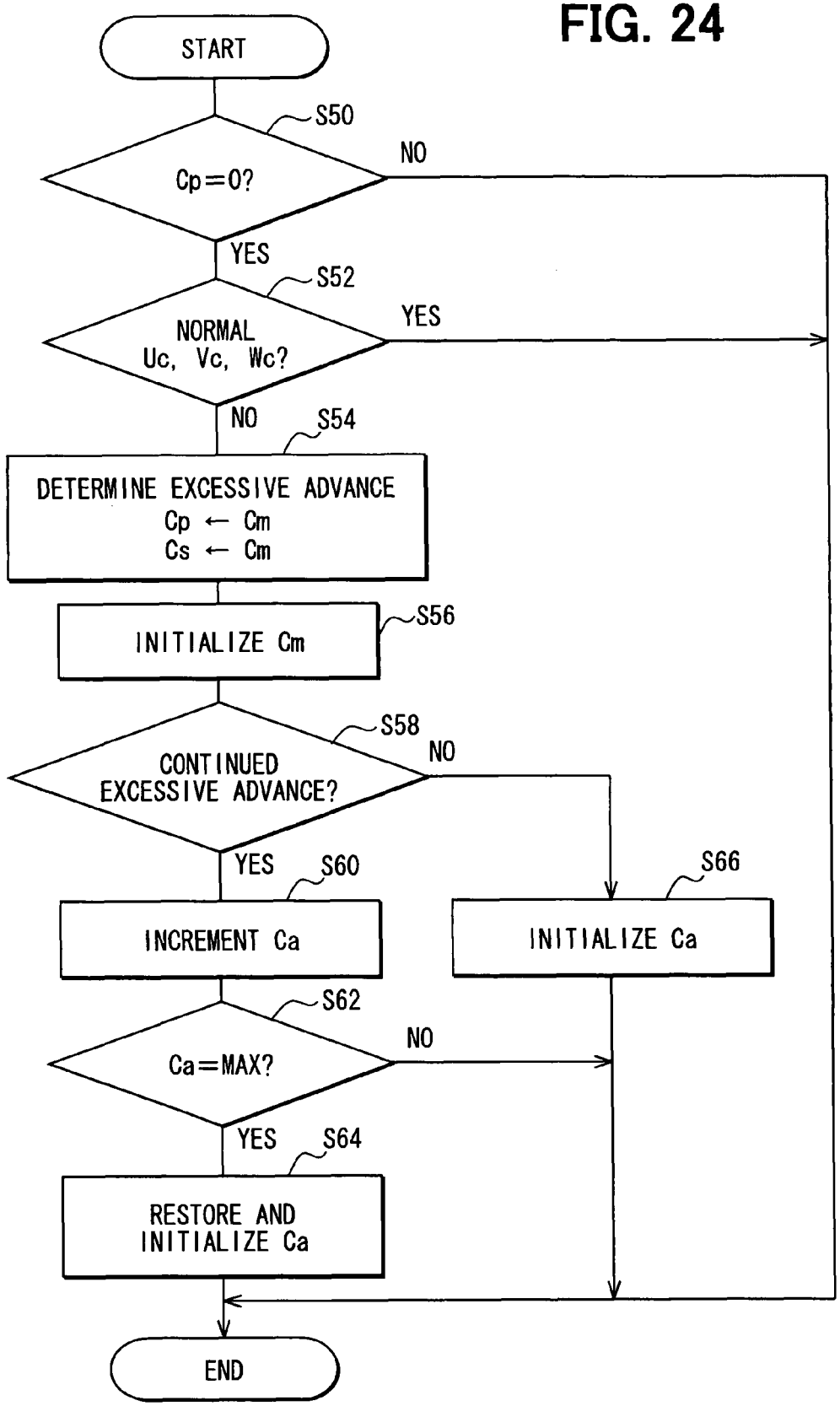
FIG. 24 is a flowchart illustrating processing for determination of a loss of synchronism state.

Hereafter, this processing will be described with reference to FIG. 24 and FIG. 25. FIG. 24 illustrates the processing for coping with an abnormality that the zero-crossing time occurs ahead of the permitted period. This processing is repeatedly carried out by the drive control circuit 220, for example, in a predetermined cycle.

In this processing, at S50, it is checked whether or not the value Cp of the permission start counter is zero. This processing is for determining whether or not it is the time of the beginning of the permitted period. When it is determined that the value Cp of the permission start counter is zero, it is determined at S52 whether or not the logical value of the corresponding comparison signal Uc, Vc, Wc is normal. This processing is for determining whether or not the zero-crossing time has occurred ahead of the permitted period.

Figure 19:
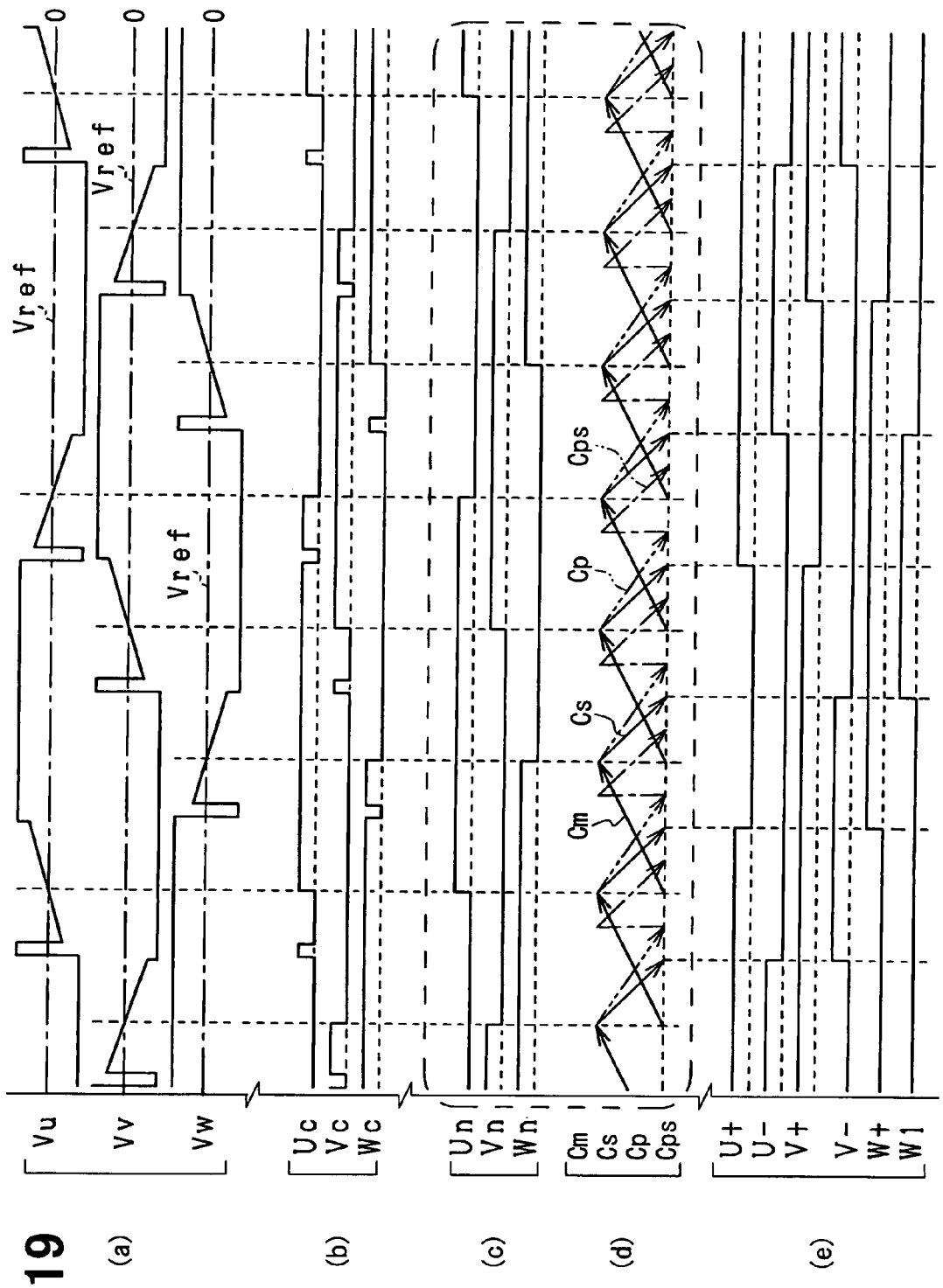
FIG. 19 is a signal diagram illustrating a mode for carrying out 120°-energization control.

As illustrated in FIG. 19, the zero-crossing time occurs every 60°. Whether the induced voltage of any phase crosses the reference voltage Vref in its rising process or falling process has 360°-periodicity. For this reason, in which phase the present zero-crossing time occurs and whether the induced voltage of that phase is in its rising process or falling process can be identified according to the following: in which phase the previous zero-crossing time occurred and whether the induced voltage of that phase was in its rising process or falling process. More specifically, in the example illustrated in FIG. 19, it will be assumed that the zero-crossing time when the terminal voltage Vv of V-phase crosses the reference voltage Vref in its falling process. In this case, it can be predicated that the next zero-crossing time will occur in U-phase and the zero-crossing time occurs in the rising process of the terminal voltage Vu of that phase. For this reason, it can be thought that, in the permitted period, the comparison signal Uc of U-phase is inverted from logical L to logical H. Meanwhile, if the comparison signal Uc of U-phase has been already at logical H when the value of the permission start counter is zeroed, it can be determined that the zero-crossing time has occurred ahead of the permitted period.

When the logical value of a comparison signal of a phase in which the zero-crossing time is presumed to occur in the permitted period is determined to be abnormal, the processing proceeds to S54. At S54, it is determined that the zero-crossing time point is excessively advanced. Then, the value of the counter is substituted for the values Cp on the permission start counter and the specified time point setting counter Cs. Thus, the time point with which the value Cp of the permission start counter is zeroed is taken as zero-crossing time point to set specified time point and the like. This processing is for avoiding the following even when an erroneous determination is made at S52: the setting of specified time point and the like is excessively shifted from normal time point. At S56, subsequently, the measuring counter is initialized.

At S58, it is checked whether or not the determination of excessive advance is continued, that is, the previous zero-crossing time also occurred ahead of the permitted period. When the previous zero-crossing time also occurred ahead of the permitted period, an excessive advance counter is incremented at S60. The excessive advance counter is configured to count a number of times Ca when the zero-crossing time continuously occurs ahead of the permitted period. At S62, subsequently, it is checked whether or not the value Ca of the excessive advance counter has become equal to a threshold value MAX. This processing is for determining whether or not the rotating state of the brushless motor 2 is abnormal and it is difficult to control the rotating state. This threshold value MAX is set to a value larger than an estimated number of times when the zero-crossing time will occur ahead of permitted period at start of the brushless motor 2. When it is determined that the value of the excessive advance counter is equal to the threshold value MAX, restart processing (restoration processing) for the brushless motor 2 is carried out at S64. At the same time, the excessive advance counter is initialized.

When a negative determination is made at S58, the excessive advance counter is initialized at S66. This processing is for avoiding the following when the zero-crossing time occurs ahead of the permitted period due to start of the brushless motor 2, the influence of noise or the like, load variation, or the like. The value Ca of the excessive advance counter is accumulated, and it is eventually determined to be abnormal and restart processing is carried out. When a negative determination is made at S50 or S52 or when the processing of S64 or S66 is completed, this series of processing is once terminated.

Figure 25:
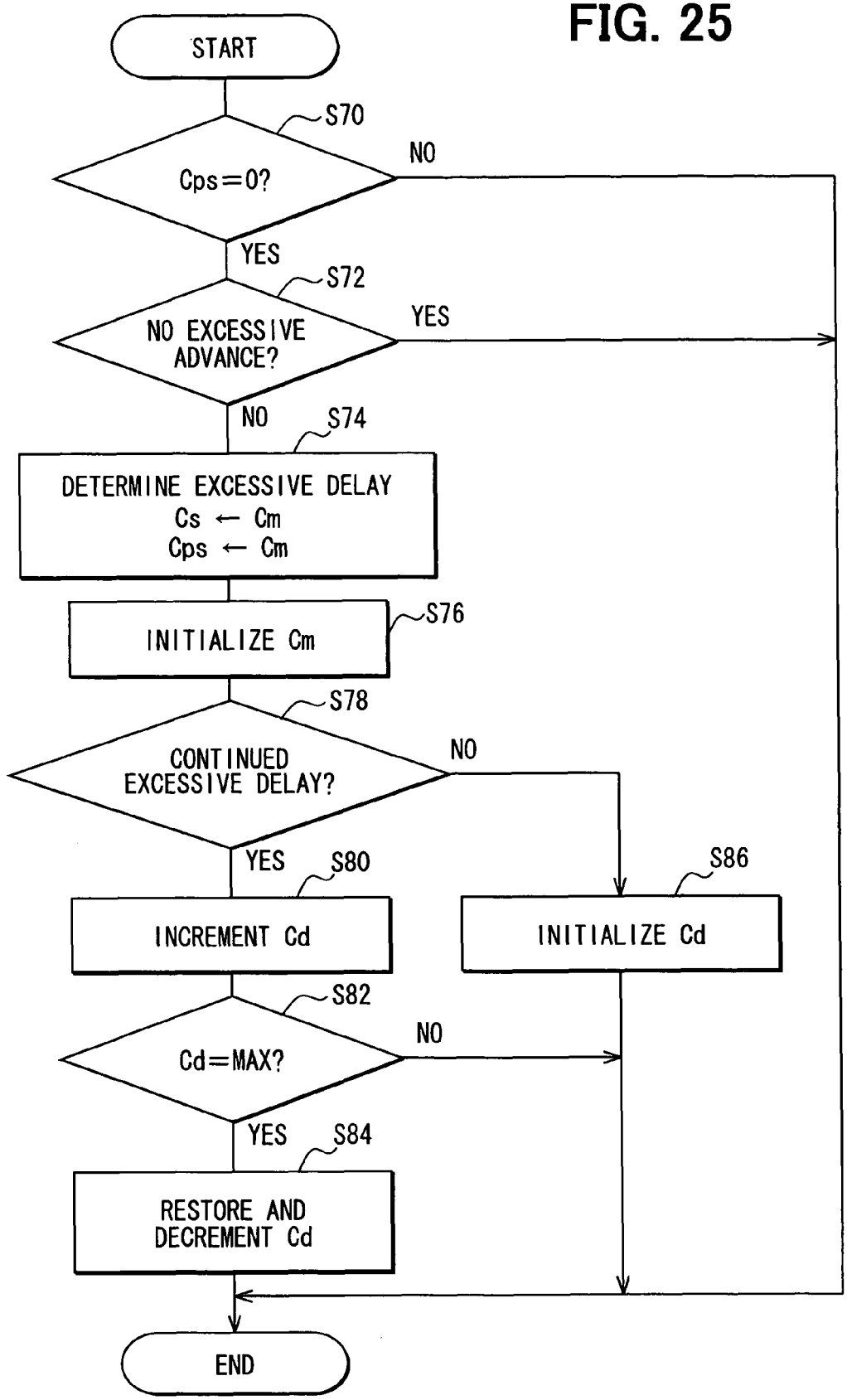
FIG. 25 is a flowchart illustrating processing for the determination of a loss of synchronism state.

FIG. 25 illustrates the processing for coping with an abnormality that the zero-crossing time occurs behind a permitted period. That is, the zero-crossing time is delayed. This processing is repeatedly carried out by the drive control circuit 220, for example, in a predetermined cycle. This series of processing is carried out as follows.

At S70, it is checked whether or not the value Cps of the permitted period setting counter is zero. This processing is for determining whether or not it is the time of the end of the permitted period. When it is determined that the value Cps of the permitted period setting counter is zero, it is determined at S72 whether or not an affirmative determination was made at S52 in FIG. 24 and the zero-crossing time has been already detected. This processing is for determining whether or not the zero-crossing time occurs behind the permitted period. More specifically, when the zero-crossing time has not occurred ahead of the permitted period and does not occur in the permitted period, either, it can be expected that it will be delayed and occur behind the permitted period.

When a negative determination is made at S72, processing similar with that of S54 to S66 in FIG. 24 is carried out at S74 to S86, in which a delay is counted as the delay value Cd by using a delay counter.

In this embodiment, a loss of synchronism state is determined based on that the zero-crossing time continuously occurs ahead of or behind the permitted period. For this reason, a state in which the zero-crossing time is incidentally caused to deviate from the permitted period by the influence of noise or the like can be discriminated from a loss of synchronism state. Further, setting is so made that the permitted period is at a predetermined electrical angle regardless of fluctuation in the voltage of the battery 214. Therefore, a loss of synchronism state can be prevented from being determined due to fluctuation in the voltage of the battery 214.

According to the sixth embodiment, the following advantages can be provided.

(1) When the number of times when the zero-crossing time continuously occurs either ahead of or behind the permitted period becomes equal to or higher than a threshold value MAX, the brushless motor 2 is determined to be abnormal. Thus, when rotational fluctuation temporarily occurs due to load variation or the like or any other like event occurs, that can be prevented from being determined to be abnormal.

(2) When it is determined that the zero-crossing time has occurred ahead of the permitted period, the time of the beginning of the permitted period is assumed to be the zero-crossing time to set a specified time point. Thus, even when determination is erroneous, it can be avoided that a specified time point is too inappropriately set.

(3) When it is determined that the zero-crossing time occurs behind the permitted period, the time of the end of the permitted period is assumed to be the zero-crossing time to set the specified time point. Thus, even when determination is erroneous, it can be avoided that a specified time point is too inappropriately set.

(4) Based on the value of a comparison signal at the time of the beginning of the permitted period, it is checked whether or not the zero-crossing time has occurred ahead of the permitted period. Based on the presence or absence of change in a comparison signal in the permitted period, it is checked whether or not the zero-crossing time occurs behind the permitted period. Thus, these determinations can be appropriately made.

(5) According to change in the rotational speed of the brushless motor 2, the setting of the permitted period based on the values on the permission start counter and the permitted period setting counter is corrected. This makes it possible to accurately set a permitted period in a desired electrical angle range regardless of any change in rotational speed, and to enhance the robustness of control on the rotating state of the brushless motor 2.

(6) Change in rotational speed is detected through voltage variation $\Delta VB$ in the voltage VB of the battery 214. Thus, change in rotational speed can be appropriately detected. Especially, the following advantage is provided by detecting a rotational speed based on the voltage VB of the battery 214. When the rotating state becomes abnormal regardless of fluctuation in the voltage VB of the battery 214, the setting of the permitted period is kept unchanged. For this reason, the setting of the permitted period based on the time interval between zero-crossing times can be corrected only when the voltage VB of the battery 214 fluctuates.

Seventh Embodiment

Figure 26A:
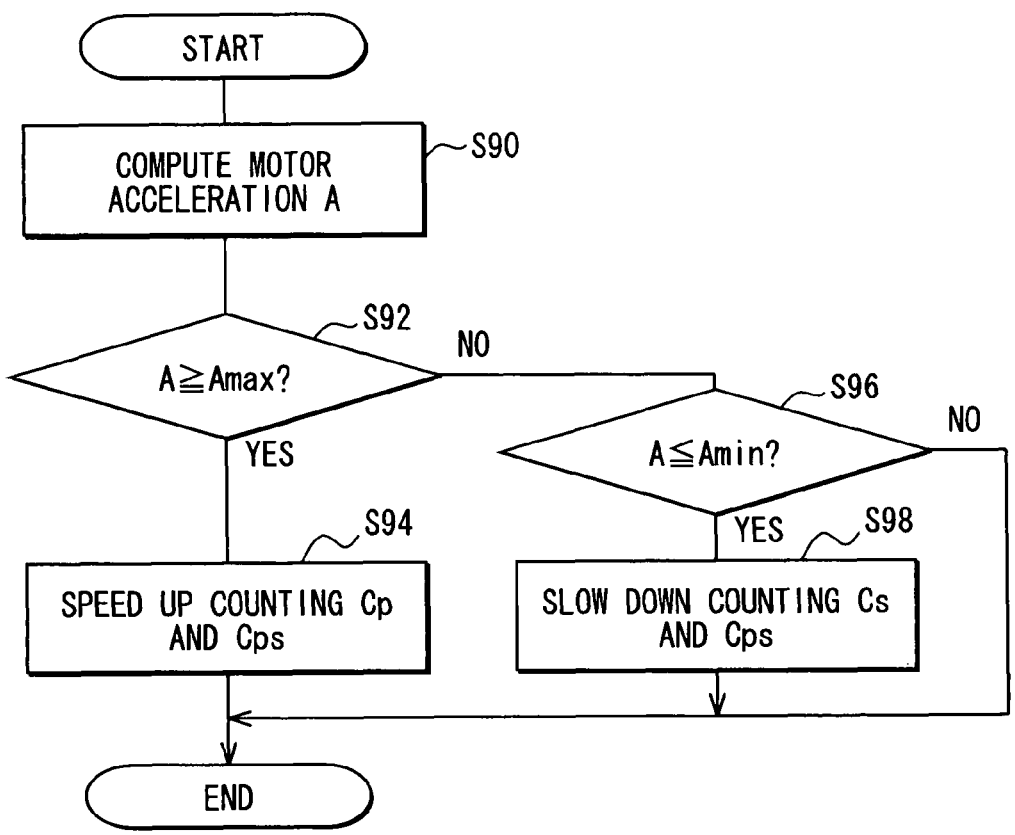
FIG. 26A is a flowchart illustrating processing for correcting the count speed of counters in a seventh embodiment.

In a seventh embodiment, the acceleration of the brushless motor 2 is detected based on a detected value of zero-crossing time, and the setting of a permitted period is corrected based on this acceleration. FIG. 26A illustrates processing for correcting the setting of a permitted period. This processing is repeatedly carried out by the drive control circuit 220, for example, in a predetermined cycle. This series of processing is carried out as follows.

At S90, the acceleration A of the brushless motor 2 is calculated based on the previous maximum value of the counter and the present maximum value of the counter. The maximum value may be determined based on the value Cm (FIG. 19) of the measuring counter. The maximum value of the counter is for counting the time interval between zero-crossing times, and has correlation with the instantaneous rotational speed between zero-crossing times. For this reason, these two values, the previous maximum value of the counter and the present maximum value of the counter, are values at two different points of time with respect to instantaneous rotational speed. For this reason, the acceleration A can be calculated from them.

Figure 26B:
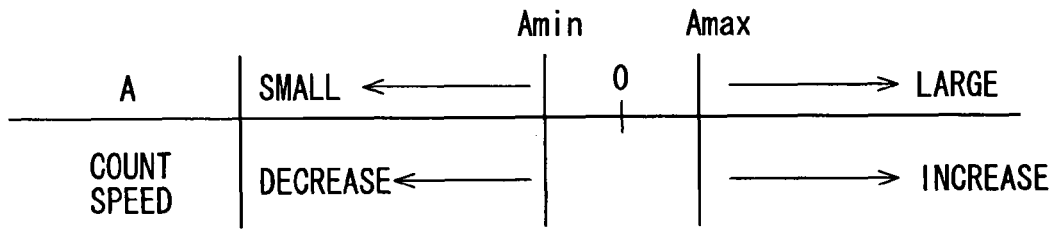
FIG. 26B is a characteristic diagram illustrating a relation between an acceleration and a count speed correction coefficient.

At S92, subsequently, it is checked whether or not the acceleration A is equal to or higher than a threshold value Amax. This processing is for determining whether or not the zero-crossing time occurs ahead of the permitted period determined by its rotational speed as a result of the brushless motor 2 being accelerated. When it is determined that the acceleration is equal to or higher than the threshold value Amax, the same processing as that of S44 in FIG. 22 is carried out at S94. That is, the count speed of the permission start counter and the permitted period setting counter is increased with increase in the acceleration A as illustrated in FIG. 26B.

When a negative determination is made at S92, meanwhile, it is determined at S96 whether or not the acceleration A is equal to or lower than a threshold value Amin. This processing is for determining whether or not the zero-crossing time occurs behind the permitted period determined by its rotational speed as a result of the brushless motor 2 being decelerated. When it is determined that the acceleration is equal to or lower than the threshold value Amin, the same processing as that of S48 in FIG. 22 is carried out at S98. That is, the count speed of the permission start counter and the permitted period setting counter is reduced with reduction in the acceleration A. The count speed is reduced when the acceleration takes a negative value and with increase in its absolute value.

When a negative determination is made at S96 or when the processing of S94 or S98 is completed, this series of processing is once terminated.

According to this embodiment described above, the following advantage can be provided in addition to the advantages of the sixth embodiment described under (1) to (5) above.

(7) Based on the result of detection of the zero-crossing time, information pertaining to change in the rotational speed of the brushless motor 2 is extracted. Thus, change in rotational speed can be appropriately determined.

Eighth Embodiment

In the sixth embodiment, when the zero-crossing time occurs ahead of the permitted period, the time of the beginning of the permitted period is assumed to be the zero-crossing time to set a specified time point. In this case, however, when the zero-crossing time continuously occurs ahead of the permitted period, the specified time point is continuously delayed from appropriate time point, and this degrades the efficiency of the control on the output of the brushless motor 2.

Therefore, in an eighth embodiment, a most advanced time that can be assumed to be the zero-crossing time and adopted is set ahead of the time of the beginning of permission time point. When the zero-crossing time occurs ahead of the permitted period, the zero-crossing time is set to a time between the most advanced time and the time of the beginning of the permitted period (including the most advanced time and the time of the beginning) at which the difference between it and the zero-crossing time is minimized.

As illustrated in FIG. 27A and FIG. 27B, the most advanced time is set to a time point with which the value Cma of a maximum advance counter becomes 0. The maximum advance counter starts decrementing from its initial value for which the value of the counter at the zero-crossing time is taken. By making the decrement speed of the maximum advance counter faster than the decrement speed of the permission start counter, the most advanced time at which the value of the maximum advance counter is zeroed can be set ahead of the time of the beginning of a permitted period. This most advanced time is predetermined as time point with which a predetermined electrical angle lapses after the zero-crossing time according to the specifications of the brushless motor 2 or the like.

Figure 28:
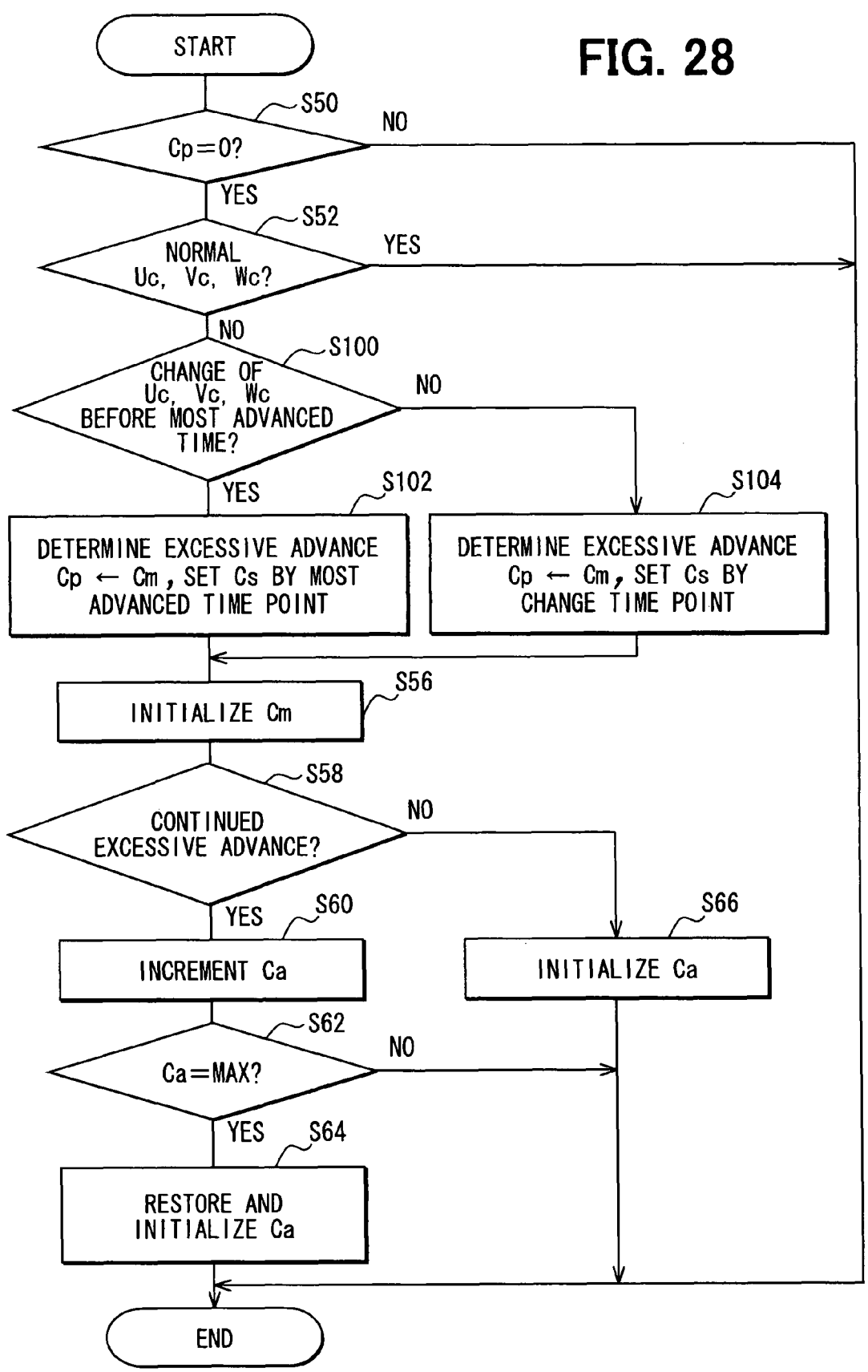
FIG. 28 is a flowchart illustrating determination of a loss of synchronism state.

FIG. 28 illustrates processing for coping with an abnormality that the zero-crossing time occurs ahead of the permitted period. This processing is repeatedly carried out by the drive control circuit 220, for example, in a predetermined cycle. In FIG. 28, the same processing as that illustrated in FIG. 24 will be identified with the same step number for simplicity.

When a negative determination is made at S52, that is, it is determined that the zero-crossing time has occurred ahead of the permitted period, the processing proceeds to S100. At S100, it is checked whether or not an output level change time of the corresponding one of the comparison signals Uc, Vc, Wc occurs ahead of or before the most advanced time (including the most advanced time). This processing can be carried out, for example, according to whether or not the logical value of the corresponding one of the comparison signals Uc, Vc, Wc when the value of the maximum advance counter becomes 0 is abnormal. When it is determined that the change time occurs ahead of the most advanced time, the following processing is carried out at S102: in addition to processing for determination of excessive advance of zero-crossing time point and processing for substituting the value Cm of the counter for the value Cp of the permission start counter, processing for assuming the most advanced time to be the zero-crossing time to set a specified time point. That is, the value Cs of the specified time point setting counter is so set that the following is implemented based on the period from the previous zero-crossing time to the zero-crossing time assumed this time. The specified time point setting counter takes a value corresponding to the time required from the present time to the specified time point.

When it is determined at S100 that the change time occurs behind the most advanced time, the following processing is carried out at S104 in addition to processing for determination of excessive advance of zero-crossing time point and processing for substituting the value Cm of the counter for the value Cp of the permission start counter: processing for assuming the change time of the corresponding one of the comparison signals Uc, Vc, Wc to be the zero-crossing time in the period from the most advanced time to the time of the beginning of a permitted period and thereby setting a specified time point. That is, the value Cs of the specified time point setting counter is so set that the following is implemented based on the period from the previous zero-crossing time to the zero-crossing time assumed this time. The specified time point setting counter takes a value corresponding to the time required from the present time to the specified time point.

When the processing of S102 or S104 is completed, the processing of S56 to S64 in FIG. 6 is carried out.

According to this embodiment, the following advantage is brought. Even when the zero-crossing time occurs before the time of the beginning of a permitted period, a specified time point can be set using a time point approximate to the actual zero-crossing time point as much as possible by setting the most advanced time. For this reason, degradation in the efficiency of control on the output of the brushless motor 2 can be favorably suppressed. Further, based on that the zero-crossing time continuously occurs ahead of the permitted period, any abnormality in the rotating state is determined; therefore, this determination can also be appropriately made.

The sixth to eighth embodiments may be modified as described below.

Figure 29:
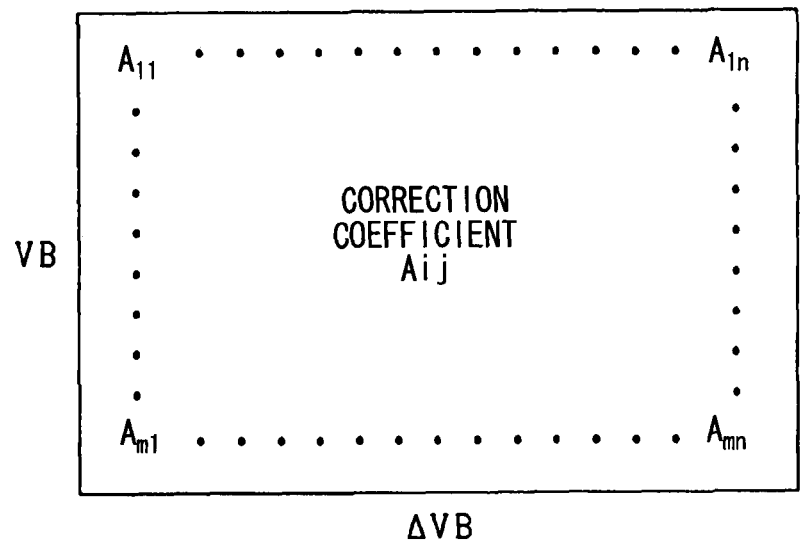
FIG. 29 is a table illustrating a relation of count speed correction coefficient relative to a voltage and a voltage variation in one modification.

In the sixth embodiment, the count speed of the permission start counter and the permitted period setting counter is corrected according to the variation ΔVB in the voltage of the battery 214. As illustrated in FIG. 29, instead, the count speed may be corrected according to two parameters: the voltage VB of the battery 214 and its variation ΔVB. FIG. 29 is a data map defining the relation between these two parameters and the count speed correction coefficient Aij. The reason why the voltage VB of the battery 214 is used as a parameter is as follows. Even when the variation ΔVB in the voltage of the battery 214 is identical, the degree of change in the rotational speed of the brushless motor 2 can differ depending on the voltage VB of the battery 214. For this reason, use of two parameters makes it possible to more accurately detect rotational fluctuation in the brushless motor 2 caused by fluctuation in the voltage VB of the battery 214.

Figure 30:
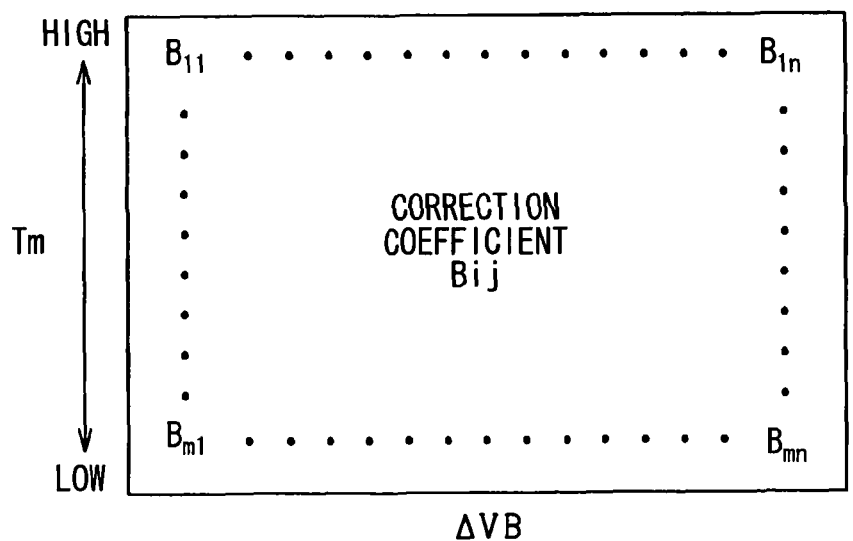
FIG. 30 is a table illustrating a relation of count speed correction coefficient relative to a voltage variation and a motor temperature in another modification.

The parameters for detecting change in the rotational speed of the brushless motor 2 are not limited to those described in relation to the above embodiments and their modifications. For instance, the magnetic flux in the brushless motor 2 is weakened and its rotational speed is increased with increase in the temperature Tm of the brushless motor 2. In consideration of this, variation in the temperature (or its equivalent) of the brushless motor 2 may be used. Alternatively, using a map defining the relation of the count speed correction coefficient Bij to the temperature Tm of the brushless motor 2 and variation ΔVB in the voltage of the battery 214, which is illustrated in FIG. 30, change in rotational speed may be detected based on these two parameters.

In the sixth embodiment, the processing of FIG. 22 need not be carried out. A loss of synchronism state can be discriminated from at least the influence of rotational fluctuation due to start or incidental noise by adjusting the threshold value MAX in FIG. 24 or FIG. 25.

The neutral point voltage of the brushless motor 2 may be used as the reference voltage Vref in place of the virtual neutral point voltage. One half of the voltage VB of the battery 214 may be used by dividing the voltage of the battery 214 with a resistive element.

When PWM control is used as a technique for controlling the brushless motor 2, for example, the following measure can be used. The period for which the switching elements SW1 to SW6 are ON is taken as an On-permitted period, and the switching elements SW1 to SW6 are repeatedly turned on and off in this period. In this case, however, the rotational speed of the brushless motor 2 can vary according to the rate (duty) of on time to the sum of on time and off time. Therefore, it is desirable to determine a mode for correcting the count speed according to the duty.

The time point with which a predetermined electrical angle occurs, detected based on induced voltage, is not limited to zero-crossing time point. For example, that found in JP 11-18478A may be adopted.

The power supply connected to the brushless motor 2 need not be the battery 214, but a generator may be connected. The brushless motor 2 need not be an actuator of an in-vehicle fuel pump, but may be an actuator of an in-vehicle cooling fan. The rotary machine need not be a three-phase brushless motor but may be a motor of any number of phases. Further, it need not be a motor and may be a generator.

Ninth Embodiment

Figure 31:
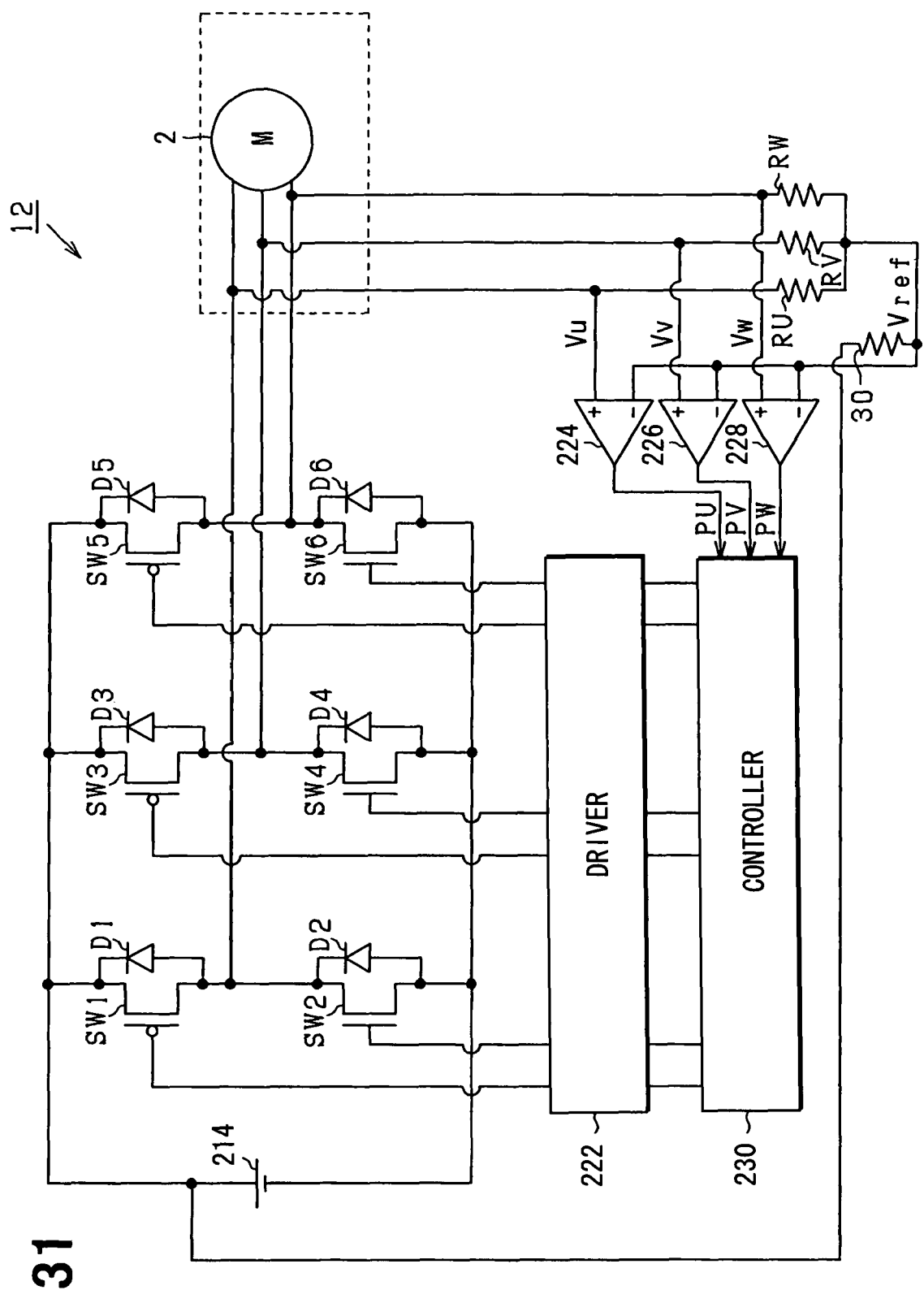
FIG. 31 is a circuit diagram illustrating a rotary machine driving apparatus in a ninth embodiment.

In a ninth embodiment illustrated in FIG. 31, a brushless motor 2 is a three-phase motor and it is an actuator of a fuel pump for an internal combustion engine mounted in a motorcycle. The three phases (U-phase, V-phase, W-phase) of the brushless motor 2 are connected with an inverter 12. This inverter 12 is a three-phase inverter and applies the voltage VB of a battery 214 to the three phases of the brushless motor 2. To provide conduction between each of the three phases and the positive pole or negative pole of the battery 214, the inverter 12 is constructed to include a parallel connection body having: switching elements SW1, SW2 (U-phase arm), switching elements SW3, SW4 (V-phase arm), and switching elements SW5, SW6 (W-phase arm). The switching elements SW1 to SW6 and diodes D1 to D6 are connected in the similar manner as in the sixth embodiment (FIG. 18).

A drive control circuit 230 operates the inverter 12 through a driver 222 and thereby controls the output of the brushless motor 2. Specifically, the drive control circuit 230 takes in comparison signals PU, PV, PW from comparators 224, 226, 228 and operates the switching elements SW1 to SW6 based thereon.

The comparators 224, 226, 228 are for comparing the terminal voltages Vu, Vv, Vw of respective phases with a reference voltage Vref. The comparator 224 compares the U-phase terminal voltage Vu of the brushless motor 2 with the reference voltage Vref, and outputs the result of this comparison as a comparison signal PU. The comparator 226 compares the V-phase terminal voltage Vv of the brushless motor 2 with the reference voltage Vref and outputs the result of this comparison as a comparison signal PV. The comparator 228 compares the W-phase terminal voltage Vw of the brushless motor 2 with the reference voltage Vref and outputs the result of this comparison as a comparison signal PW.

In this embodiment, a virtual neutral point voltage obtained by dividing the terminal voltages Vu, Vv, Vw of the respective phases with resistive elements RU, RV, RW is used for the reference voltage Vref. The reason for this is as follows. In the in-vehicle battery 214, its voltage value is prone to rapidly fluctuate, while the rate of change in induced voltage in the brushless motor 2 tends to become slower than the rate of change in the voltage of the battery 214. For this reason, when the voltage of the battery 214 rapidly rises, ½ of the amplitude of induced voltage does not become equal to ½ of the voltage of the battery 214. For this reason, when ½ of the voltage of the battery 214 is used for the reference voltage, comparison by the comparators 224, 226, 228 cannot be appropriately carried out with the voltage of the battery 214 fluctuating.

The drive control circuit 230 turns on and off the switching elements SW1 to SW6 through the driver 222. In this example, it basically carries out switching control by a 120°-energization method. Using the above comparison signals PU, PV, PW, it detects time point (zero-crossing time point) with which the induced voltage of each phase of the brushless motor 2 becomes equal to the reference voltage Vref of the brushless motor 2. Then, it changes the operation of the switching elements SW1 to SW6 with time point (specified time point) delayed from the zero-crossing time point by a predetermined electrical angle (e.g., 30°).

The drive control circuit 230 may be constructed by logic circuits or may be constructed by a central processing unit and a storage unit for storing a program.

Figure 32:
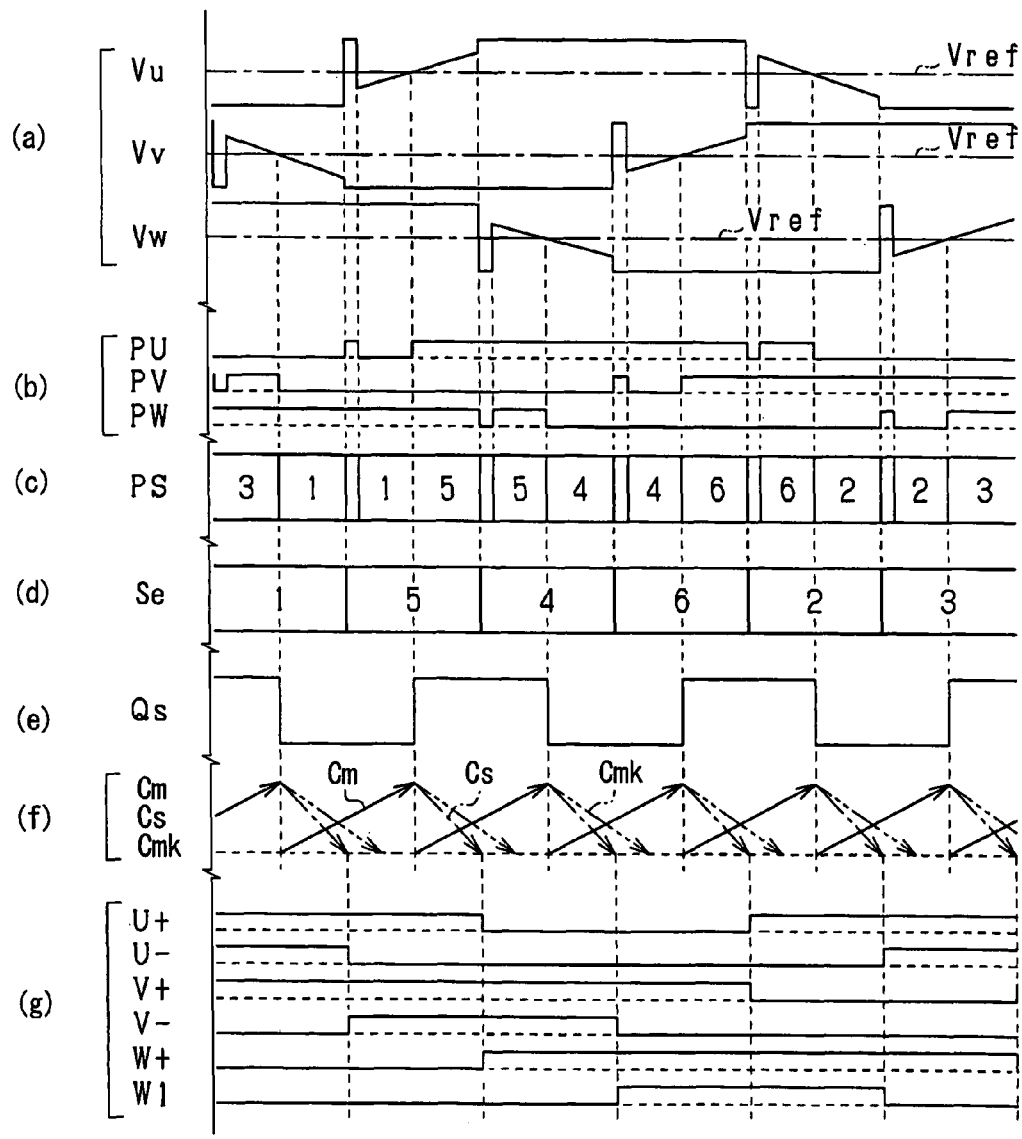
FIG. 32 is a signal diagram illustrating a mode for 120°-energization control.

The switching control is carried out in 120°-energization control as illustrated in FIG. 32. Specifically, (a) illustrates the transition of the terminal voltages Vu, Vv, Vw indicated by solid lines and the reference voltage Vref by one-dot chain lines. In this embodiment, the virtual neutral point voltage is used as the reference voltage Vref. Though, in actuality, the reference voltage Vref fluctuates, it is considered to be constant here for the sake of simplicity. (b) illustrates the results of comparison of the terminal voltages Vu, Vv, Vw with the reference voltage Vref with respect to magnitudes (comparison signals PU, PV, PW). (c) illustrates the transition of a logically combined signal PS of the comparison signals PU, PV, PW. 2(d) illustrates the transition of a logically combined signal (expectation signal Se) of the comparison signals PU, PV, PW expected when the zero-crossing time occur while the switching elements SW1 to SW6 are in operation. FIG. 2(e) illustrates the transition of a detection signal Qs with respect to zero-crossing time point. This is a signal whose rising edges and falling edges are synchronized with zero-crossing time point. (f) illustrates the transition of the values on various counters, and (g) illustrates the transition of actuating signals for the switching elements SW1 to SW6. The actuating signals illustrated in (g) include actuating signals U+, V+, W+ for the high side switching elements SW1, SW3, SW5 of the arms of the respective phases and actuating signals U−, VW− for the low side switching elements SW2, SW4, SW6 of the arms of the respective phases. The high side switching elements SW1, SW3, SW5 of the arms of the respective phases are P-channel transistors; therefore, the periods for which these actuating signals U+, V+, W+ are at logical L are the periods for which they are ON.

The combined signal PS is a three-bit signal, and the respective logical values of the comparison signals PU, PV, PW respectively agree with the logical values of its highest-order (most significant) bit, intermediate bit, and lowest-order (least significant) bit. That is, when the comparison signal PU is at logical H the highest-order bit is set to 1; and when the comparison signal PU is at logical L the highest-order bit is set to 0. For this reason, when the comparison signals PU, PV PW are respectively at H, L, and H, for example, the combined signal PS is set to 101 in binary notation and 5 in decimal notation. In FIG. 32, both the combined signal PS and the expectation signal Se are represented in decimal notation.

The solid line in (f) indicate the value Cm of a measuring counter for measuring a time interval between adjacent zero-crossing times. The measuring counter is initialized each time the zero-crossing time occurs, and newly starts time counting operation. A time interval between adjacent zero-crossing times has correlation with rotational speed. For this reason, the value of the counter immediately before it is initialized (the maximum value of the counter) provides a parameter having correlation with rotational speed.

The one-dot chain lines in (f) indicate the value Cs of a specified time point setting counter that counts a time required until zero-crossing time point becomes equal to specified time point and thereby sets a specified time point. The specified time point setting counter takes the value of the counter before initialization as its initial value at the zero-crossing time and decrements it. Then, it sets the time point with which the value is zeroed as a specified time point. At this time, the following operation is performed. When the time interval between zero-crossing time point and specified time point is 30°, for example, the decrement speed is set to twice the increment speed of the measuring counter. In consideration of that the time interval between adjacent zero-crossing times is 60°, it can be thought that this setting makes it possible to delay the time point with which the value of the specified time point setting counter becomes 0 by 30° from the zero-crossing time point.

The two-dot chain lines illustrated in (f) indicate the value Cmk of a masking period counter. The masking period counter determines a period (masking period) for which detection of the zero-crossing time based on the comparison of the terminal voltages Vu, Vv, Vw with the reference voltage Vref is inhibited (disabled). This counter is for preventing the following event. When the terminal voltages Vu, Vv, Vw agree with the reference voltage Vref during a period for which a current is supplied through the diodes D1 to D6, the zero-crossing time is erroneously detected. This counter also takes the value of the counter before initialization as its initial value at the zero-crossing time and decrements it. Then, it sets the period before the value is zeroed as a masking period. When the masking period is set to a period from the zero-crossing time to 450, for example, the decrement speed can be set to ¾ times the increment speed of the measuring counter.

When the value of the masking period counter is zeroed, the comparison signals PU, PV, PW and the combined signal PS are enabled. When the combined signal PS agrees with the expectation signal Se during this period, the detection signal Qs is inverted. At the zero-crossing time when the detection signal Qs is inverted, the specified time point setting counter starts decrementing. When its value is zeroed, the operation of the switching elements SW1 to SW6 is changed.

As illustrated in FIG. 32, the specified time point with which the switching elements SW1 to SW6 are turned on and the zero-crossing time point have one-to-one correspondence with each other. For this reason, the behavior of the terminal voltages Vu, Vv, Vw of the respective phases is uniquely determined according to the operating state of the switching elements SW1 to SW6. Consequently, the above expectation signal Se can be uniquely determined.

If the battery 214 and the inverter 12 are insufficiently connected or any other like event occurs, the following phenomenon can take place. Because of transmission of vibration of the vehicle to the battery 214 or any other reason, the battery 214 and the inverter 12 may be instantaneously disconnected from each other and then conduction is established between them again. If power supply to the brushless motor 2 is temporarily interrupted at this time, the rotational speed of the brushless motor 2 is reduced. If fuel discharged from a fuel tank to the upstream side by a fuel pump driven by the motor 2 flows back at this time, force on the reverse rotation side is exerted on the brushless motor 2. This may eventually cause reverse rotation of the motor 2. If in this situation the switching elements SW1 to SW6 are operated as under normal conditions, a problem may arise. For example, an oscillation phenomenon that the brushless motor 2 repeats normal rotation and reverse rotation occurs, and it is difficult to control the brushless motor 2 in a proper rotating state.

Figure 33:
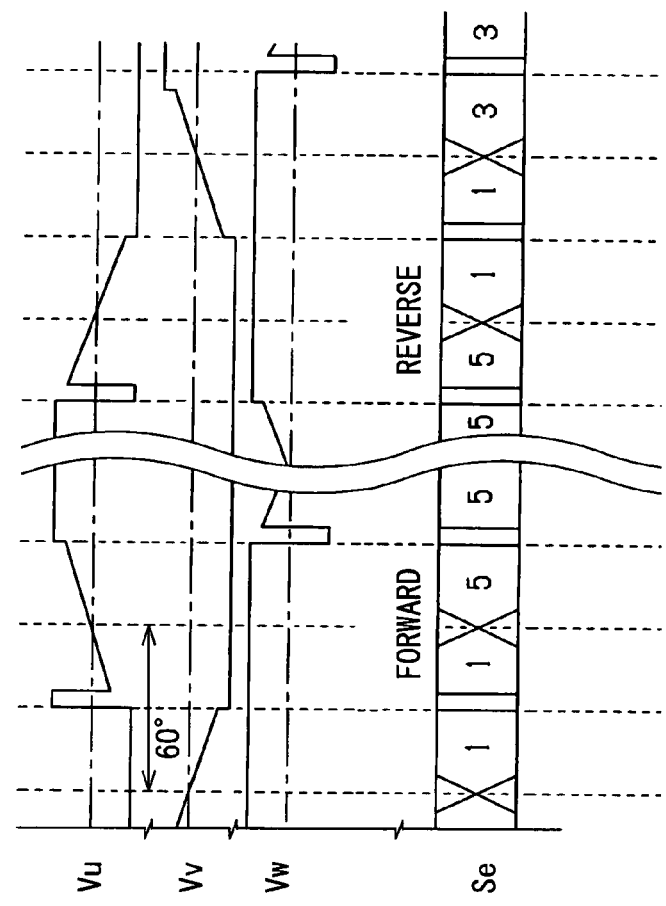
FIG. 33 is a signal diagram illustrating a mode for detecting reverse rotation.
Figure 34:
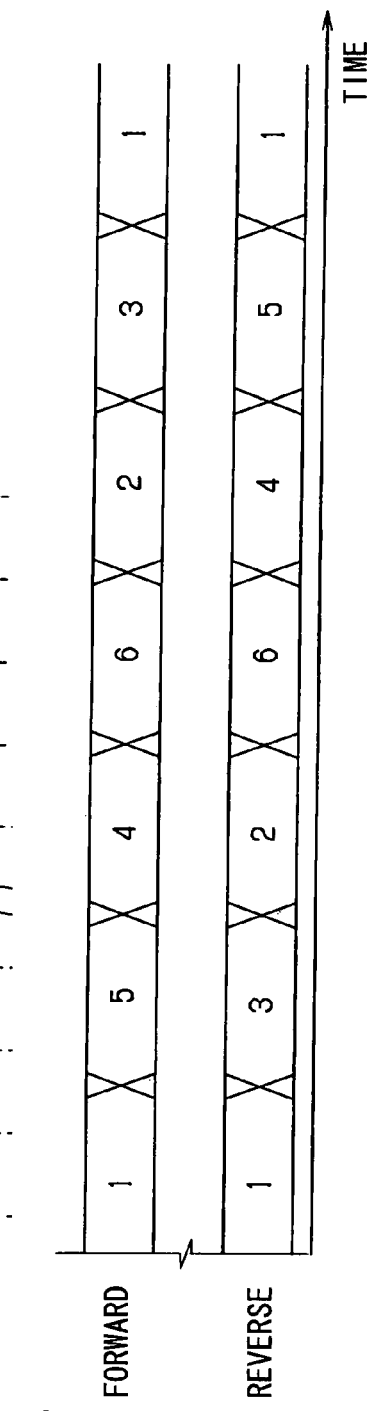
FIG. 34 is an operation diagram illustrating a relation between forward rotation and reverse rotation.

The reverse rotation of the brushless motor 2 can be appropriately detected based on the above combined signal PS composed of three bits. As illustrated in FIG. 33, when the brushless motor 2 is normally rotating in the forward direction, time-series data on the combined signal PS should agree with time-series data on the expectation signal Se. When the brushless motor 2 is rotating in reverse, meanwhile, time-series data on the combined signal PS should agree with data obtained by time-reversing, that is, reversing the order of arrangement, time-series data on the expectation signal Se as illustrated in FIG. 34. For this reason, the reverse rotation of the brushless motor 2 can be detected based on the combined signal PS.

When the rotating state of a brushless motor 2 becomes abnormal, all the switching elements SW1 to SW6 are turned off and the operation waits for the brushless motor 2 to stop. Then, the brushless motor 2 is restarted. In this case, however, it takes a long time to restore the brushless motor 2 to a normal state.

To cope with this, the following processing is carried out in this embodiment. When it is detected that the brushless motor 2 is rotating in reverse, processing is carried out to forcibly stop the rotation of the brushless motor 2 and then restart processing is carried out.

Figure 35:
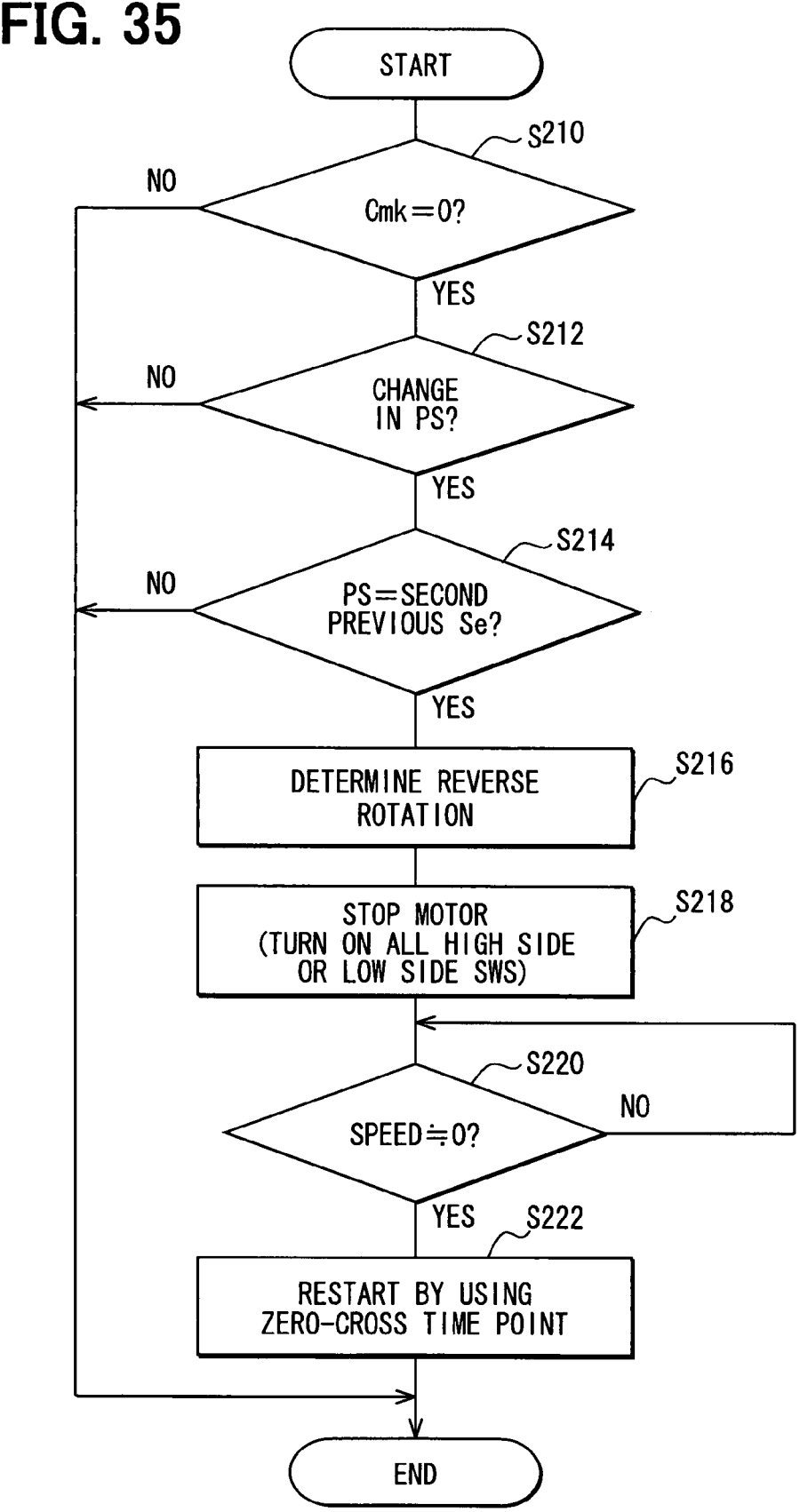
FIG. 35 is a flowchart illustrating restart processing at the time of reverse rotation.

FIG. 35 illustrates processing for restarting the brushless motor 2 in this embodiment. This processing is repeatedly carried out by the drive control circuit 230, for example, in a predetermined cycle.

This series of processing is carried out as follows. At S210, it is checked whether or not the value Cmk of the masking period counter is zero. When it is determined that the value Cmk of the masking period counter is zero, it is determined at S212 whether or not the combined signal PS of the comparison signals PU, PV, PW has changed. This processing is for determining whether or not it is the zero-crossing time point. When it is determined that the combined signal PS has changed, it is determined at S214 whether or not the present combined signal agrees with the second previous expectation signal Se. This processing is for determining whether or not the brushless motor 2 is rotating in reverse. As illustrated in FIG. 33, when the brushless motor 2 is rotating in reverse, time-series data on the combined signal PS is inverted. Therefore, it is presumed that the present combined signal PS agrees with the second previous expectation signal Se. When the present combined signal PS agrees with the second previous expectation signal Se, it is determined at S16 that the brushless motor 2 is rotating in reverse.

At S218, subsequently, processing is carried out to forcibly stop the rotation of the brushless motor 2. Specifically, the switching elements SW1, SW3, SW5 or the switching elements SW2, SW4, SW6 are all turned on to short-circuit all the phases of the brushless motor 2. Thus, a current is supplied through the brushless motor 2 only by induced voltage produced in conjunction with the rotation of the brushless motor 2. This current is quickly attenuated by the resistance of the current passage. As a result, the rotational energy of the brushless motor 2 is converted into electrical energy and then attenuated. For this reason, the brushless motor 2 can be quickly stopped.

At S220, it is checked whether or not the rotational speed of the brushless motor 2 is substantially zero. The rotational speed can be calculated based on time intervals between adjacent zero-crossing time points. This can be done using the maximum value Cm of the counter. When it is determined that the rotational speed is substantially zero, restart processing is carried out at S222 by operating the switching elements SW1 to SW6 based on zero-crossing time point.

When a negative determination is made at any of S210 to S214 or when the processing of S222 is completed, this series of processing is once terminated.

Thus, the zero-crossing time point is used in determination of whether or not the rotational speed is substantially zeroed in conjunction with stopping processing. However, this may cause a problem. The virtual neutral point is used to set the reference voltage Vref. Therefore, when the rotational speed of the brushless motor 2 is substantially zero, the terminal voltages Vv, Vu, Vw of all the phases of the brushless motor 2 can agree with the reference voltage Vref. When all the switching elements SW1 to SW6 are once turned off to restart the motor, all of the phases are brought into a high-impedance state. Also in this case, therefore, the terminal voltages Vv, Vu, Vw of all the phases of the brushless motor 2 can agree with the reference voltage Vref.

If noise is superimposed on the terminal voltages Vv, Vu, Vw in these situations, the following phenomenon takes place. The terminal voltages Vv, Vu, Vw indicated by solid lines in FIG. 36A, and the reference voltage Vref indicated by one-chain dot lines frequently cross each other. In reality, the reference voltage Vref also fluctuates according to the terminal voltages Vu, Vv, Vw; however, it is considered to be constant here for simplicity. In this case, there is a possibility that the zero-crossing time point is frequently erroneously detected. In this embodiment, to cope with this, the reference voltage Vref is subjected to offset correction so that the following is implemented. The value of the reference voltage Vref and the values of the terminal voltages Vv, Vu, Vw inputted to the comparators 224, 226, 228 as illustrated in FIG. 31 are made different from each other when the rotational speed is substantially zero. That is, the signal wire for inputting the reference voltage Vref to the comparators 224, 226, 228 is connected to the positive pole of the battery 214 through a resistive element 30. Thus, the following can be implemented as illustrated in (b) of FIG. 35. The reference voltage Vref obtained when the rotational speed is substantially zero can be corrected to the positive pole side of the battery 214 by an offset Δ with respect to the terminal voltage Vu. In this example, only the U-phase is illustrated.

This offset Δ is set to small an amount so that control on the brushless motor 2 will not be influenced. At the same time, the offset is set to an amount assumed to be required to implement the following. The terminal voltage Vu and the reference voltage Vref are prevented from crossing each other, even if noise is mixed, when the rotational speed is substantially zero, as illustrated in FIG. 36B. With this setting, as illustrated in FIG. 36C, the reference voltage Vref is increased with increase in the rotational speed. When the terminal voltage Vu rises and exceeds the reference voltage Vref, the zero-crossing time point when the terminal voltage Vu and the reference voltage Vref cross each other occurs. Thus, as illustrated in FIG. 36D with respect to the U-phase, the control under normal conditions, illustrated in FIG. 32, can be carried out.

In this embodiment, especially, degradation in the efficiency of the brushless motor 2 is prevented by correcting the reference voltage Vref. When the terminal voltages Vu, Vv, Vw are corrected, meanwhile, the phenomenon illustrated in FIG. 36E occurs. That is, the amount of fluctuation in voltage applicable to the brushless motor 2 becomes lower than the voltage VB between the positive pole and the negative pole of the battery 214, and this degrades efficiency. That is, a loss is produced by an amount equivalent to the region hatched in FIG. 36E.

It is desirable that the offset Δ should be approximately an order of magnitude less than the amount VE of voltage drop observed when a current is supplied through the diodes D1 to D6. This makes it possible to prevent the values of the comparison signals PU, PV, PW from becoming abnormal due to ringing noise when the operation of the switching elements SW1 to SW6 is changed. For this reason, the following can be implemented even when PWM control is carried out. That is, the following can be implemented even when, for example, a period from specified time point to 1200 is taken as an ON operation-permitted period and the switching elements SW1 to SW6 are turned on and off during this period. Zero-crossing time point can be accurately detected by the method illustrated in FIG. 32.

According to the ninth embodiment, the following advantages are provided.

(1) When the rotational speed of the brushless motor 2 is substantially zeroed, the terminal voltages Vu, Vv, Vw are equal to one another. At this time, at least either of the values of the terminal voltages Vu, Vv, Vw and the value of the reference voltage Vref to be compared by the comparators 224, 226, 228 is subjected to offset correction. These values are thereby made different from each other. Thus, even when noise is mixed and thus a terminal voltage fluctuates, the occurrence of a phenomenon that the terminal voltage frequently crosses the reference voltage can be avoided. As a result, erroneous detection of zero-crossing time point can be favorably avoided.

(2) The above correction is carried out by the resistive element 30 that connects the signal wire for inputting the reference voltage Vref to the comparators 224, 226, 228 to the positive potential of the battery 214. Thus, the reference voltage Vref can be corrected to the positive potential of the battery 214, and further, this amount of correction can be adjusted by the resistance value of the resistive element 30.

(4) Since the reference voltage Vref is to be corrected, the following advantage is brought. Degradation in the efficiency of control on the brushless motor 2 can be suppressed as compared with cases where the terminal voltages Vu, Vv, Vw are to be corrected, and further the number of objects to be corrected can be reduced.

(5) The virtual neutral point voltage is used for the reference voltage Vref. Therefore, even when the brushless motor 2 does not have a wiring connected to a neutral point, the reference voltage Vref can be appropriately determined.

(6) The operation of the switching elements SW1 to SW6 for starting the brushless motor 2 at a stop is started based on a detected value of zero-crossing time point. If noise is mixed into the terminal voltages Vu, Vv, Vw in this case, a phenomenon that the terminal voltages Vu, Vv, Vw and the reference voltage Vref frequently cross each other can occur. As a result, erroneous detection of zero-crossing time point is prone to occur. To cope with this, this embodiment is so constructed that the above operation and advantage can be especially favorably provided.

In the ninth embodiment, microcomputer processing may be used in place of the comparators 224, 226, 228 to compare the terminal voltages Vu, Vv, Vw and the reference voltage Vref with each other. The signal wire for applying the reference voltage Vref to the comparators 224, 226, 228 may be grounded through a resistive element. Thus, the reference voltage Vref can be corrected to the ground potential side. The construction for correcting the reference voltage Vref need not be that the signal wire for applying the reference voltage Vref to the comparators 224, 226, 228 is connected to a predetermined potential through a resistive element. For example, an output signal obtained by voltage converting the positive potential of the battery 214 through an inverting amplifier circuit or a non-inverting amplifier circuit may be applied to the signal wire for applying the reference voltage Vref to the comparators 224, 226, 228. The object to be corrected need not be the reference voltage Vref and may be the terminal voltages Vu, Vv, Vw. Alternatively, it may be both the reference voltage Vref and the terminal voltages Vu, Vv, Vw. When the terminal voltages Vu, Vv, Vw are corrected, however, it is desirable to make their amounts of correction identical with one another.

Tenth Embodiment

Figure 37:
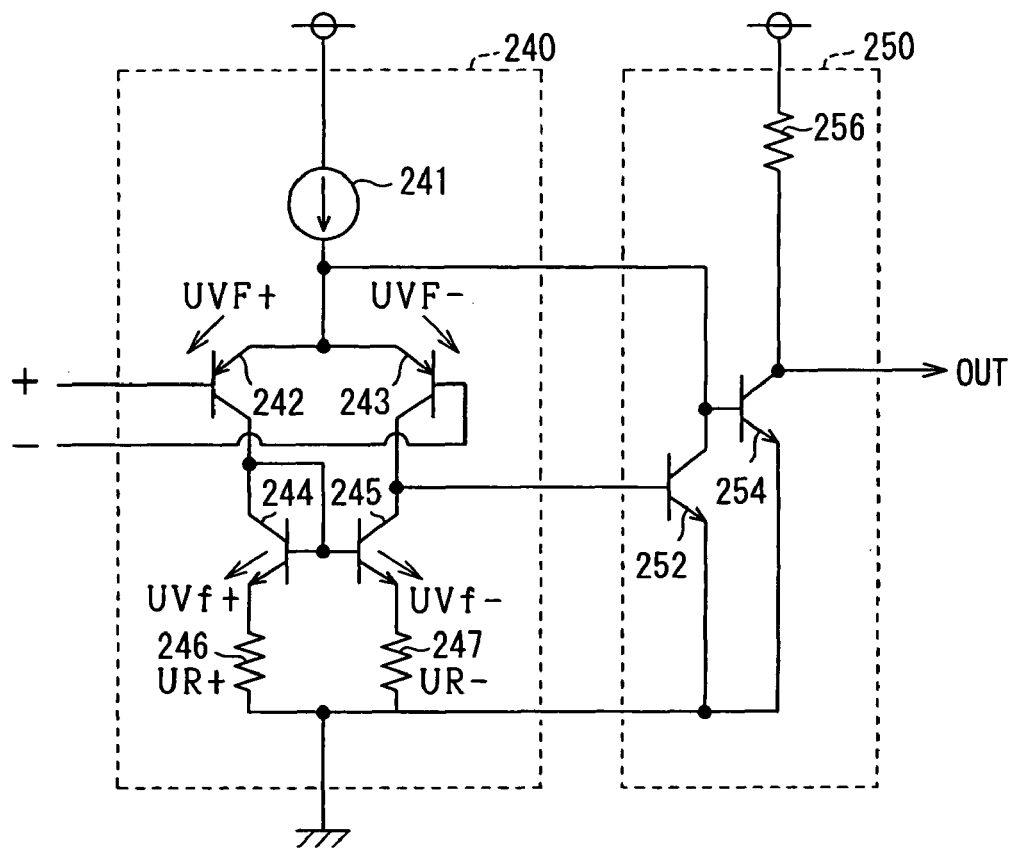
FIG. 37 is a circuit diagram illustrating a comparator in a tenth embodiment.

In a tenth embodiment, the values of the terminal voltages Vu, Vv, Vw and the value of the reference voltage Vref to be compared with each other are made different from each other through the setting of the comparators 224, 226, 228. Each of the comparators 224, 226, 228 is constructed as illustrated in FIG. 37.

Each comparator is so constructed that it includes a differential amplifier circuit 240 and an output circuit 250. In the differential amplifier circuit 240, a constant current source 241 connected to the positive pole of the battery 214 is connected with the emitters of a pair of transistors 242, 243. The bases of the pair of transistors 242, 243 are respectively connected with the non-inverting input terminal (+) and the inverting input terminal (−) of the comparator 224, 226, 228. The collectors of the transistors 242, 243 are respectively connected with the collectors of transistors 244, 245. The bases of the transistors 244, 245 are short-circuited to each other, and the emitters of the transistors 244, 245 are grounded through resistive elements 246, 247. The bases of the transistors 244, 245 are connected to the junction point between the transistor 242 and the transistor 244.

The output circuit 250 includes a transistor 252 and a transistor 254, and the base of the transistor 252 is connected to the junction point between the transistor 243 and the transistor 245. The emitter of the transistor 252 is grounded, and its collector is connected to the constant current source 241. The base of the transistor 254 is connected with the collector of the transistor 252, and the emitter of the transistor 254 is grounded. The collector of the transistor 254 is connected with power supply obtained by stepping down the positive potential of the battery 214 to a predetermined voltage through a resistive element 256. Further, it makes the output terminal of the comparator 224, 226, 228.

With this construction, the following operation is performed. When the voltage of the non-inverting input terminal is higher than the voltage of the inverting input terminal, the transistor 243 is turned on and the transistor 242 is turned off. Therefore, a current from the constant current source 241 flows to the base of the transistor 252 through the transistor 243. As a result, the transistor 252 is turned on and the transistor 254 is turned off. Therefore, the output of the comparator 224, 226, 228 is brought to the positive potential of the battery 214. In other words, the comparator outputs a logical H signal.

When the voltage of the non-inverting input terminal is lower than the voltage of the inverting input terminal, the transistor 242 is turned on and the transistor 243 is turned off. As a result, a current from the constant current source 241 flows into the bases of the transistors 244, 245 through the transistor 242. For this reason, the transistors 244, 245 are turned on, and no current flows to the base of the transistor 252. For this reason, the transistor 252 is turned off and the transistor 254 is turned on. Therefore, the output of the comparator 224, 226, 228 is brought to ground potential. In other words, the comparator outputs a logical L signal.

The accuracy of comparison of a pair of input signals with respect to magnitude by the differential amplifier circuit 240 depends on the symmetry of pairs of elements in the differential amplifier circuit 240 respectively corresponding to the input terminals. The pairs of elements include the transistor 242 and the transistor 243, the transistor 244 and the transistor 245, and the resistive element 246 and the resistive element 247. Specifically, the accuracy of comparison is enhanced with enhancement of symmetry.

In this embodiment, a pair of elements respectively corresponding to the input terminals is made asymmetrical. As a result, when the values of voltages applied to the non-inverting input terminal and the input terminal are identical, the output signal of the comparator 224, 226, 228 takes a certain logical value without fail. This is because, in the differential amplifier circuit 240, either of the transistors 242, 243 is more prone to be turned on even when an identical voltage is applied to the non-inverting input terminal and the inverting input terminal.

When the transistors 242, 243 are so structured that they are asymmetrical, for example, the following is implemented. When the amount UVF+ of voltage drop between emitter and collector due to the transistor 242 being turned on is larger than the amount UVF− between emitter and collector due to the transistor 243 being turned on, the transistor 243 is more prone to be turned on. When the transistors 244, 245 are so structured that they are asymmetrical, the following is implemented. When the amount UVf+ of voltage drop between emitter and collector due to the transistor 244 being turned on is larger than the amount UVf− of voltage drop between emitter and collector due to the transistor 245 being turned on, the transistor 243 is more prone to be turned on. When the resistance value of the resistive element 246 is higher than the resistance value of the resistive element 247, the transistor 243 is more prone to be turned on.

With this setting, the following is implemented. In a situation in which the reference voltage Vref and the terminal voltages Vu, Vv, Vw agree with each other, the comparators 224, 226, 228 can be caused to determine that either is higher without fail. For this reason, even in the situation illustrated in FIG. 36A, it can be avoided that the output values of the comparators 224, 226, 228 are frequently inverted. To accurately bring an interval between zero-crossing times into correspondence with an interval of 60°, it is desirable to take the following measure. In a situation in which the true value of the reference voltage Vref and the true values of the terminal voltages Vu, Vv, Vw agree with each other, the results of comparison by the comparators 224, 226, 228 with respect to which is higher, the terminal voltages Vu, Vv, Vw or the terminal voltage, are made identical. Further, it is desirable to make the difference between the reference voltage Vref and the terminal voltage Vu, Vv, Vw when the output of the comparator 224, 226, 228 is inverted identical for all the phases. In this embodiment, for this purpose, the comparators 224, 226, 228 are made identical with one another in structure.

According to this embodiment, the following advantages can be provided in addition to the advantages of the ninth embodiment.

(7) Pairs of elements in the differential amplifier circuits 240 respectively corresponding to the pairs of input terminals of the comparators 224, 226, 228 are so structured that they are asymmetrical. Thus, the relative magnitude relation between a pair of input signals to be compared with each other can be shifted. For this reason, the following can be implemented in such a situation that the rotational speed of the brushless motor 2 is substantially zeroed and thus the reference voltage Vref and the terminal voltages Vu, Vv, Vw become equal to each other. The relative difference between these values to be compared with each other can be expanded.

(8) The comparators 224, 226, 228 are made identical in structure for all the phases. Thus, the intervals between zero-crossing times can be accurately set to 60°.

In the tenth embodiment, the circuitry of the comparators 224, 226, 228 may be so constructed that they include MOS transistors.

In both ninth and tenth embodiments, the following medications may be made.

The specified time point setting counter and the measuring counter may be made identical in count speed, and the initial value of the specified time point setting counter is set according to the value of the counter before initialization (maximum value). When the specified time point is set to a time point delayed by 30° from the zero-crossing time point, for example, ½ of the maximum value of the measuring counter is taken as the initial value of the specified time point setting counter. The masking period counter and the measuring counter may be made identical in count speed, and the initial value of the masking period counter is set according to the value of the counter before initialization (maximum value). When an angular range from the zero-crossing time point to 45° is set as the masking period, ¾ of the maximum value of the counter is taken as the initial value of the masking period counter. In place of the virtual neutral point voltage, the neutral point voltage of the brushless motor 2 may be used for the reference voltage Vref. The switching elements SW1, SW3, SW5 on the high side of the respective arms may be constructed of an N-channel MOS transistor. The power supply connected with the brushless motor 2 need not be the battery 214 but may be a generator. The brushless motor 2 need not be an actuator of an in-vehicle fuel pump, but may be an actuator of an in-vehicle cooling fan. The rotary machine need not be a three-phase brushless motor, but may be a motor of any number of phases. Further, it need not be a motor but may be a generator.

Eleventh Embodiment

Figure 38:
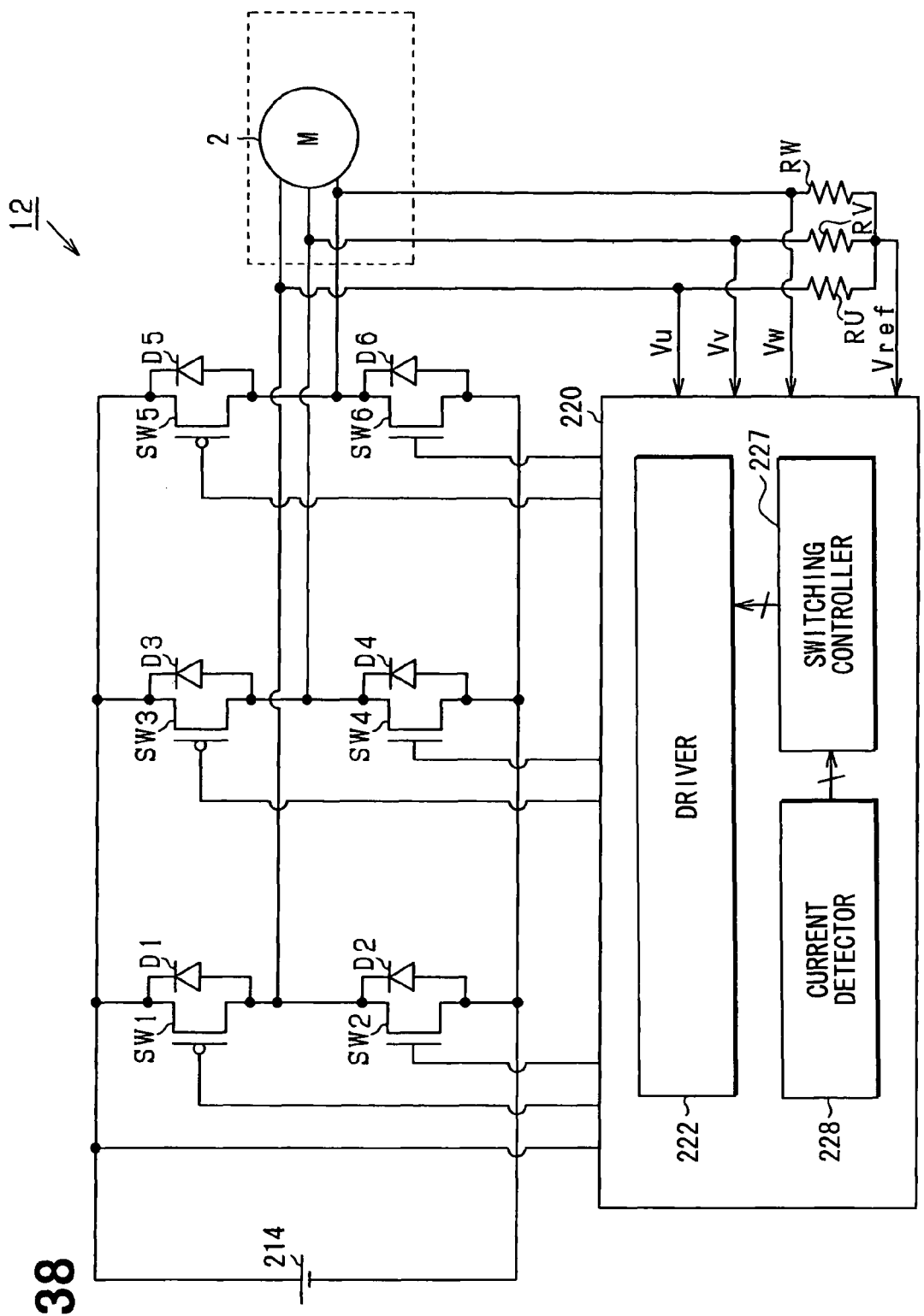
FIG. 38 is a circuit diagram illustrating a rotary machine driving apparatus in an eleventh embodiment.

In an eleventh embodiment, a rotary machine driving apparatus is constructed as shown in FIG. 38 in the similar manner as in the sixth embodiment (FIG. 18) and the ninth embodiment (FIG. 31). In this embodiment, however, a current detector 228 is provided in place of the voltage detector 225 (FIG. 18). Thus, currents passed through the switching elements SW1 to SW6 are detected based on their on resistances. That is, the current detector 228 includes detection transistors for detecting the currents respectively passed through the switching elements SW1 to SW6. The sources of the switching elements SW1 to SW6 and the corresponding detection transistors are short-circuited together and their gates are short-circuited together, and current mirror circuits are thereby constructed. Thus, the currents passed through the switching elements SW1 to SW6 can be detected based on the output currents of the detection transistors. In actuality, it is desirable that the current detector 228 should be formed in proximity to the inverter 12. For information, a technique for constructing a current mirror circuit to detect a current is disclosed in, for example, JP-A-10-256541.

The switching controller 227 turns on and off the switching elements SW1 to SW6 through the driver 222. In this example, it basically carries out switching control by a 120°-energization method. More specifically, a virtual neutral point voltage (reference voltage Vref) is obtained as a result of voltage division by resistive elements RU, RV, RW with respect to the terminal voltages Vu, Vv, Vw of the respective phases of the brushless motor 2. Based on time point with which this virtual neutral point voltage agrees with the terminal voltage Vu, Vv, Vw of each phase of the brushless motor 2, time point (zero-crossing time point) with which an induced voltage agrees with the reference voltage Vref is detected. Then, it changes the operation of the switching elements SW1 to SW6 with time point (specified time point) delayed from the zero-crossing time point by a predetermined electrical angle (e.g., 30°). When the current detected by the current detector 228 exceeds a current limit value, however, the following measure is taken to limit the current (amount of energization) passed through the brushless motor 2. Instead of taking a period of 120° as a period for which the switching elements SW2, SW4, SW6 are turned on, PWM control is carried out during this period.

The switching controller 227 may be constructed as a logic circuit or may be constructed as a central processing unit and a storage unit for storing a program.

Figure 39:
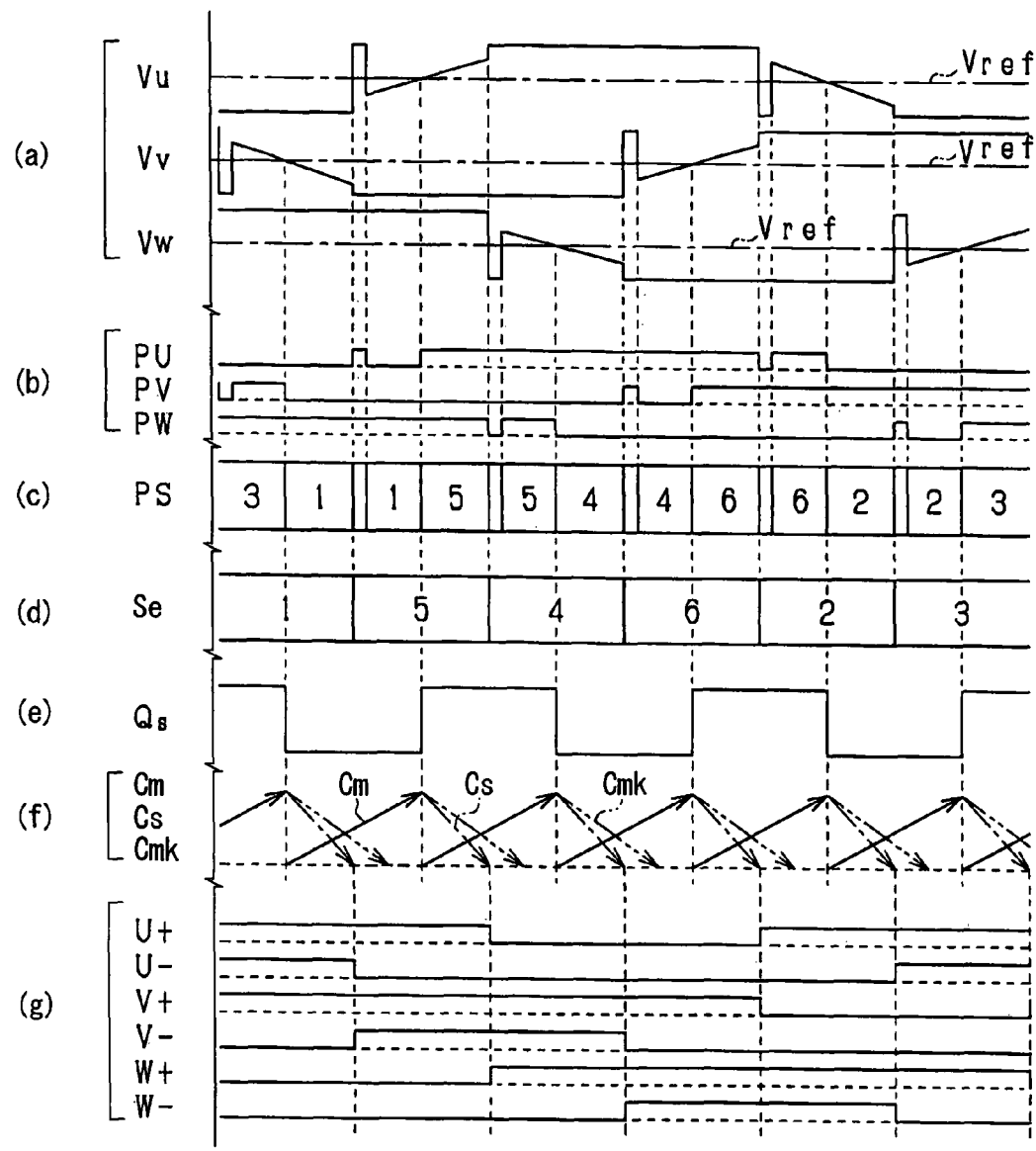
FIG. 39 is a signal diagram illustrating a mode for 120°-energization control.

FIG. 39 illustrates the way switching control is carried out by the switching controller 227 in 120°-energization control. Specifically, (a) illustrates the transition of the terminal voltages Vu, Vv, Vw indicated by solid lines and the reference voltage Vref. In this embodiment, the virtual neutral point voltage is used for the reference voltage Vref. Though, in actuality, the reference voltage Vref fluctuates, it is considered to be constant here for the sake of simplicity. (b) illustrates the transition of the results of comparison of the terminal voltages Vu, Vv, Vw with the reference voltage Vref for magnitude (comparison signals PU, PV PW). (c) illustrates the transition of a logically combined signal PS of the comparison signals PU, PV, PW. (d) illustrates the transition of a logically combined signal (expectation signal) Se of the comparison signals PU, PV, PW expected when the zero-crossing time occurs while the switching elements SW1 to SW6 are in operation. (e) illustrates the transition of a detection signal Qs with respect to zero-crossing time point. This is a signal whose rising edges and falling edges are synchronized with zero-crossing time point. (f) illustrates the transition of the values on various counters, and (g) illustrates the transition of actuating signals for the switching elements SW1 to SW6. The actuating signals illustrated in (g) include actuating signals U+, V+, W+ for the high side switching elements SW1, SW3, SW5 of the arms of the respective phases and actuating signals U−, VW− for the low side switching elements SW2, SW4, SW6 of the arms of the respective phases. The high side switching elements SW1, SW3, SW5 of the arms of the respective phases are P-channel transistors; therefore, the periods for which these actuating signals U+, V+, W+ are at logical L are the periods for which they are on.

The combined signal PS is a three-bit signal, and the respective logical values of the comparison signals PU, PV, PW respectively agree with the logical values of its highest order bit, intermediate bit, and lowest-order bit. That is, when the comparison signal PU is at logical H the highest-order bit is set to 1; and when the comparison signal PU is at logical L the highest-order bit is set to 0. For this reason, when the comparison signals PU, PV, PW are respectively at H, L, and H, for example, the combined signal PS is set to 101 in binary notation and 5 in decimal notation. In FIG. 39, both the combined signal PS and the expectation signal are represented in decimal notation.

The solid lines in (f) indicate the value Cm of a measuring counter for measuring a time interval between adjacent zero-crossing times. As illustrated, the count Cm of the measuring counter is initialized each time the zero-crossing time occurs, and newly starts time counting operation. A time interval between adjacent zero-crossing times has correlation with rotational speed. For this reason, the value Cm of the counter immediately before it is initialized (the maximum value of the counter) provides a parameter having correlation with rotational speed.

The one-dot chain line in (f) indicates the value Cs of a specified time point setting counter that counts a time required from when zero-crossing time point occurs to when specified time point occurs and thereby sets a specified time point. The specified time point setting counter takes the value of the counter before initialization as its initial value at the zero-crossing time and decrements it. Then, it sets the time point with which the value is zeroed as a specified time point. At this time, the following operation is performed. When the interval between zero-crossing time point and specified time point is 30°, for example, the decrement speed is set to twice the increment speed of the measuring counter. In consideration of that the time interval between adjacent zero-crossing times is 60°, it can be thought that this setting makes it possible to delay the time point with which the value of the specified time point setting counter becomes 0 by 30° from the zero-crossing time point.

The two-dot chain lines in (f) indicate the value Cmk of a masking period counter. The masking period counter determines a masking period for which detection of the zero-crossing time based on the comparison of the terminal voltages Vu, Vv, Vw with the reference voltage Vref for magnitude is inhibited (disabled). This counter is for preventing the following event. When the terminal voltages Vu, Vv, Vw agree with the reference voltage Vref during a period for which a current is supplied through the diodes D1 to D6, the zero-crossing time is erroneously detected. This counter also takes the value of the counter before initialization as its initial value at the zero-crossing time and decrements it. Then, it sets the period before the value is zeroed as a masking period.

When the masking period is set to a period from the zero-crossing time to 45°, for example, the decrement speed can be set to ½ times the increment speed of the measuring counter.

When the value of the masking period counter is zeroed, the comparison signals PU, PV, PW and the combined signal PS are enabled. When the combined signal PS agrees with the expectation signal during this period, the detection signal Qs is inverted. At the zero-crossing time when the detection signal Qs is inverted, the specified time point setting counter starts decrementing, and when its value is zeroed, the operation of the switching elements SW1 to SW6 is changed.

The specified time point with which the switching elements SW1 to SW6 are turned on and the zero-crossing time point have one-to-one correspondence with each other. For this reason, the behavior of the terminal voltages Vu, Vv, Vw of the respective phases is uniquely determined according to the operating state of the switching elements SW1 to SW6. Consequently, the above expectation signal can be uniquely determined.

Figure 40:
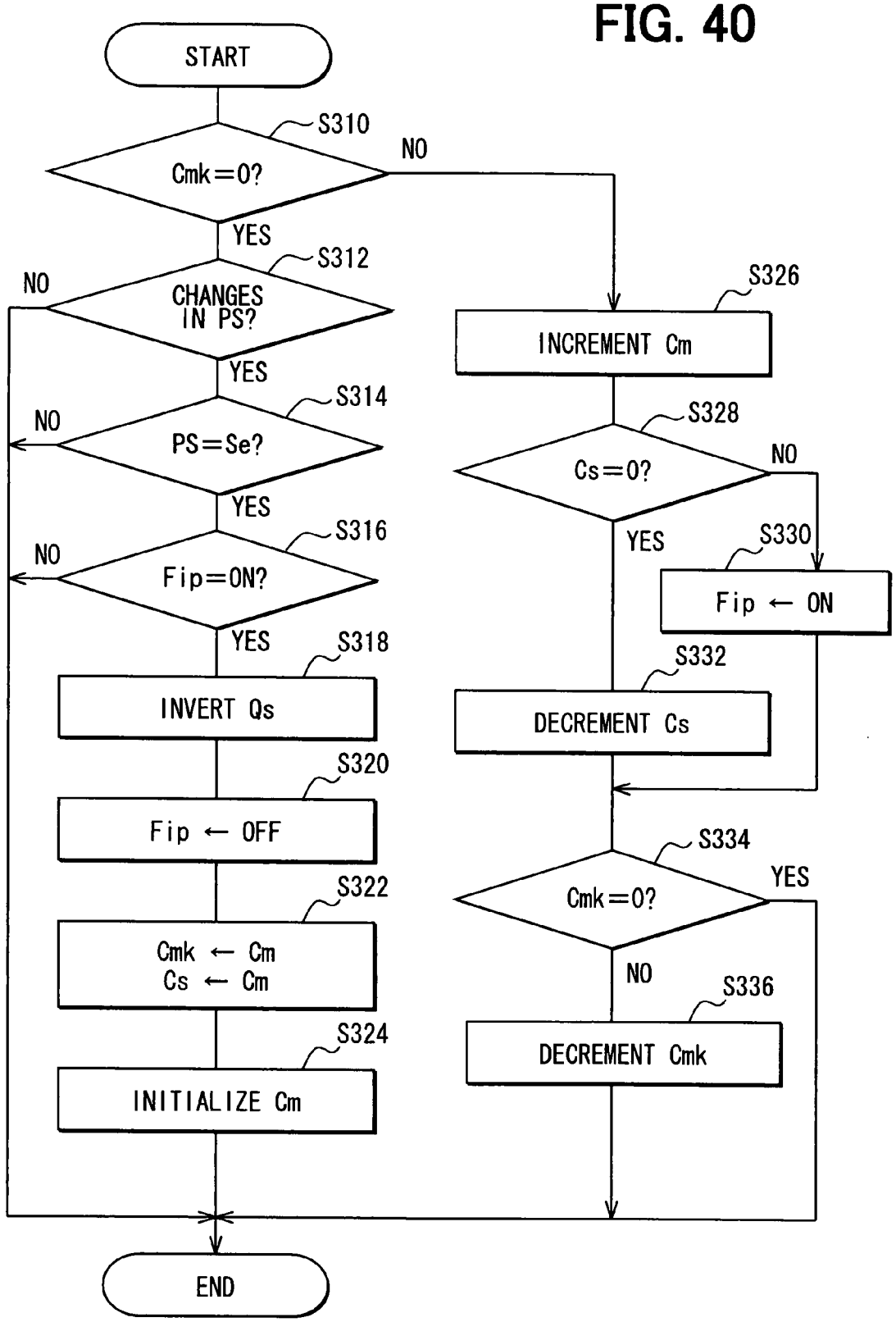
FIG. 40 is a flowchart illustrating processing for operating switching elements.
Figure 41:
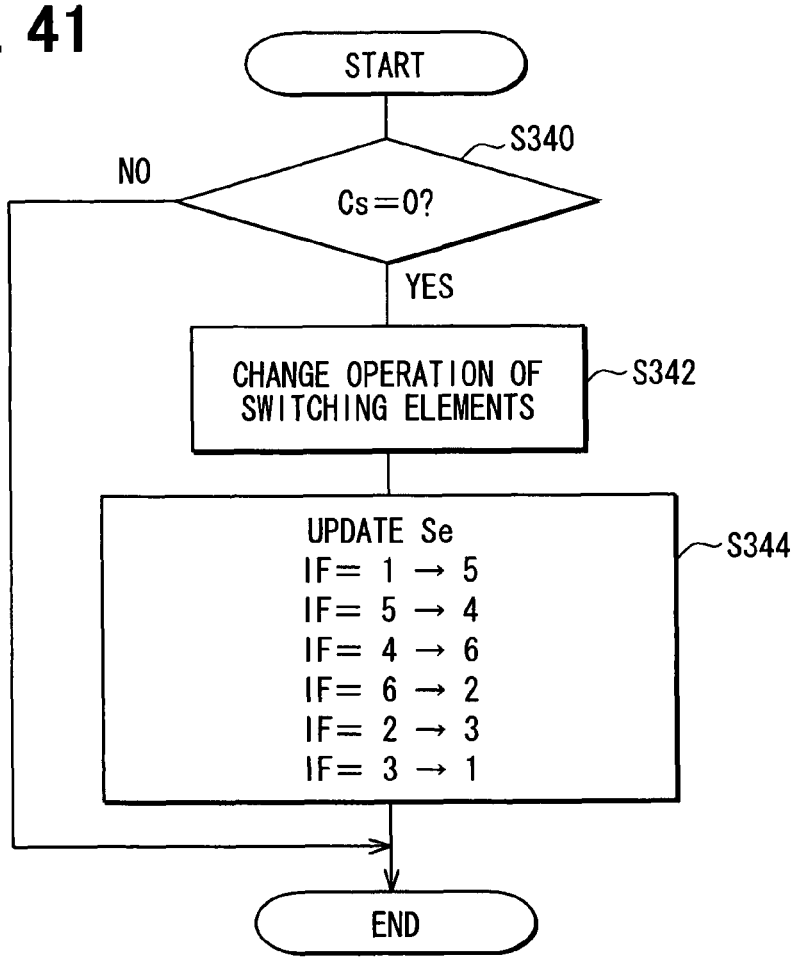
FIG. 41 is a flowchart illustrating processing for changing the operation of the switching elements.

Next, processing for 120°-energization control is carried out as illustrated in FIG. 40 and FIG. 41. The processing for setting the counter values on the above three counters is repeatedly carried out by the drive control circuit 220, for example, in a predetermined cycle.

In this series of processing, at S310, it is checked whether or not the value Cmk of the masking period counter is 0. When it is determined that the value is zero, it is determined at S312 whether or not the combined signal PS of the comparison signals PU, PV, PW has varied. When it is determined at S312 that the combined signal PS has varied, it is determined at S314 whether or not the combined signal PS and the expectation signal Se agree with each other. This processing is for determining whether or not change in the magnitude relation between the terminal voltages Vu, Vv, Vw and the reference voltage Vref agrees with change assumed from the operating state of the switching elements SW1 to SW6. When it is determined that the combined signal PS and the expectation signal Se agree with each other, it is checked whether or not an inversion permission flag Fip is set to ON. The inversion permission flag Fip is a flag that is set to ON when the detection signal Qs has not been inverted yet after the value Cmk of the masking period counter was zeroed. For this reason, when the combined signal PS and the expectation signal Se agree with each other for the first time after the value of the masking period counter was zeroed, the inversion permission flag Fip is set to ON.

When the inversion permission flag is set to ON, the detection signal Qs is inverted at S318. At S320, the inversion permission flag is set to OFF. At S322, subsequently, the value Cm of the measuring counter is taken as the values Cs and Cmk on the specified time point setting counter and the masking period counter. At S324, the measuring counter is initialized (Cm=0).

When a negative determination is made at S310, the value Cm of the measuring counter is incremented at S326. At S328, subsequently, it is checked whether or not the value Cs of the specified time point setting counter is zero. When the value of the specified time point setting counter is zero, the above inversion permission counter is set to ON at S330. When the value Cs of the specified time point setting counter is not zero, the value Cs of the specified time point setting counter is decremented at S332.

When the processing of S330 or S332 is completed, it is determined at S334 whether or not the value Cmk of the masking period counter is zero. When the value of the masking period counter is not zero, the masking period counter is decremented at S336.

When an affirmative determination is made at S334, when a negative determination is made at any of S312 to S316, and when the processing of S336 is completed, this series of processing is once terminated.

The processing of FIG. 41 is for changing the operation of the switching elements SW1 to SW6 based on the above specified time point setting counter in 120°-energization control. This processing is repeatedly carried out by the drive control circuit 220, for example, in a predetermined cycle.

In this processing, at S340, it is checked whether or not the value Cs of the specified time point setting counter has been zeroed. This processing is for determining whether or not it is the time to change the operation of the switching elements SW1 to SW6. When it is determined that the value of the specified time point setting counter has been zeroed, the operation of the switching elements SW1 to SW6 is changed at S342. The operation of the switching elements is changed based on an operation pattern (switching pattern) of the switching elements SW1 to SW6. More specifically, though the operation pattern of the switching elements SW1 to SW6 is changed at intervals of electrical angle of 60° as illustrated in FIG. 39, it has 360°-periodicity. For this reason, the next operating state of the switching elements SW1 to SW6 is uniquely determined from the present operating state. Consequently, the operation of the switching elements SW1 to SW6 is changed based on this unique relation.

At S344, subsequently, the expectation signal Se is updated. When the operating state of the switching elements SW1 to SW6 changes, it is presumed that one zero-crossing time occurs during a period for which this operating state is maintained. The values of the comparison signals PU, PV, PW at this zero-crossing time are uniquely determined from the operating state. For this reason, the expectation signal Se is updated to a value corresponding to the present operating state. Specifically, the following processing is carried out. If the previous expectation signal is 1, the present expectation signal is set to 5; if the previous expectation signal is 5, the present expectation signal is set to 4; if the previous expectation signal is 4, the present expectation signal is set to 6; if the previous expectation signal is 6, the present expectation signal is set to 2; if the previous expectation signal is 2, the present expectation signal is set to 3; and if the previous expectation signal is 3, the present expectation signal is set to 1.

When a negative determination is made at S340 and when the processing of S444 is completed, this series of processing is once terminated.

According to the above processing, 120°-energization control can be appropriately carried out.

Figure 42:
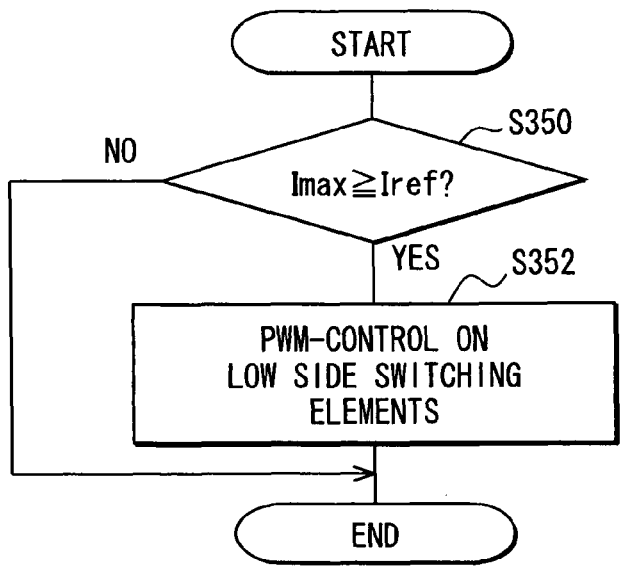
FIG. 42 is a flowchart illustrating processing in PWM control.

FIG. 42 illustrates processing in the above PWM control. This processing is repeatedly carried out by the drive control circuit 220, for example, in a predetermined cycle.

In this processing, at S350, it is determined by the current detector 228 illustrated in FIG. 38 whether or not the maximum value of currents Imax passed through the individual phases of the brushless motor 2 exceeds a threshold value Iref. This threshold value Iref can be set, for example, based on the maximum value of currents permitted in the switching elements SW1 to SW6. When it is determined that the threshold value is exceeded, PWM processing is carried at S352. In this processing, the low side switching elements SW2, SW4, SW6 of the arms of the inverter 12 are repeatedly turned on and off during an ON period (On-permitted period) determined by the above specified time point. When a negative determination is made at S350 and when the processing of S352 is completed, this series of processing is once terminated.

Figure 43:
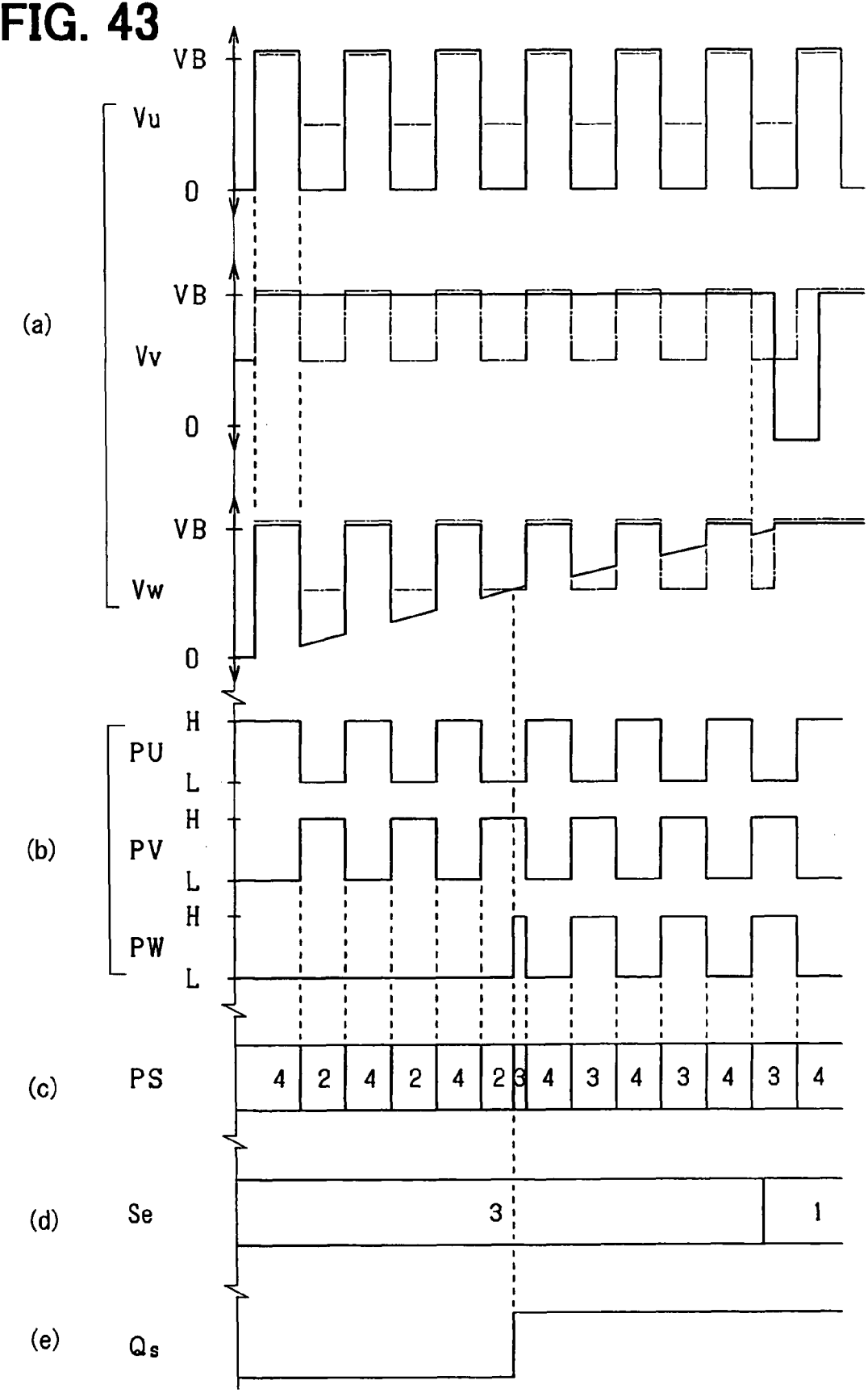
FIG. 43 is a signal diagram illustrating a mode for PWM control.

When the above PWM control is carried out, the terminal voltages Vu, Vv, Vw frequently vary. According to the processing illustrated in FIG. 40, however, zero-crossing time point can be detected with accuracy even in this case. FIG. 43 illustrates the way switching control is carried out in PWM control. (a) to (e) in FIG. 43 correspond to (a) to (e) in FIG. 39, respectively.

This figure illustrates the way PWM control is carried out during an ON operation-permitted period for the low side switching element SW2 of the U-phase arm (a period for which it is on in 120°-energization control). As illustrated, the U-phase terminal voltage Vu rises and becomes higher than the positive voltage VB of the battery 214 each time the switching element SW2 is switched from ON state to OFF state. This is because, when the switching element SW2 is switched from ON state to OFF state, a voltage that will keep the current supplied to the U-phase when it was ON, passed is produced by the inductance component of the brushless motor 2. At this time, the switching elements SW1, SW2 of the U-phase are both OFF; therefore, a current is supplied through the U-phase through the diode D1. For this reason, the U-phase terminal voltage Vu becomes higher than the positive voltage VB of the battery 214 approximately by an amount equivalent to voltage drop in the diode D1.

Since the switching elements SW5, SW6 of the W-phase are both OFF at this time, the W-phase is brought to a high-impedance state. The W-phase terminal voltage Vw at this time is pulled up by the V-phase terminal voltage Vv and the U-phase terminal voltage Vu that have become equal to the positive voltage VB of the battery 214 as a result of the switching element SW3 being turned on. Therefore, it becomes higher than the positive voltage VB of the battery 214. For this reason, the reference voltage Vref set by the virtual neutral point also becomes higher than the positive voltage VB of the battery 214 each time the switching element SW2 is turned off. Though the reference voltage Vref is lower than the U-phase terminal voltage Vu when the switching element SW2 is turned off, it is higher than the W-phase terminal voltage Vw at that time. For this reason, the W-phase terminal voltage Vw is kept lower than the reference voltage Vref until the W-phase induced voltage becomes equal to or higher than the reference voltage Vref.

Thus, the comparison signal PW is brought to logical H for the first time when the zero-crossing time occurs. As illustrated in FIG. 40, therefore, the change time point of the detection signal Qs and the zero-crossing time point can be brought into one-to-one correspondence with each other by taking the following measure. The detection signal Qs is inverted when the combined signal PS agrees with the expectation signal for the first time. When the switching element SW2 is turned off, the W-phase terminal voltage Vw can alternately take a value higher than and a value lower than the reference voltage Vref. Even in this case, a time when the combined signal PS and the expectation signal agree with each other for the first time can be taken as the zero-crossing time. This is because in this case, only the following takes place. The combined signal of 4 in the figure is replaced with 5.

Meanwhile, when a one-bit combined signal is generated from the comparison signals PU, PV, PW as illustrated in FIG. 12, the combined signal is frequently inverted in PWM control. Therefore, zero-crossing time point cannot be detected.

In reality, the comparison signal PW may be instantaneously brought to logical H before the zero-crossing time occurs because of ringing noise in conjunction with change of the operation of the switching elements SW1 to SW6. In this case, however, the logical value of the comparison signal PU is likely to differ from that indicated in FIG. 43. Therefore, the possibility that the three-bit combined signal PS and the expectation signal agree with each other before the zero-crossing time occurs is minimized.

To more reliably avoid the erroneous detection of zero-crossing time point due to the influence of ringing noise, it is desirable to take the following measure. Of the values of the combined signal PS, those whose duration is equal to or shorter than a predetermined value are not compared with the expectation signal. This processing can be accomplished, for example, by taking the following measure. The combined signal PS is sampled with a high-speed sampling period, and values that differ twice or more in adjacent sampling periods are considered to be influenced by noise and excluded. The above erroneous detection can also be more reliably avoided by slightly offset correcting the reference voltage Vref generated based on the virtual neutral point.

According to this embodiment described in detail, the following advantages can be provided.

(1) The combined signal (expectation signal Se) of the comparison signals PU, PV, PW assumed when the zero-crossing time occurs in the present operating state of the switching elements SW1 to SW6 is compared with the actual combined signal PS with respect to each phase. Based on the results of these comparisons, information pertaining to the electrical angle of the brushless motor 2 is acquired. Thus, more elaborate information can be used as compared with cases where a one-bit combined signal of the comparison signals PU, PV, PW is used. For this reason, highly accurate information can be acquired with respect to electrical angle.

(2) Zero-crossing time point is detected based on agreement between the assumed values of the comparison signals PU, PV, PW and the actual values with respect to all the phases. In other words, zero-crossing time point is detected based on agreement between the three-bit combined signal PS and the expectation signal with respect to all the bits. Thus, conditions for detecting zero-crossing time point can be made stricter as compared with cases where a time when a one-bit combined signal indicating the results of comparison with respect to all the phases varies is taken as the zero-crossing time. For this reason, zero-crossing time point can be detected with accuracy.

(3) A specified time point that provides a basis for changing the operating state of the switching elements SW1 to SW6 is set based on zero-crossing time point. Thus, a specified time point can be appropriately set.

(4) Specified time point and zero-crossing time point are brought into one-to-one correspondence with each other. As a result, the operating state of the switching elements SW1 to SW6 is also brought into one-to-one correspondence with the zero-crossing time point. Therefore, the comparison signals PU, PV, PW (expectation signal) assumed when the zero-crossing time occurs in the present operating state of the switching elements SW1 to SW6 can be uniquely determined.

(5) The reference voltage Vref is set by the virtual neutral point voltage of the brushless motor 2. When a current supplied to the brushless motor 2 is excessively large, PWM control is carried out in the respective ON operation-permitted periods for the switching elements SW2, SW4, SW6, determined by the specified time point, and operation is switched between ON operation and OFF operation. In this case, zero-crossing time point cannot be detected by a one-bit logically combined signal of the comparison signals PU, PV, PW. According to this embodiment, meanwhile, zero-crossing time point can be determined with accuracy based on comparison of the expectation signal with the combined signal PS, both of which are three-bit signals.

In the eleventh embodiment, zero-crossing timing is detected based on agreement between the combined signal PS and the expectation signal Se with respect to all the bits. However, for example, zero-crossing time point may be detected based on agreement between bits corresponding to a phase in which the induced voltage and the reference voltage Vref zero-cross each other in the PWM control.

Twelfth Embodiment

A twelfth embodiment is similar to the ninth embodiment (FIG. 31 to FIG. 36).

If the battery 214 and the inverter 12 are insufficiently connected resulting in electrical disconnection therebetween or any other like event occurs, the following phenomenon can take place. Because of transmission of vibration of the vehicle to the battery 214 or any other like reason, the battery 214 and the inverter 12 may be instantaneously disconnected from each other and then conduction is established between them again. If power supply to the brushless motor 2 is temporarily interrupted at this time, the rotational speed of the brushless motor 2 is reduced. If fuel discharged from a fuel tank to the upstream side by a fuel pump flows back at this time, force on the reverse rotation side is exerted on the brushless motor 2 and this can eventually cause reverse rotation. If, in this situation, the switching elements SW1 to SW6 are operated as under normal conditions, an oscillation phenomenon that the brushless motor 2 repeats normal rotation and reverse rotation occurs. It is difficult to control the brushless motor 2 in a proper rotating state.

Figure 44:
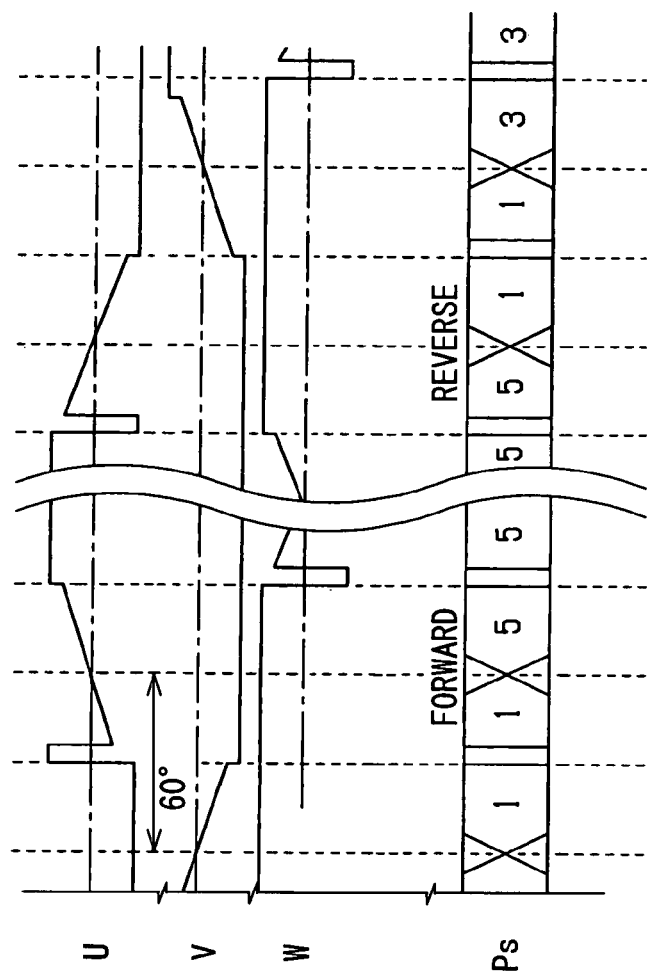
FIG. 44 is a signal diagram illustrating a mode of reverse rotation.
Figure 45:
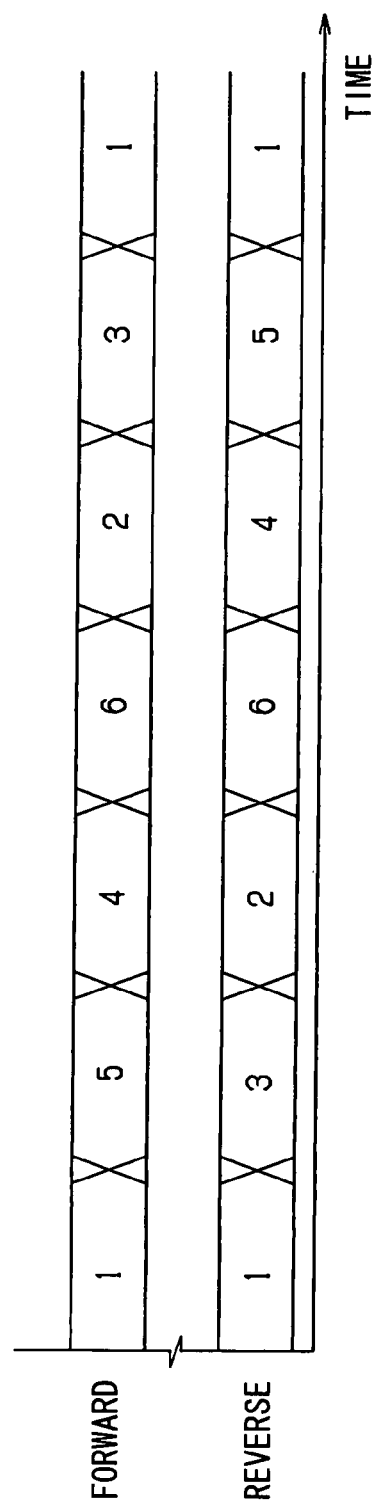
FIG. 45 is an operation diagram illustrating a relation between forward rotation and reverse rotation.

That the brushless motor 2 is rotating in reverse can be appropriately detected based on the above combined signal PS composed of three bits. More specifically, as illustrated in FIG. 44, when the brushless motor 2 rotates normally (in the forward direction), time-series data on the combined signal PS should agree with time-series data on the expectation signal Se. When the brushless motor 2 is rotating, meanwhile, time-series data on the combined signal PS should agree with data obtained by time-reversing time-series data on the expectation signal as illustrated in FIG. 45. For this reason, reverse rotation of the brushless motor 2 can be detected based on the combined signal PS.

It is possible that, when the rotating state of the brushless motor 2 becomes abnormal, all the switching elements SW1 to SW6 are turned off and the operation waits until the brushless motor 2 stops. Then, the brushless motor is restarted. In this case, however, it takes a long time to restore the brushless motor 2 to a normal state.

Figure 46:
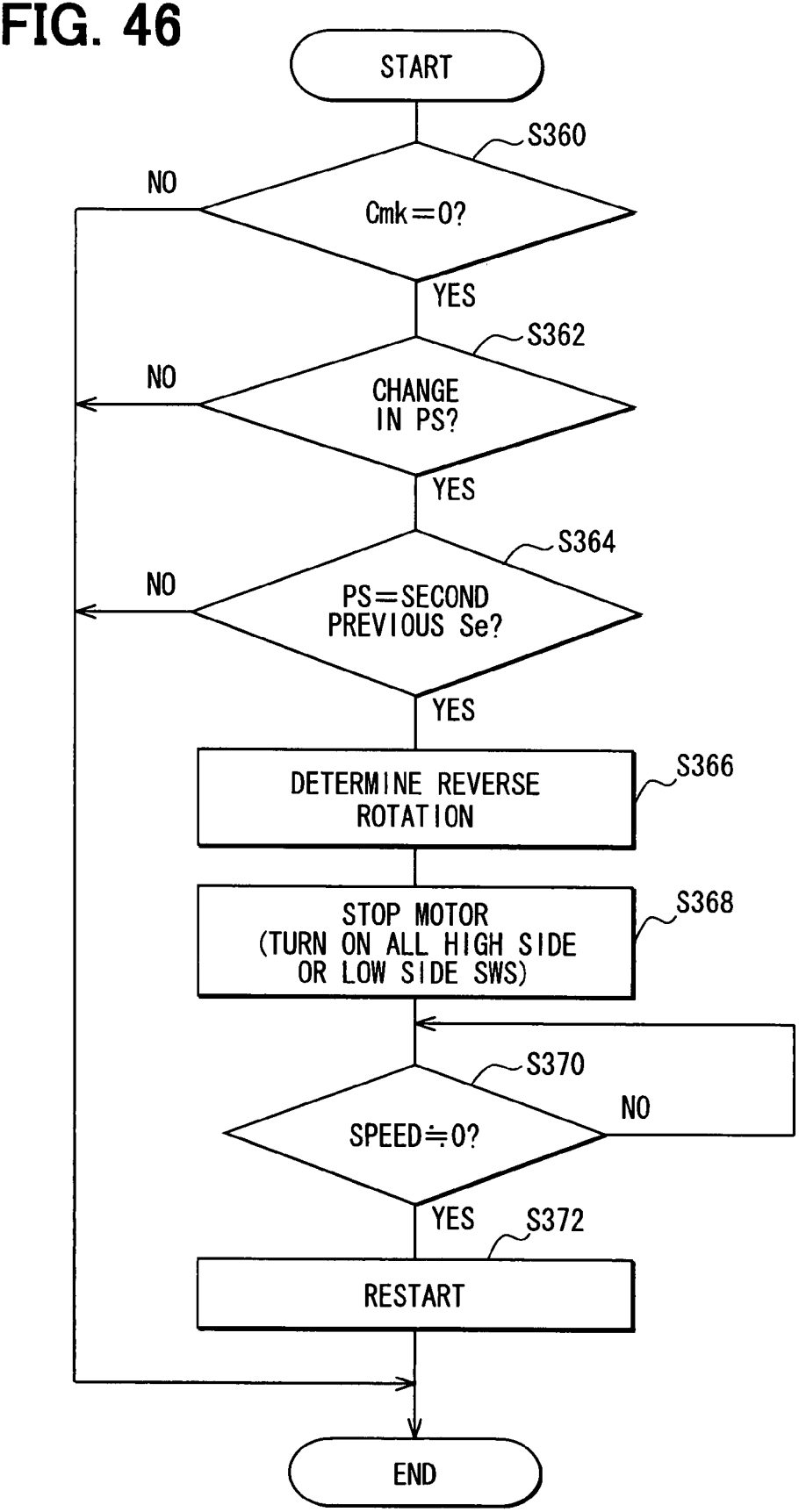
FIG. 46 is a flowchart illustrating processing for restarting a brushless motor in a twelfth embodiment.

To cope with this, the following processing is carried out in this embodiment. When it is detected that the brushless motor 2 rotates in reverse, processing is carried out to forcibly stop the rotation of the brushless motor 2 and then restart processing is carried out. FIG. 46 illustrates processing for restarting the brushless motor 2 in this embodiment. This processing is repeatedly carried out by the drive control circuit 220, for example, in a predetermined cycle.

This series of processing is carried out as follows. At S360, it is checked whether or not the value Cmk of the masking period counter is zero. When it is determined that the value of the masking period counter is zero, it is determined at S362 whether or not the combined signal PS of the comparison signals PU, PV, PW has changed. This processing is for determining whether or not it is the zero-crossing time. When it is determined that the combined signal PS has changed, it is determined at S364 whether or not the present combined signal agrees with the expectation signal before the last. This processing is for determining whether or not the brushless motor 2 is rotating in reverse. More specifically, as illustrated in FIG. 44 and FIG. 45, when the brushless motor 2 is rotating in reverse, time-series data on the combined signal PS is reversed. Therefore, it is presumed that the present combined signal PS agrees with the expectation signal before the last. When the present combined signal PS agrees with the expectation signal Se before the last, it is determined at S66 that the brushless motor 2 is rotating in reverse.

At S368, subsequently, processing is carried out to forcibly stop the rotation of the brushless motor 2. Specifically, the switching elements SW1, SW3, SW5 or the switching elements SW2, SW4, SW6 are all turned on to short-circuit all the phases of the brushless motor 2. Thus, a current is supplied through the brushless motor 2 only by an induced voltage produced in conjunction with the rotation of the brushless motor 2. This current is quickly attenuated by the resistance of the current passage and the like. As a result, the rotational energy of the brushless motor 2 is converted into electrical energy and then attenuated. For this reason, the brushless motor 2 can be quickly stopped.

When the rotational speed of the brushless motor 2 is substantially zeroed (S370: YES), restart processing is carried out at S372. The rotational speed of the brushless motor 2 is calculated based on time intervals between adjacent zero-crossing time points. This can be done by using the maximum value of Cm of the measuring counter.

When a negative determination is made at any of S360 to S364 or when the processing of S372 is completed, this series of processing is once terminated.

According to this embodiment, the following advantages can be provided in addition to the advantages (1) to (5) of the eleventh embodiment.

(6) The rotating state of the brushless motor 2 is determined to be abnormal based on disagreement between the combined signal PS assumed when the zero-crossing time occurs in the present operating state of the switching elements SW1 to SW6 and the expectation signal. The use of the three-bit combined signal PS and the three-bit expectation signal Se makes it possible to appropriately determine the presence or absence of an abnormality.

(7) The presence of an abnormality that the brushless motor 2 rotates in reverse is determined based on agreement between what is obtained by time-reversing the time-series pattern of the combined signal PS assumed from the time-series pattern of the operating state of the switching elements SW1 to SW6 and the actual time-series pattern. Thus, that the brushless motor 2 is rotating in reverse can be appropriately detected.

(8) When it is determined that the brushless motor 2 is rotating in reverse, processing is carried out to forcibly stop the brushless motor 2 and thereafter the brushless motor 2 is restarted. Thus, the brushless motor 2 can be quickly restored to normal state.

(9) Conduction is established from all the phases of the brushless motor 2 to either the positive pole or the negative pole of the battery 214 to forcibly stop the brushless motor 2. Thus, the rotational energy of the brushless motor 2 can be quickly reduced.

In the twelfth embodiment, all the phases of the brushless motor 2 are short-circuited to forcibly stop the brushless motor 2. Instead, switching of the switching elements SW1 to SW6 may be controlled so as to generate torque for stopping the rotation. Further, the reverse rotation is detected on condition that the combined signal PS agrees with the expectation signal before the last. Reverse rotation may be detected when the next combined signal PS agrees with the expectation signal preceding the expectation signal before the last, in addition to this condition.

Thirteenth Embodiment

A third embodiment is directed to improve the following problem. That is, when any of phase lines of the brushless motor 2 is disconnected, the inverter 12 supplies a voltage to the lines of the motor 2 which are not disconnected. However, it is likely that flow of the current will be impaired and an excessive load will be exerted on the brushless motor 2. It is therefore proposed by JP 2-290191A to determine whether a phase current flows by using a shunt resistor and detect presence/absence of disconnection based on this determination. In this instance, however, a sensing element is necessitated to sense a voltage drop at the shunt resistor. This will increase the size of the circuit of the drive control circuit 220.

According to this embodiment, therefore, the presence/absence of disconnection is detected based on the comparison signals PU, PV, PW. Since those comparison signals PU, PV, PW are taken in by the control circuit 220 to be used to operate the switching elements SW1 to SW6. Therefore, by detecting the disconnection based on those signals, increase of the size of the circuit can be avoided. The principle of detecting the disconnection based on the comparison signals PU, PV, PW is described first.

Figure 47:
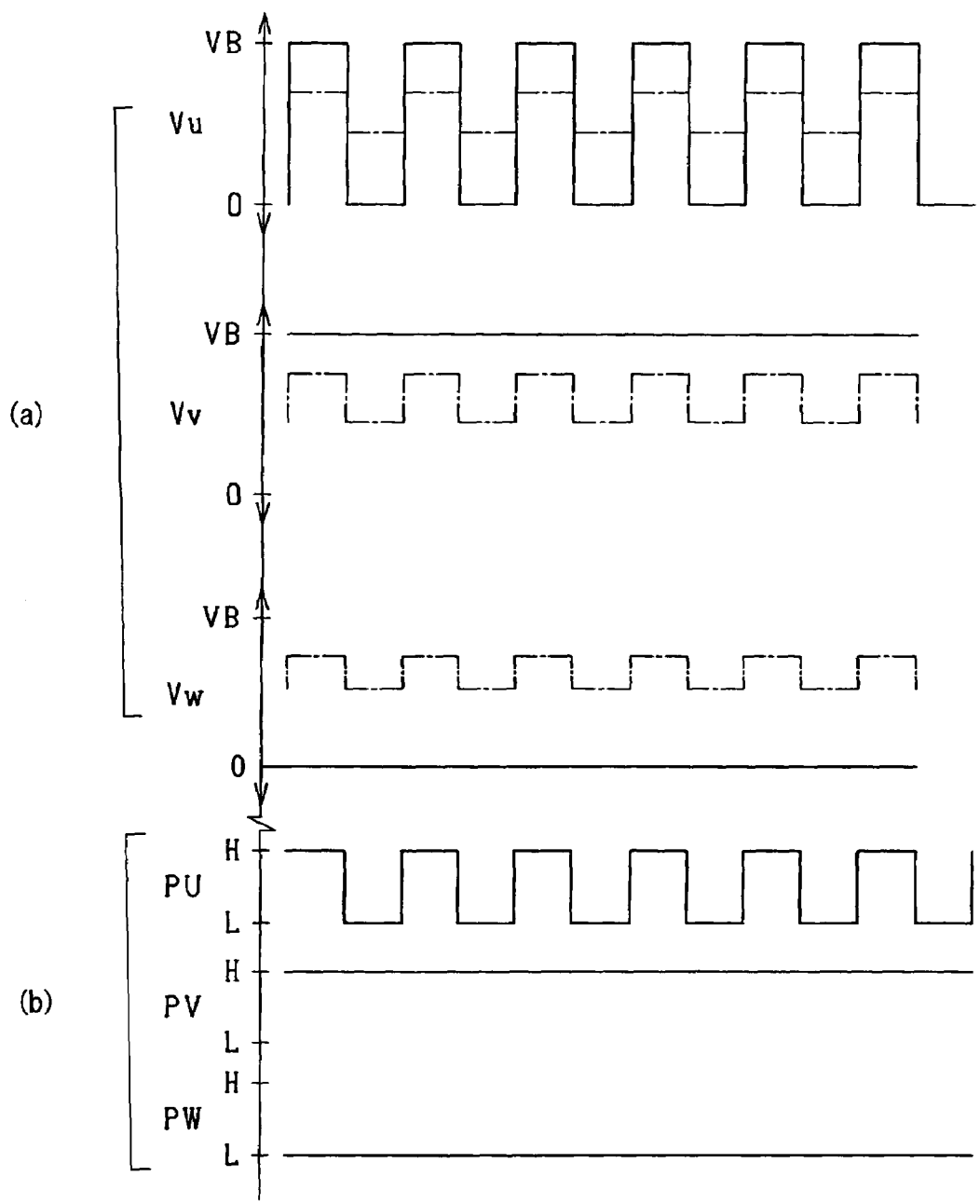
FIG. 47 is a signal diagram illustrating a principle of wire disconnection in a thirteenth embodiment.

As described above, the comparison signals PU, PV PW changes as illustrated in (b) of FIG. 43. Here, since the reference voltage Vref exceeds the positive pole voltage VB of the battery 214, when the switching elements, which are PWM-controlled, are switched from ON to OFF. As a result, the comparison signal of a phase in which the switching element is continue to be ON is reversed in logic value. If the brushless motor 2 is in the disconnected condition, as illustrated in FIG. 47, the comparison signal is not reversed in logic value. Here, (a) and (b) of FIG. 47 correspond to (a) and (b) of FIG. 43, and illustrate a case, in which the phase line of W-phase of the brushless motor 2 is disconnected at a side closer to the brushless motor 2 than a junction with the resistive element RW.

As illustrated in FIG. 47, the terminal voltage Vw of the W-phase falls to about the negative pole voltage of the battery 214. This is because, although the W-phase is in the high impedance state in the example illustrated in FIG. 47, the potential in the W-phase is decreased toward the negative potential of the battery 214 due to parasitic capacitance between the gate and the drain of the switching element SW6 and the like. In this case, when the switching element SW2 is switched from OFF to ON, current flows in the diode D1. As a result, the terminal voltage Vu of the U-phase increases above the positive pole voltage VB of the battery 214, but the reference voltage Vref falls below the positive pole voltage VB of the battery 214. This is because the terminal voltage of the W-phase is decreased by the disconnection.

For this reason, irrespective of the condition of the switching element SW2, the reference voltage Vref continues to be lower than the terminal voltage Vu of the V-phase connected to a side of the positive pole voltage VB of the battery 214. Thus, as illustrated in (b) of FIG. 47, the comparison signal PV of the V-phase continues to be H and is different from the state illustrated in (b) of FIG. 43. Therefore, the disconnection of the brushless motor 2 can be detected based on the difference between these states.

Although FIG. 47 illustrates a case where disconnection occurs in a phase (to be changed to the high impedance) in which the switching elements in both the high side arm and the low side arm are turned off. The disconnection can be detected in the similar manner by using the comparison signal PV even when a phase (U-phase in FIG. 47) which is PWM-controlled is disconnected. This is because, since the terminal voltage Vu of the U-phase of the battery 214 continues to be the negative pole voltage of the battery 214, the reference voltage Vref does not exceed the positive pole voltage VB of the battery 214.

Figure 48:
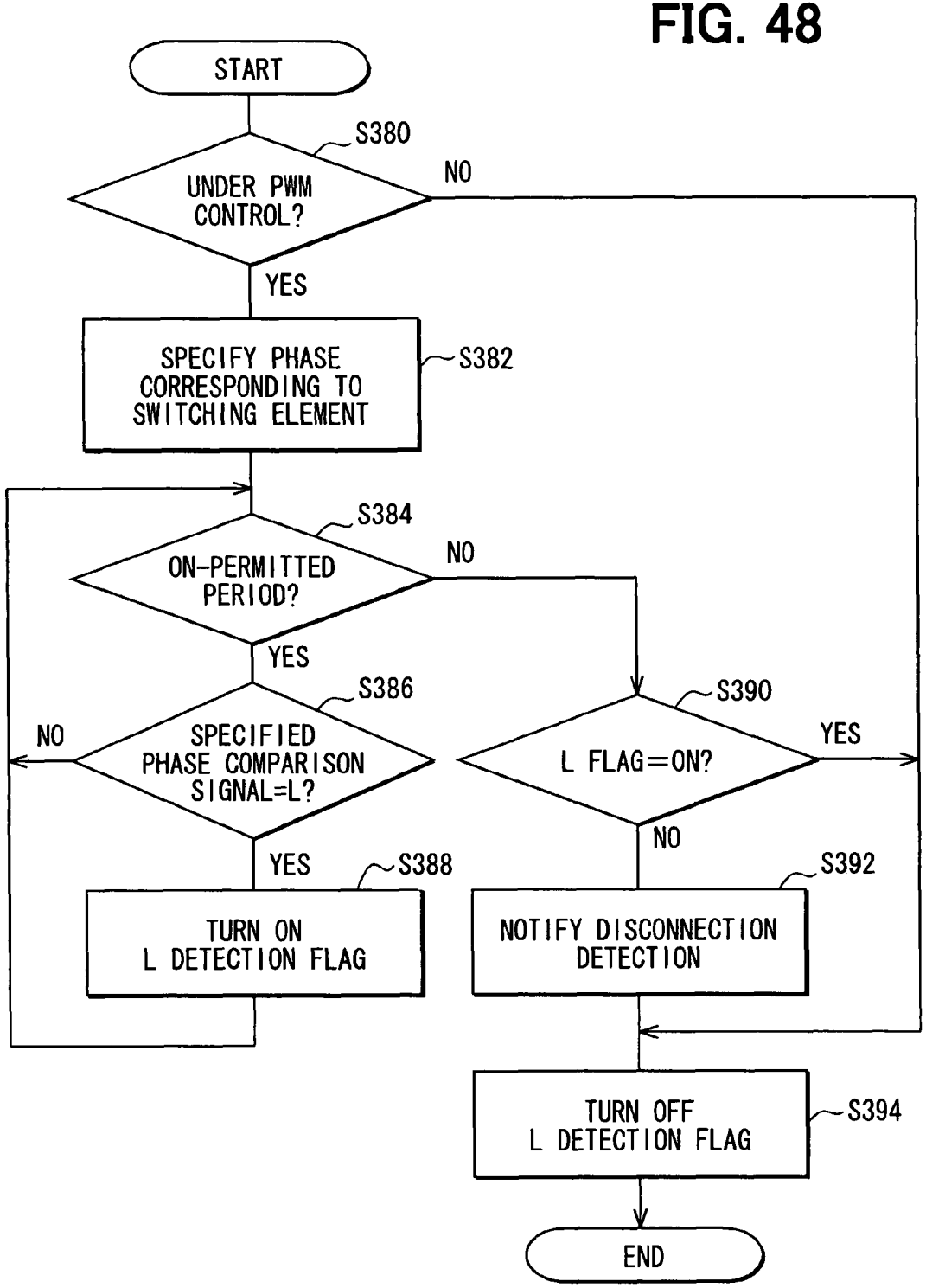
FIG. 48 is a flowchart illustrating processing for detecting wire disconnection.

FIG. 48 illustrates processing of detecting disconnection. This processing is carried out repeatedly by the control circuit 220, for example, in a predetermined period.

In a series of this processing, at S380, it is checked whether the PWM control, which is carried out at S352 in FIG. 42, is being carried out. If it is determined that the PWM control is being carried out, a phase, which is in the ON operation-permitted period among the switching elements SW1, SW3, SW5 in the high side arm, is specified at S382. By this step, the V-phase is specified in the example of FIG. 47. At a subsequent S384, it is checked whether it is in the ON operation-permitted period of the specified phase. This step is for specifying a period in which the terminal voltage of the appropriate phase to be used for detecting disconnection does not change.

If it is determined that it is in the ON operation-permitted period at S384, it is further checked at S386 whether the logical value of the comparison signal of the phase specified at step S82 is L. This step is for determining the presence/absence of disconnection. If it is determined affirmatively at step S386, a L detection flag is set to on at S388 to indicate that the logical value has become L. This step may be carried out as a step for changing a register value in the control circuit 220.

When S388 has been completed or negative determination has been made at S386, the processing returns to S390. In S390, it is checked whether the L detection flag is on or not. This step is for determining the presence/absence of the disconnection. That is, if the logic value of the comparison signal does not become L within the on-permitted period of the phase specified at S382, it is so considered that the phenomenon indicated by (b) of FIG. 47 has occurred. In this instance, it can be determined that the disconnection has occurred. Therefore, if a negative determination is made at S390, a notification of detection of disconnection is issued from the control apparatus to an external side at step S392. When S392 has been completed or negative determination has been made at step S380 or S390, the L detection flag is set to off at S394.

When S394 has been completed, the series of processing is terminated.

According to this embodiment, the following advantages are obtained in addition to the advantages of the eleventh embodiment.

(10) Under the condition that only one phase of the brushless motor 2 is made conductive to the negative pole terminal of the battery 214 and another one phase is made conductive to the positive pole terminal of the battery 214, presence/absence of the disconnection of the brushless motor 2 is detected based on the presence/absence of inversion of the comparison signal of the another one phase at the time of turning off the switching element which makes the negative pole terminal and the brushless motor 2 conductive. Thus, disconnection of the brushless motor 2 can be detected.

(11) In the 120°-energization control, the reference voltage Vref does not exceed the positive pole voltage of the battery 214. In this instance, since the disconnection cannot be detected based on the comparison signal, the disconnection is detected in the PWM control. Therefore, detection of disconnection can be attained appropriately.

Fourteenth Embodiment

Figure 49:
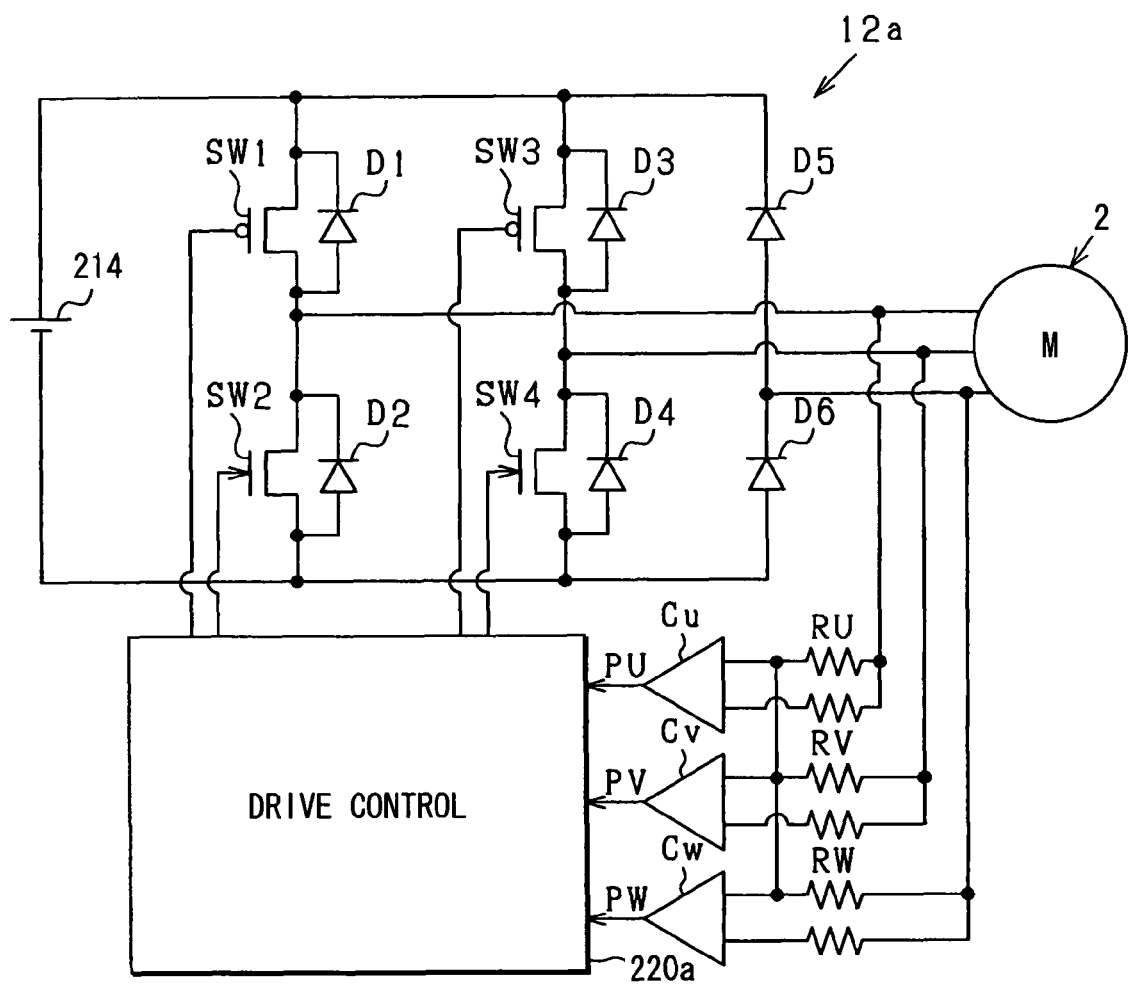
FIG. 49 is a circuit diagram illustrating a rotary machine driving apparatus in a fourteenth embodiment.
Figure 50:
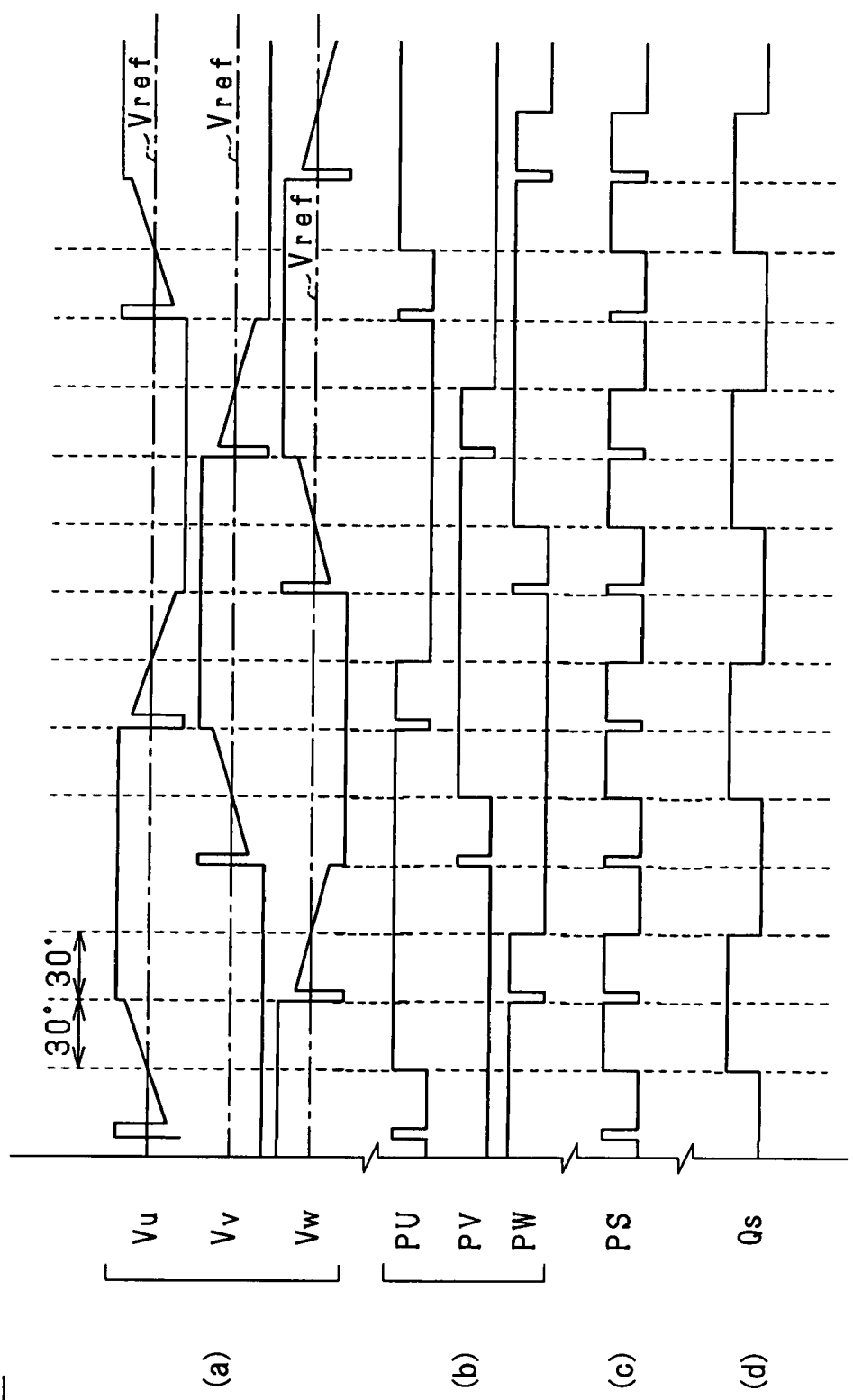
FIG. 50 is a signal diagram illustrating a mode of conventional 120°-energization control.

A fourteenth embodiment is illustrated in FIG. 49. The brushless motor 2 is a two-phase motor. For detecting presence/absence of disconnection in the two-phase motor 2 in the similar manner as in the thirteenth embodiment, a series connection of diodes D5, D6 is connected in parallel to a series connection of the switching elements SW1, SW2 and a series connection of the switching elements SW3, SW4. A junction between the diodes D5, D6 is connected to the neutral point of the brushless motor 2*a*. Thus, a phase connected to a junction between the switching elements SW1, SW2 is defined to be a U-phase, a phase connected to a junction between the switching elements SW3, SW4 is defined to be a V-phase, and a phase connected to the junction between the diodes D5, D6 is defined to be a W-phase.

A comparator Cu produces a comparison signal PU by comparing the terminal voltage Vu and the reference voltage Vref. A comparator Cv produces a comparison signal PV by comparing the terminal voltage Vv and the reference voltage Vref. A comparator Cw produces a comparison signal PW by comparing the terminal voltage Vw with the reference voltage Vref. Based on these comparison signals PU, PV, PW, the disconnection can be detected in the similar manner as in the thirteenth embodiment.

The eleventh to fourteenth embodiments may be modified as described below.

The specified time point is set by adjusting the decrement speed of the specified time point setting counter relative to the increment speed of the measuring counter. However, these counters may be made identical in count speed, and the initial value on the specified time point setting counter may be set according to the value on the measuring counter before initialization (maximum value). When the specified time point is set to a time point delayed by 30° from zero-crossing time point, for example, ½ of the maximum value of the measuring counter may be taken as the initial value of the specified time point setting counter.

The masking period is set by adjusting the decrement speed of the masking period counter relative to the increment speed of the measuring counter. However, these counters may be made identical in count speed, and the initial value on the masking period counter is set according to the value of the measuring counter before initialization (maximum value). When an angular range from a zero-crossing time to 45° is set as the masking period, ¾ of the maximum value of the measuring counter may be taken as the initial value on the masking period counter.

The abnormality in the rotating state of the brushless motor 2 is not limited to the reverse rotation. It is essential only that, when the combined signal PS disagrees with the expectation signal, the rotating state is determined to be abnormal.

The PWM control is carried out when the phase current of the brushless motor 2 exceeds the threshold value. However, it is also possible, for instance, to forcibly turn off the switching element of the low side arm, which is in the ON-permitted period, only when the current continues to exceed the threshold value. An operation means for repeating tuning on and off of the switching element in the ON-permitted period can thus be provided by this control.

The operation means is not limited to a means that operates the switching elements of the low side arm, but may be a means that operates the switching elements of the high side arm. In this instance, in the thirteenth and fourteenth embodiments, the presence/absence of disconnection is detected based on the presence/absence of inversion of the comparison signal of the phase in which the switching element of the low side arm may be fixed to the ON state.

The reference voltage Vref need not be the virtual neutral point, which is formed based on the terminal voltages Vu, Vv, Vw, but may be the neutral point voltage of the brushless motor 2. Even in this case, the same advantages as those according to the eleventh embodiment can be provided. Even when ½ of the voltage of the battery 214 is used for the reference voltage Vref, the following can be implemented using the three-bit combined signal and the three-bit expectation signal. An abnormality in the rotating state can be detected with accuracy and the accuracy of detection of zero-crossing time point can be enhanced in 120°-energization control. When a phase line, which is at a side of the inverter 12 than a side of a junction with the resistive elements RU, RV, RW of the phase lines of the brushless motor 2, disconnection can be detected by using the reference voltage Vref as the neutral voltage based on the same phenomenon as the thirteenth embodiment.

The switching elements SW1, SW3, SW5 on the high side of the respective arms may be constructed of an N-channel MOS transistor. The power supply connected with the brushless motor 2 need not be a battery 214 but may be a generator. The brushless motor 2 need not be an actuator of an in-vehicle fuel pump, but may be an actuator of an in-vehicle cooling fan.

The multi-phase rotary machine need not be a three-phase brushless motor, and may be a motor of any number of phases. Further, it need not be a motor and may be a generator. Even when the number of phases of the rotary machine is changed to N (>3) in the thirteenth embodiment, disconnection can be detected in the PWM control in the same manner as in the thirteenth embodiment as long as the switching element of only one phase in the low side arm is in the ON-permitted period. That is, when the switching element of the only one phase is changed from ON to OFF, the reference voltage Vref becomes about (N−1)×VB/(N+Vf). Unless the phase number N becomes excessively large, the reference voltage Vref remains lower than the positive pole voltage VB of the battery 214. On the contrary, when no disconnection occurs, the reference voltage Vref becomes higher than the positive pole voltage VB of the battery 214. As a result, the disconnection can be detected based on the presence/absence of inversion in logical value of the comparison signal of a phase corresponding to a switching element, which is fixed to the ON state, of the high side arm.

Fifteenth Embodiment

Figure 51:
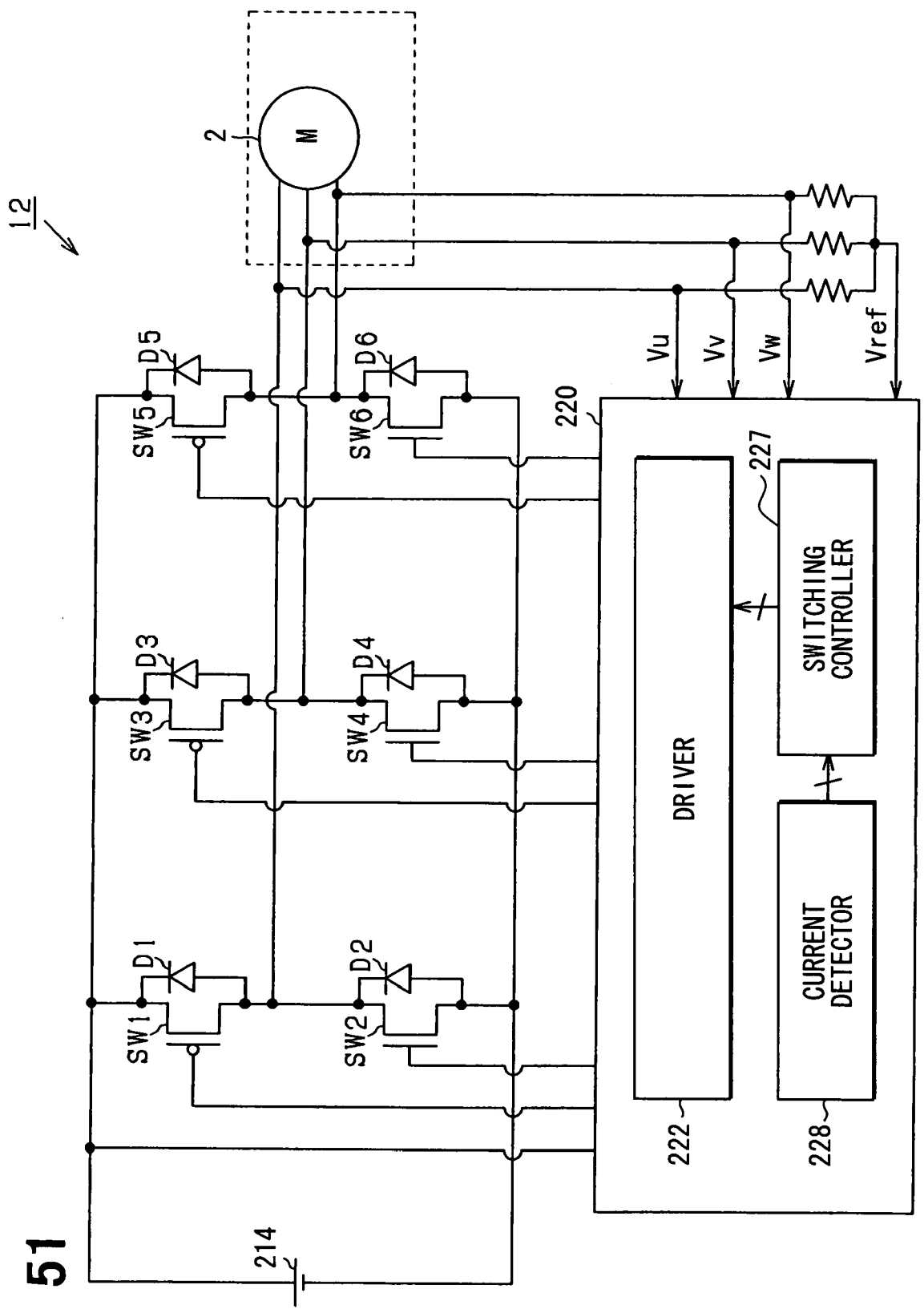
FIG. 51 is a circuit diagram illustrating a rotary machine driving apparatus in a fifteenth embodiment.

A fifteenth embodiment illustrated in FIG. 51 is constructed to have a brushless motor 2, an inverter 12 and a drive control circuit 220. This construction is similar to the eleventh embodiment illustrated in FIG. 38, and hence no detailed description is made.

Figure 52:
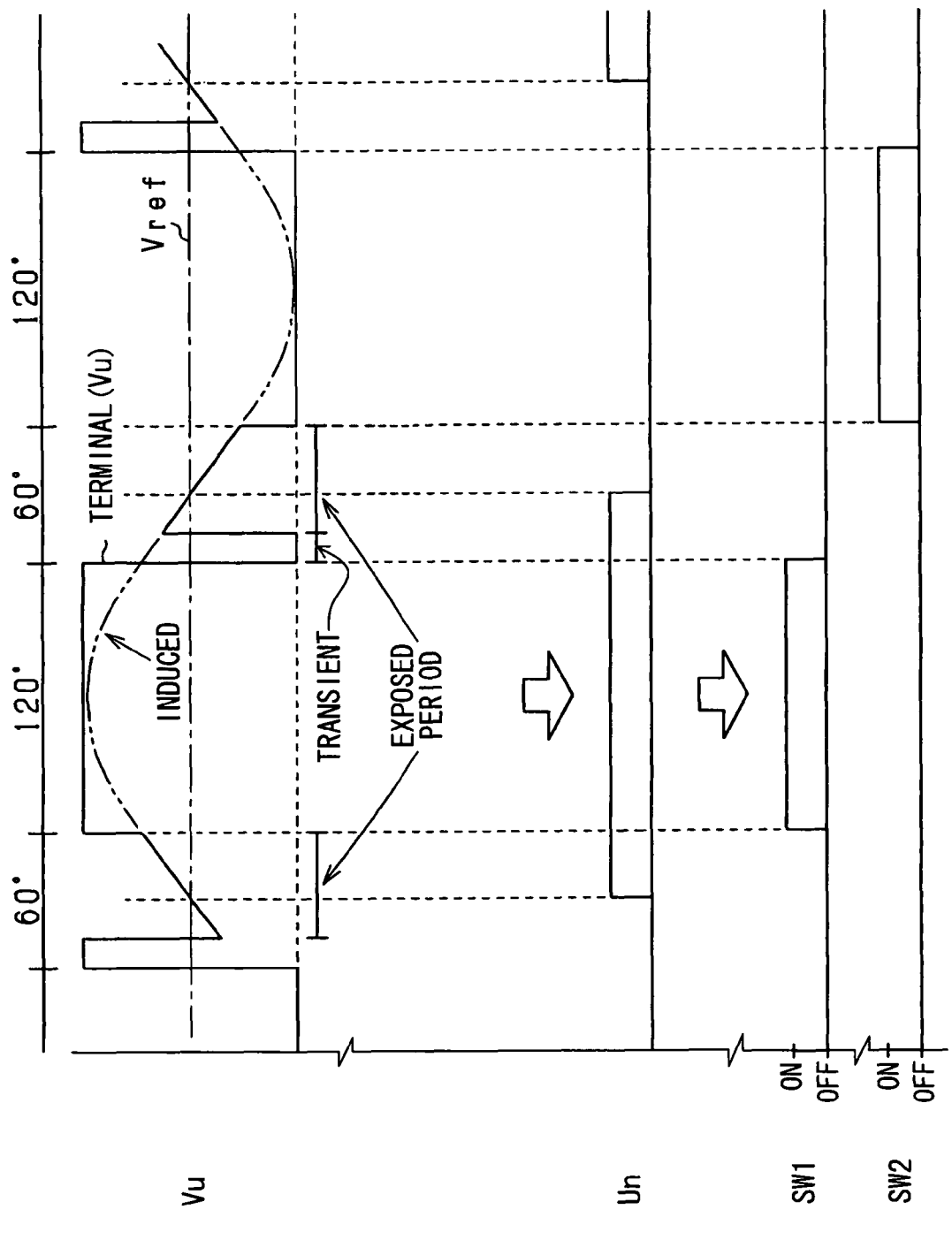
FIG. 52 is a signal diagram illustrating a mode of switching control.

FIG. 52 illustrates the way switching control is carried out by the switching controller 227 in 120°-energization control. Specifically, (a) illustrates the transition of the U-phase terminal voltage Vu indicated by a solid line, the transition of the U-phase induced voltage indicated by a two-dot chain line, and the reference voltage Vref indicated by a one-dot chain line. (b) illustrates the transition of a signal (zero-crossing detection signal) Un related to detection of zero-crossing time point. (c) illustrates the transition of an actuating signal for the switching element SW1, and (d) illustrates the transition of an actuating signal for the switching element SW2. The modes for V-phase and W-phase switching control are the same as that for U-phase switching control, and the explanation and description of them will be omitted.

As illustrated in FIG. 2, the terminal voltage Vu agrees with the positive potential or the negative potential of the battery 214 when the switching element SW1, SW2 is ON. Meanwhile, in periods (induced voltage exposed periods) during which both the switching element SW1 and the switching element SW2 are OFF, a period during which a current is not passed through the U-phase exists. In these periods, the terminal voltage Vu is equal to the induced voltage. Even in the periods during which both the switching element SW1 and the switching element SW2 are OFF, the terminal voltage Vu disagrees with the induced voltage when a current is supplied through the diodes D1, D2 (commutation transient state).

For this reason, the time point with which the terminal voltage Vu and the reference voltage Vref agree with each other in the following period is the zero-crossing time point with which the induced voltage Vu and the reference voltage Vref agree with each other: a period during which both the switching element SW1 and the switching element SW2 are OFF and a current is not passed through the diode D1 or D2. For this reason, the time point delayed from the zero-crossing time point by a predetermined electrical angle (e.g., 30°) is defined as the specified time point, and this specified time point is taken as a time point with which the operation of the switching elements SW1, SW2 is changed from OFF operation to ON operation. The ON state is continued for a period of 120° from an occurrence of the specified time point. Specifically, the following specified time point is taken as the time point for switching on the switching element SW1 of the high side arm: specified time point delayed by a predetermined electrical angle (e.g., 30°) from the zero-crossing time point with which the induced voltage agrees with the reference voltage Vref in its rising process. The following specified time point is taken as the time point for switching on the switching element SW2 of the low side arm: the specified time point delayed by a predetermined electrical angle (e.g., 30°) from the zero-crossing time point with which the induced voltage agrees with the reference voltage Vref in its falling process. The time point for switching on the U-phase switching elements SW1, SW2 can be determined by the zero-crossing time point in the rising process of the U-phase induced voltage and the zero-crossing time point in its falling process. In this embodiment, for this reason, the zero-crossing detection signal Un that rises with the zero-crossing time point in the rising process and falls with the zero-crossing time point in the falling process is generated. Its rising edges and falling edges are utilized to set a specified time point.

Figure 53:
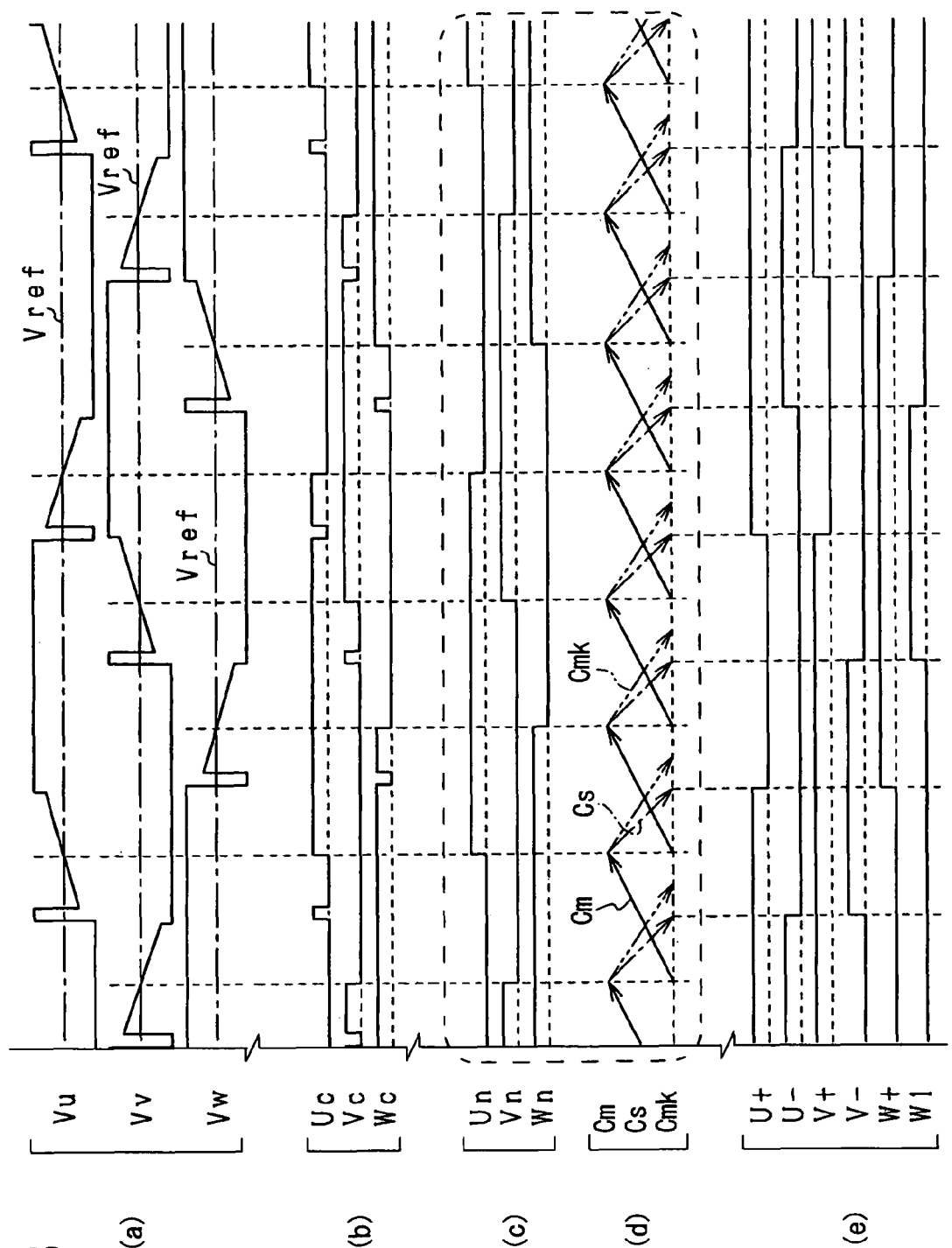
FIG. 53 is a signal diagram illustrating a mode of switching control.

FIG. 53 illustrates the way switching control is carried out in a normal condition in which the rotational speed of the brushless motor 2 is stabilized. Specifically, (a) illustrates the transition of the terminal voltages Vu, Vv, Vw; (b) illustrates the transition of comparison signals Uc, Vc, Wc indicating the magnitude relation between the terminal voltages and the reference voltage Vref; (c) illustrates the transition of the zero-crossing detection signals Un, Vn, Wn; (d) illustrates the transition of the values on various counters; and (e) illustrates the transition of the actuating signals for the switching elements SW1 to SW6. The actuating signals illustrated in (e) include actuating signals U+, V+, W+ for the switching elements SW1, SW3, SW5 of the high side arms and actuating signals U−, VW− for the switching elements SW2, SW4, SW6 of the low side arms. The switching elements SW1, SW3, SW5 of the high side arms are P-channel transistors; therefore, the periods for which these actuating signals U+, V+, W+ are at logical L are the periods for which they are ON.

The solid lines in (d) indicate the value Cm of a measuring counter for measuring a time interval between adjacent occurrences of zero-crossing time point. As illustrated, the measuring counter value is initialized each time the zero-crossing time point occurs, and newly starts time counting operation. A time interval between adjacent occurrences of zero-crossing time point has correlation with a rotational speed. For this reason, the value of the counter immediately before it is initialized (the maximum value of the counter) provides a parameter having correlation with rotational speed.

The one-dot chain lines in (d) indicate the value Cs of a specified time point setting counter that counts a time required from when the zero-crossing time point occurs to when specified time point occurs and thereby sets a specified time point. The specified time point setting counter takes the value of the counter before initialization as its initial value at an occurrence of zero-crossing time point and decrements it. Then, it sets the time point with which the value is zeroed as a specified time point. At this time, the following operation is performed. When the interval between zero-crossing time point and specified time point is 30°, for example, the decrement speed is set to twice the increment speed of the measuring counter. This is because the intervals between adjacent occurrences of zero-crossing time point are 60°. For this reason, when the rotational speed is constant, the time point with which the value of the specified time point setting counter becomes 0 should be equal to time point delayed by 30° from zero-crossing time point.

The two-dot chain lines in (d) indicate the value Cmk of a masking period counter. The masking period counter determines a period (masking period) for which detection of the zero-crossing time point based on the comparison of the terminal voltages Vu, Vv, Vw with the reference voltage Vref for magnitude is inhibited (disabled). This counter is for preventing the following event. When the terminal voltages Vu, Vv, Vw agree with the reference voltage Vref during a period for which a current is supplied through the diodes D1 to D6, an occurrence of zero-crossing time point is erroneously detected. This counter also takes the value of the counter before initialization as its initial value at an occurrence of zero-crossing time point and decrements it. Then, it sets the period before the value is zeroed as a masking period. When the masking period is set to a period from an occurrence of zero-crossing time point to 45°, for example, the decrement speed is set to 3/2 times the increment speed of the measuring counter.

Figure 54:
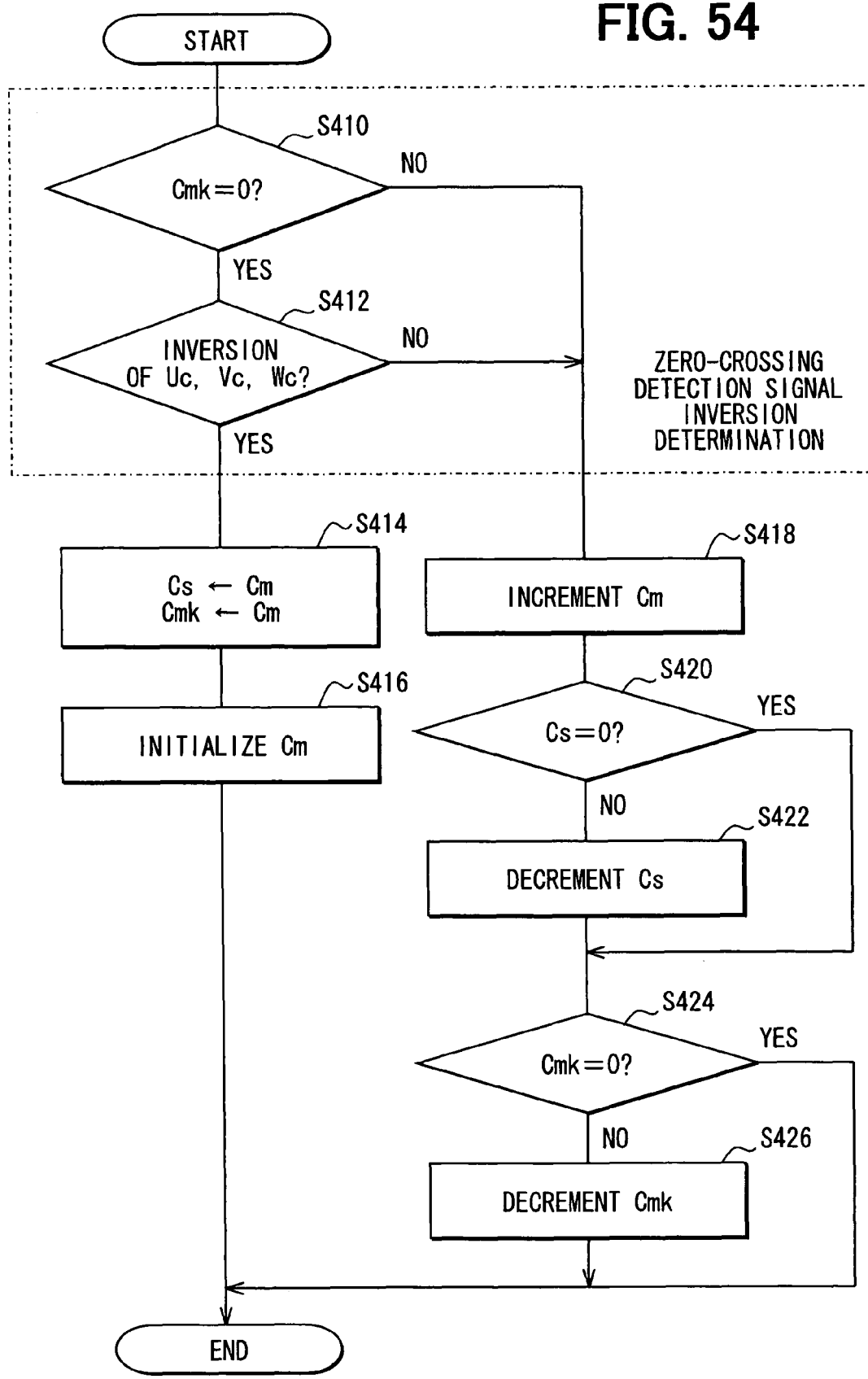
FIG. 54 is a flowchart illustrating processing for setting various counters.

The processing of switching control is described with reference to FIG. 54 and FIG. 55. FIG. 54 illustrates processing for setting the counter values on the above three counters. This processing is repeatedly carried out by the drive control circuit 220, for example, in a predetermined cycle.

This series of processing is carried out as follows. At S410, it is checked whether or not the value Cmk of the masking period counter is 0. When it is determined that the value is zero, it is determined at S412 whether or not any of the comparison signals Uc, Vc, Wc has been inverted. In actuality, this processing is for determining whether the above zero-crossing detection signal Un, Vn, Wn is at its rising edge or its falling edge. When it is determined at S412 that any signal has been inverted, the value Cm of the counter is taken as the values Cs and Cmk of the specified time point setting counter and the masking period counter at S414. At S416, the measuring counter is initialized (Cm=0).

When a negative determination is made at S410 or S412, the measuring counter is incremented at 5418. At S420, subsequently, it is checked whether or not the value Cs of the specified time point setting counter is zero. When the value of the specified time point setting counter is not zero, the specified time point setting counter is decremented at S422. Meanwhile, when an affirmative determination is made at S420 or when the processing of S422 is completed, it is determined at S424 whether or not the value of the masking period counter is zero. When the value of the masking period counter is not zero, the masking period counter is decremented at S426.

When an affirmative determination is made at S424 or when the processing of S416 or S426 is completed, this series of processing is once terminated.

FIG. 5 illustrates flow of processing for switching on the switching elements SW1 to SW6. This processing is repeatedly carried out by the drive control circuit 220, for example, in a predetermined cycle.

Figure 55:
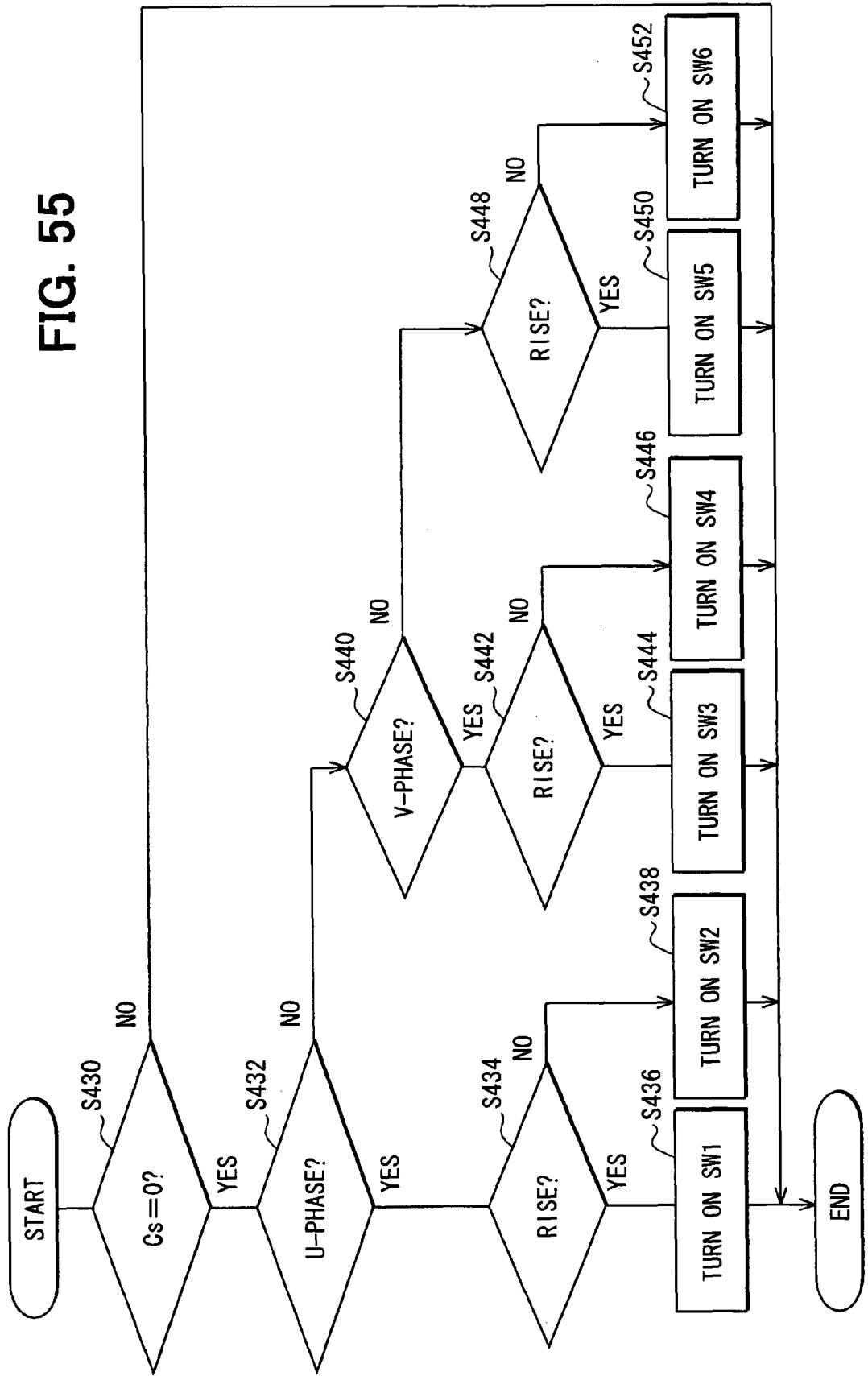
FIG. 55 is a flowchart illustrating processing for switching on switching elements.

The series of processing illustrated in FIG. 55 is carried out as follows. At S430, it is checked whether or not the value Cs of the specified time point setting counter is zero. This processing is for determining whether or not the specified time point has occurred. When it is determined that the value of the specified time point setting counter has been zeroed, processing is carried out to switch on any of the switching elements SW1 to SW6. More specifically, when the zero-crossing time point with which the value Cm of the counter is set as the value of the specified time point setting counter is U-phase zero-crossing time point (S432: YES), the following processing is carried out. When the zero-crossing detection signal rises (S434: YES), the switching element SW1 is turned on (S436). When the zero-crossing detection signal falls (S434: NO), the switching element SW2 is turned on (S438).

Meanwhile, when the above zero-crossing time point is V-phase zero-crossing time point (S440: YES), the following processing is carried out. When the zero-crossing detection signal rises (S442: YES), the switching element SW3 is turned on (S444). When the zero-crossing detection signal falls (S442: NO), the switching element SW4 is turned on (S446). When the above zero-crossing time point is W-phase zero-crossing time point (S440: NO), the following processing is carried out. When the zero-crossing detection signal rises (S448: YES), the switching element SW5 is turned on (S450). When the zero-crossing detection signal falls (S448: NO), the switching element SW6 is turned on (S452).

The technique for turning off the switching elements SW1 to SW6 is similar to the foregoing. That is, they are turned off at a time point delayed by a predetermined electrical angle (e.g., 30°) from a specific specified time point as illustrated in FIG. 53. More specifically, the switching elements SW1, SW3, SW5 of the high side arms are turned off at the time point delayed by a predetermined electrical angle from zero-crossing time point in the rising process of an induced voltage of a different phase. The switching elements SW2, SW4, SW6 of the low side arms are turned off at the time point delayed by a predetermined electrical angle from zero-crossing time point in the falling process. This processing can also be carried out similarly to the processing in FIG. 55, and the description of it will be omitted.

Figure 56A:
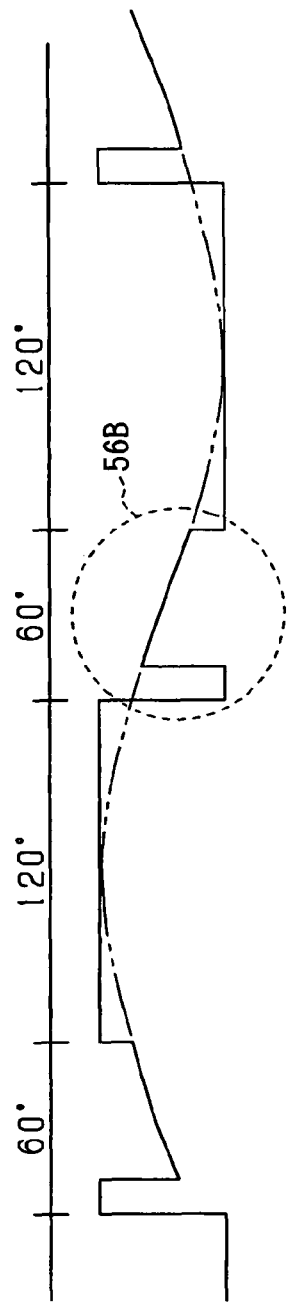
FIGS. 56A and 56B are signal diagrams illustrating deviation in induced voltage between normal and acceleration time.
Figure 56B:
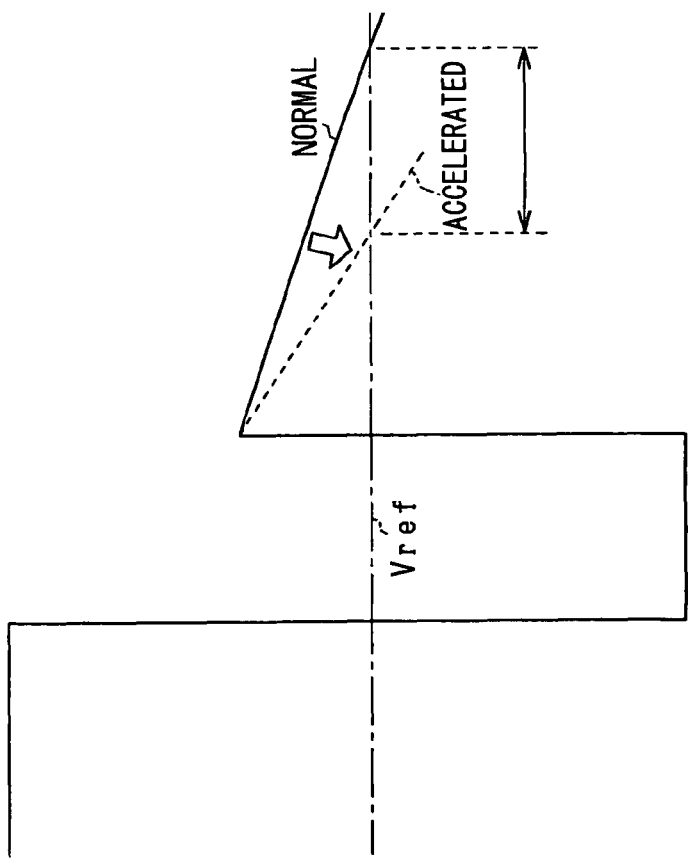

As illustrated in FIGS. 56A and 56B as an example in acceleration, the zero-crossing time point depends on the rotational speed of the brushless motor 2. For this reason, a problem arises when the rotational speed of the brushless motor 2 fluctuates. The rotational speed in a time interval between an occurrence of zero-crossing time point at the time of initialization and the next occurrence of zero-crossing time point cannot be accurately represented by the value of the counter immediately before initialization. For this reason, there is a possibility that the time point at which the value Cs of the specified time point setting counter is zeroed is deviated from specified time point.

Figure 57A:
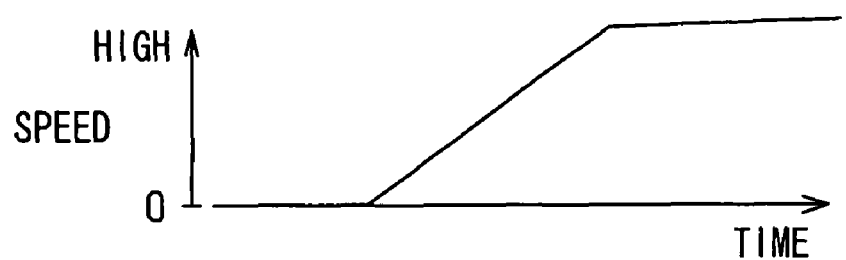
FIGS. 57A and 57B are graphs illustrating results of experiments on detection error in the angle of a rotor at acceleration.
Figure 57B:
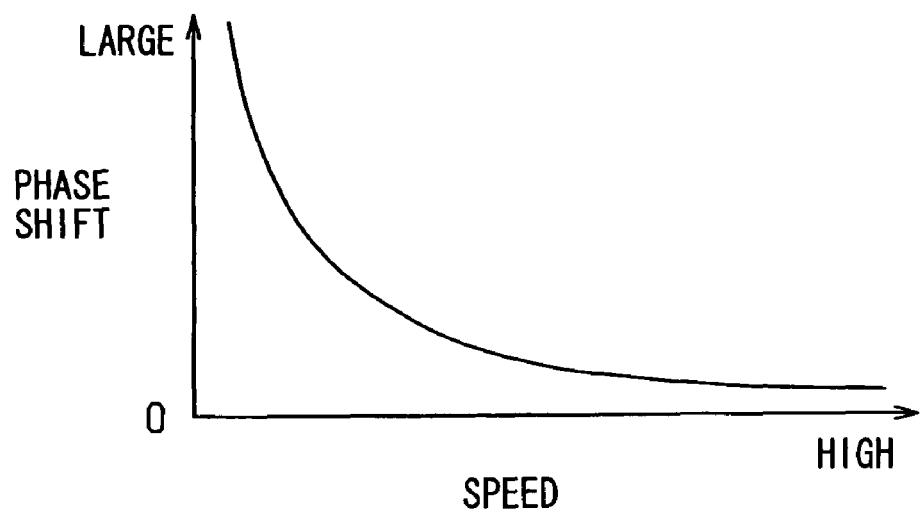

As an example of a case where rotational speed fluctuates, FIGS. 57A and 57B illustrate the result of an experiment on a setting error in the specified time point in acceleration. When the initial speed of zero was increased to a predetermined speed as illustrated in FIG. 57A, a detection error (phase shifting) in the angle of the rotor was observed as illustrated in FIG. 57B. As understood from FIG. 57B, the phase shift is especially large in the low speed range.

In this embodiment, consequently, information pertaining to change in the rotational speed of the brushless motor 2 is extracted from the result of detection of the zero-crossing time point, and the specified time point is set based the extracted information. More specifically, a change in rotational speed contained in the above information is associated with a period before an occurrence of the specified time point. However, it is presumed that the change in rotational speed can be used to determine the difference between a rotational speed in the time interval between adjacent occurrences of zero-crossing time point immediately before an occurrence of specified time point and a rotational speed immediately before the occurrence of specified time point. Consequently, the above difference is determined based on the above information and a specified time point is set.

Figures 58A, 58B:
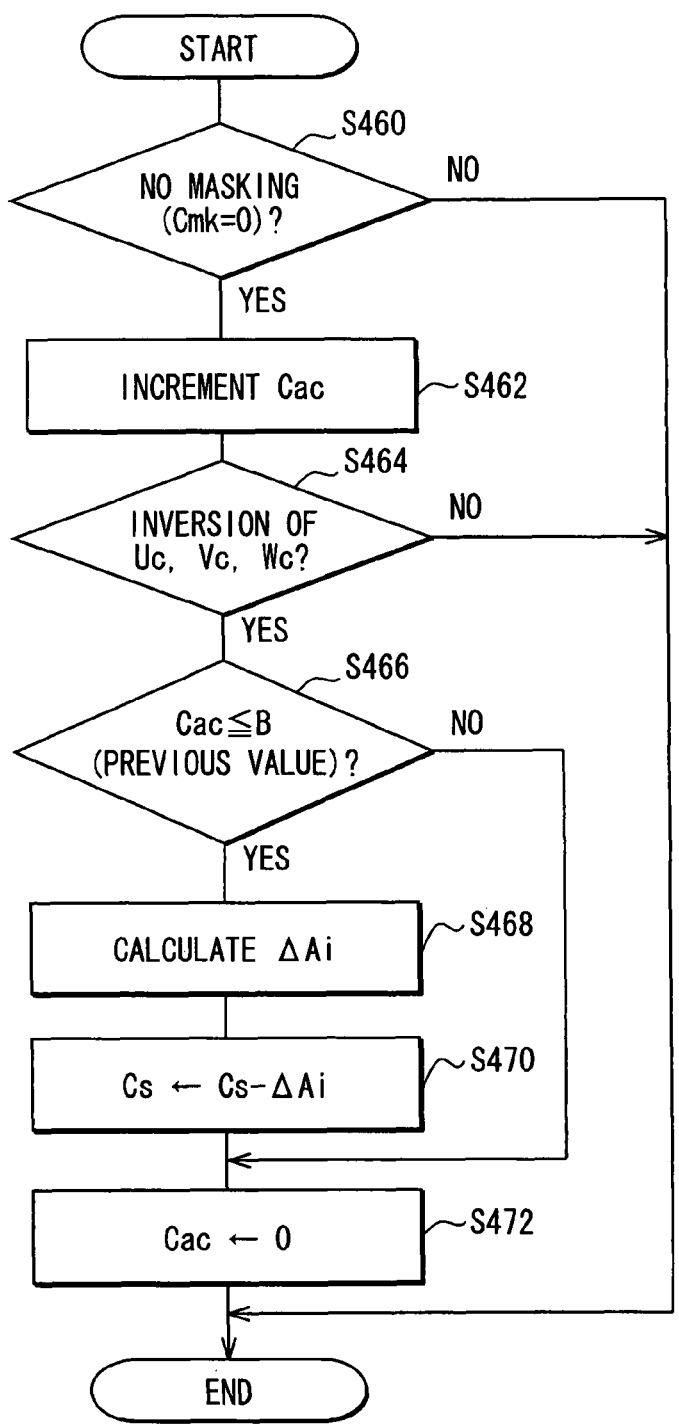
FIGS. 58A and 58B are a flowchart and a data table illustrating processing for setting a specified time point.

FIG. 58A illustrates processing for setting a specified time point in this embodiment. This processing is repeatedly carried out by the drive control circuit 220, for example, in a predetermined cycle.

This series of processing is carried out as follows. At S460, it is checked whether or not it is the time to cancel masking. That is, it is checked whether or not the value Cmk of the masking period counter has been zeroed. When it is the time to cancel masking, the value Cac of an acceleration detection counter is incremented at S462. At S464, it is checked whether or not any of the comparison signals Uc, Vc, Wc has been inverted as at S412 in FIG. 54. When an affirmative determination is made at S464, it is determined at S466 whether or not the value Cac of the acceleration detection counter is equal to or higher than a predetermined value B. This processing is for determining whether or not the brushless motor 2 is in an acceleration state. In this example, when the masking period is a period from an occurrence of the zero-crossing time point to 45° and the increment speed of the acceleration detection counter is identical with the increment speed of the measuring counter, the following can be implemented. When the value of the acceleration detection counter is smaller than ¼ times the previous value of the counter, it can be determined that the brushless motor 2 is in an acceleration state. In this case, for this reason, the predetermined value B is set to a value smaller than ¼ times the previous value of the counter.

When it is determined at S466 that the brushless motor 2 is in an acceleration state, a correction amount ΔAi for correcting the value of the specified time point setting counter is set according to the value of the acceleration detection counter at S468. Acceleration is increased with decrease in the value of the acceleration detection counter. In consideration thereof, in this example, the correction amount ΔAi is set to a larger value as the value Cac of the acceleration detection counter is decreased as illustrated in FIG. 58B. At S470, subsequently, a value obtained by subtracting the correction amount ΔAi from the value Cs of the specified time point setting counter is set as a value Cs of the specified time point setting counter.

When a negative determination is made at S466 or when the processing of S470 is completed, the acceleration detection counter is initialized (Cac=0) at S472. When a negative determination is made at S460 or S464 or when the processing of S472 is completed, this series of processing is once terminated.

Figure 59:
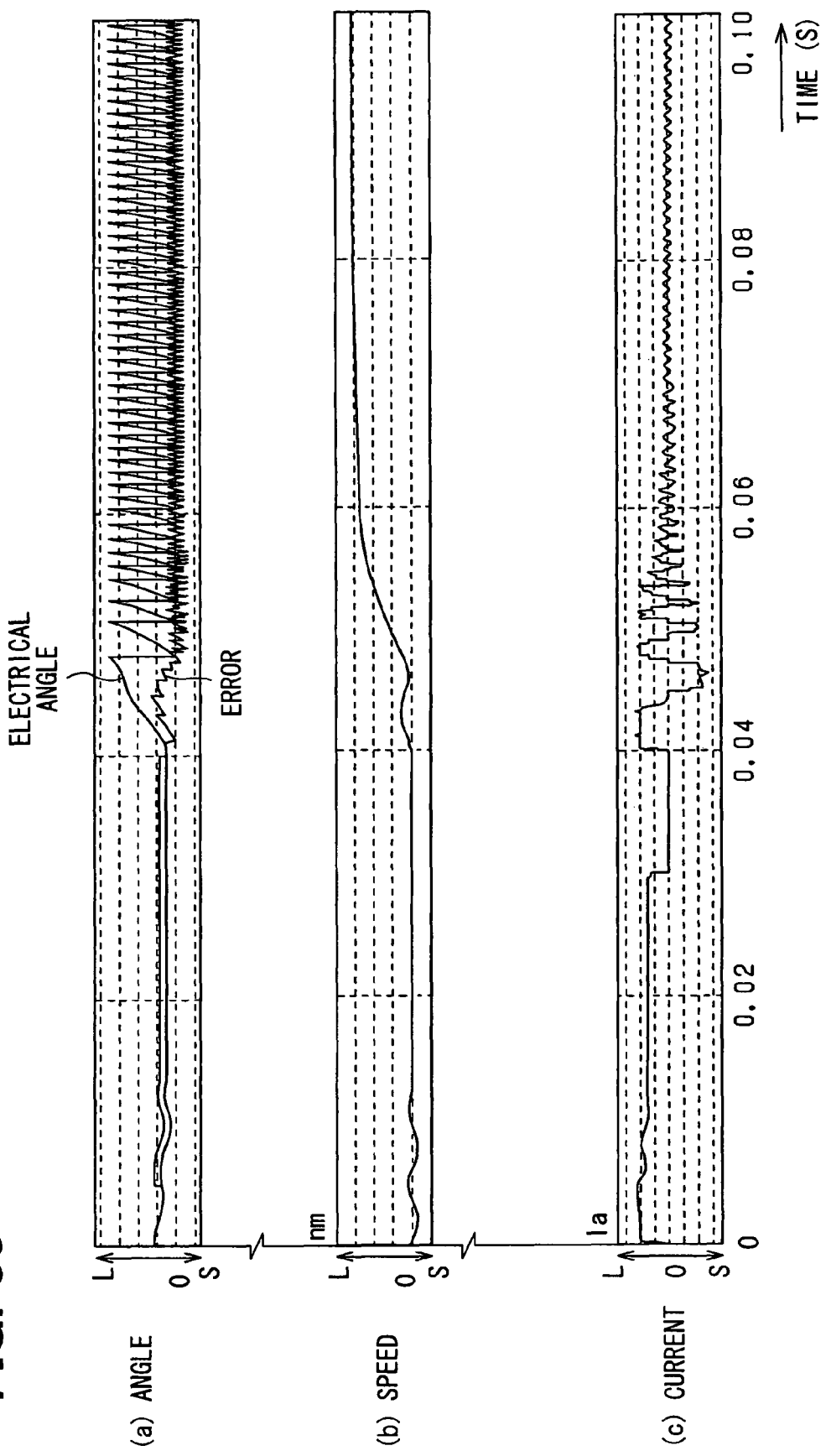
FIG. 59 is a signal diagram illustrating result of simulation on the way rotational speed is increased when a motor is started with correction.

FIG. 59 illustrates the mode for controlling the output of the brushless motor 2 in this embodiment. Specifically, (a) illustrates the transition of the angle of the rotor; (b) illustrates the transition of rotational speed; and (c) illustrates the transition of phase current. It is to be understood that a detection error in specified time point is small in acceleration (for example, period 0.04 to 0.06 seconds) as well. Therefore, the rotational speed can be smoothly increased to a desired rotational speed. If the correction processing for the measuring counter, illustrated in FIG. 58A, is not carried out, meanwhile, the error in the specified time point is large as illustrated in FIG. 60. Thus, the rotational speed cannot be smoothly increased.

According to the fifteenth embodiment, the following advantages can be provided.

(1) Information pertaining to change in the rotational speed of the brushless motor 2 is extracted from the result of detection of zero-crossing time point, and a specified time point is set based on this information. For this reason, a time required (value Cs of the specified time point setting counter) from a specific occurrence of zero-crossing time point to an occurrence of specified time point can be calculated with accuracy. Consequently, a specified time point can be set with accuracy.

(2) A time required (initial value of the specified time point setting counter) from the occurrence of zero-crossing time point immediately before an occurrence of specified time point to the occurrence of specified time point is calculated from the following interval: an interval between occurrences of zero-crossing time point (the value of the counter). Further, it is corrected based on the above information. Thus, a time required (the initial value of the specified time point setting counter) can be calculated with accuracy even when the rotational speed fluctuates.

(3) The above information is acquired based on a time from when masking is canceled to when a zero-crossing time point occurs. Thus, the above information can be appropriately acquired.

(4) A specified time point is advanced more as the time until zero-crossing time point occurs becomes shorter. Thus, the specified time point can be set with accuracy according to acceleration.

Sixteenth Embodiment

Figures 61A, 61B:
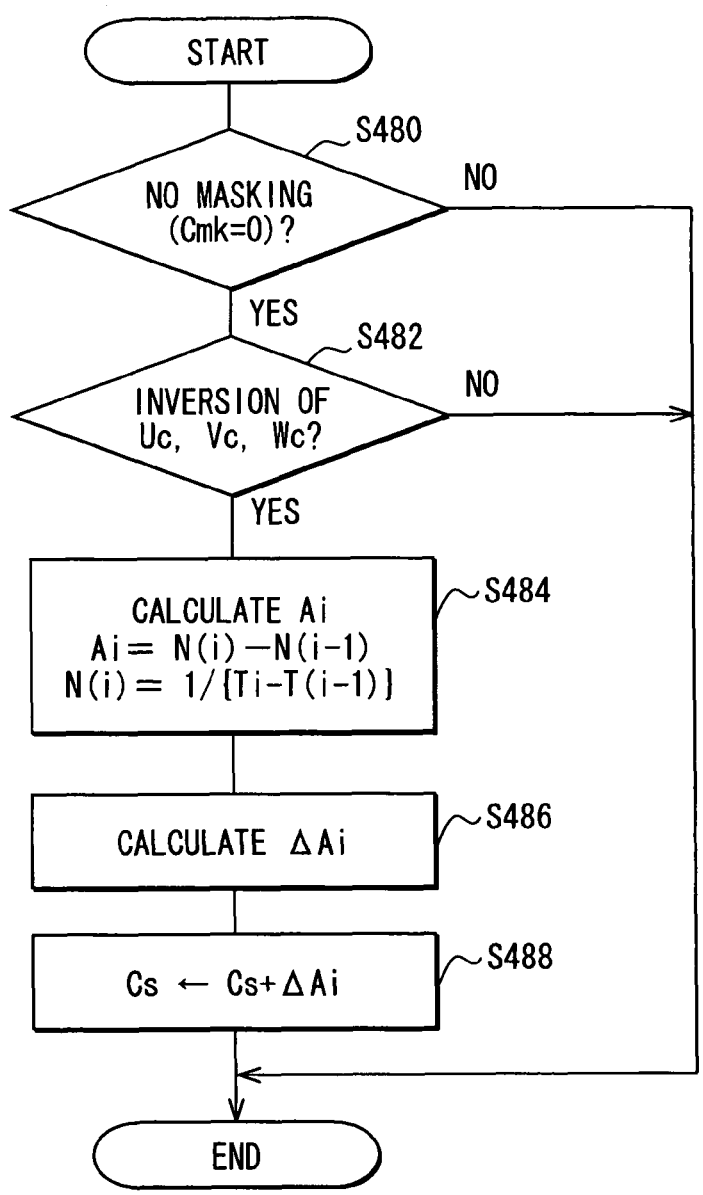
FIGS. 61A and 61B are a flowchart and a data table illustrating processing for setting a specified time point in a sixteenth embodiment.

In a sixteenth embodiment, the acceleration of the brushless motor 2 is calculated from a result of detection of a zero-crossing time point, and a specified time point is variably set according to this acceleration. FIG. 61A illustrates processing for setting a specified time point in this embodiment. This processing is repeatedly carried out by the drive control circuit 220, for example, in a predetermined cycle.

This series of processing is carried out as follows. At S480 and S482, the processing of S410 and S412 in FIG. 54 is carried out to determine whether or not it is zero-crossing time point. When it is zero-crossing time point, processing of calculating acceleration Ai is carried out at S484. At this time, the acceleration Ai is calculated by the following difference: a difference between the reciprocal N(i) of the time interval between the previous occurrence of zero-crossing time point and the present occurrence of zero-crossing time point and the reciprocal N(i-1) between the second previous occurrence of zero-crossing time point and the previous occurrence of zero-crossing time point. In reality, this processing can be carried out by subtracting the reciprocal of the previous maximum value of the measuring counter from the reciprocal of the present maximum value of the measuring counter. Specifically, the acceleration $\Delta Ai$ may be calculated as follows, with Ti being defined as a previous zero-crossing time point.

$$Ai = N(i) - N(i-1),$$

$$N(i) = 1/\{Ti - T(i-1)\}$$

At S486, subsequently, a correction amount $\Delta Ai$ for correcting the value Cs of the specified time point setting counter is calculated according to the calculated acceleration Ai. At this time, the correction amount $\Delta Ai$ is determined as illustrated in FIG. 61B. That is, when the acceleration Ai is equal to or larger than a predetermined value A2 (>0), the correction amount $\Delta Ai$ is set to a negative value so that its absolute value is increased with increase in the acceleration Ai. When the acceleration Ai is equal to or smaller than a predetermined value A1 (<0), the correction amount $\Delta Ai$ is set to a positive value so that its absolute value is increased with decrease in the acceleration Ai.

At S488, subsequently, the value Cs of the specified time point setting counter is corrected by adding the correction amount $\Delta Ai$ to the value Cs of the specified time point setting counter. When a negative determination is made at S480 or S482 or when the processing of S488 is completed, this series of processing is once terminated.

According to the sixteenth embodiment, the following advantage can be provided in addition to the advantages (1) and (2) of the fifteenth embodiment.

(5) The acceleration Ai of the brushless motor 2 is calculated based on multiple values with respect to time intervals between occurrences of zero-crossing time point, and a specified time point is set based on this acceleration. Thus, a specified time point can be set with accuracy regardless of fluctuation in rotational speed.

Seventeenth Embodiment

Figure 62:
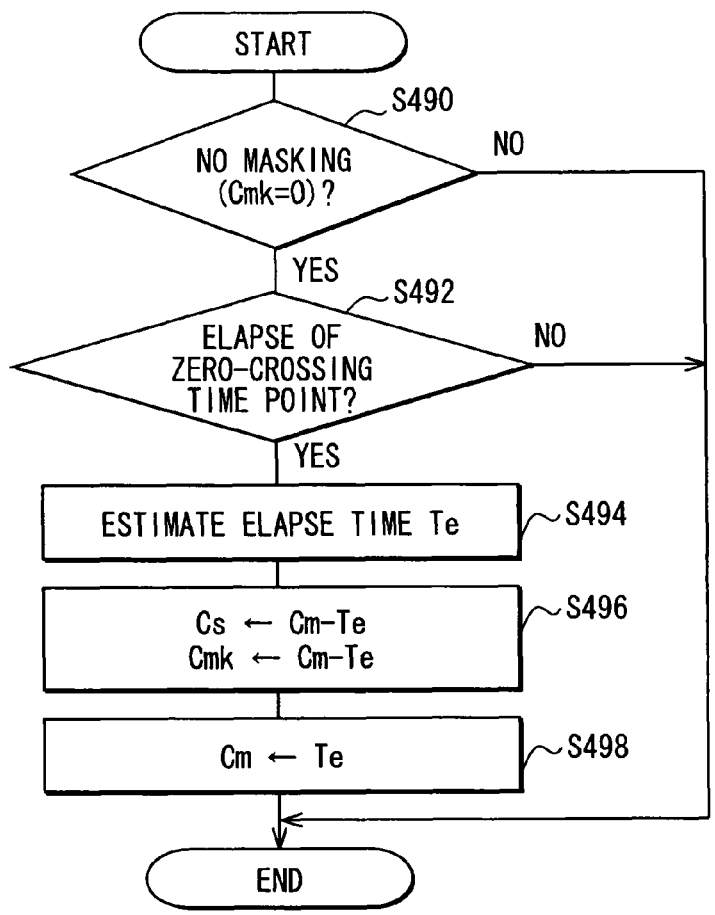
FIG. 62 is a flowchart illustrating processing for estimating a zero-crossing time point in a seventeenth embodiment.

When a zero-crossing time point occurs before the value Cmk of the masking period counter is zeroed, it is impossible to appropriately set a specified time point and to appropriately set the masking period counter and the like. To cope with this, this seventeenth embodiment is so constructed that a time Te that has elapsed from the occurrence of zero-crossing time point to the present time is estimated based on an induced voltage at that time. FIG. 62 illustrates processing in the above estimation. This processing is repeatedly carried out by the drive control circuit 220, for example, in a predetermined cycle.

This series of processing is carried out as follows. At S490, it is checked whether or not it is the time to cancel masking, when the value Cmk of the masking period counter is changed to zero. When it is the time to cancel masking, it is determined at S492 whether or not an occurrence of zero-crossing time point has been completed. This processing can be carried out by taking the following measure. When an induced voltage is in its rising process, it is checked whether or not a terminal voltage has already exceeded the reference voltage Vref. When the induced voltage is in its falling process, it is checked whether or not the terminal voltage has already fallen below the reference voltage Vref.

When it is determined that an occurrence of zero-crossing time point has been already completed, the processing proceeds to S494. At S494, a time Te that has lapsed from the occurrence of zero-crossing time point to the present time is estimated based on the previous value of the counter and the terminal voltage. When the masking is canceled, the terminal voltage indicates the induced voltage. The difference between the value of induced voltage and the reference voltage Vref contains information pertaining to the above elapsed time Te. Since the amplitude of induced voltage depends on rotational speed, however, it is impossible to accurately determine the elapsed time only by the present induced voltage. In this embodiment, consequently, the elapsed time is estimated based on the previous maximum value of the counter as a parameter having correlation with rotational speed and the present induced voltage. At this time, for example, the following measure can be taken. The switching controller 227 is constructed of a microcomputer, and a data map that defines the relation between the previous maximum value of the counter and the present induced voltage and the elapsed time is used to estimate the elapsed time.

At S496, a value obtained by subtracting the elapsed time from the present value of the counter is set as the values Cs and Cmk of the specified time point setting counter and the masking period counter. This processing is for setting a specified time point and a masking period based on estimated zero-crossing time point. At S498, the value Cm of the counter is set to the elapsed time. When an affirmative determination is made at S490 or S492 or when the processing of S498 is completed, this series of processing is once terminated.

In the seventeenth embodiment, a time that has lapsed from the occurrence of zero-crossing time point immediately before to the present time is estimated based on an induced voltage and a rotational speed. However, for example, a lapsed time may be estimated based on the maximum value or minimum value of induced voltage in the previous masking canceled period and the present induced voltage. More specifically, a rotational speed is used in consideration of that the amplitude of induced voltage depends on rotational speed. The amplitude can also be determined using the previous maximum value or minimum value of the induced voltage instead.

According to this embodiment, the following advantages can be provided in addition to the advantages (1) to (4) of the fifteenth embodiment.

(6) When the occurrence of zero-crossing time point immediately before has already been completed when masking is canceled, a time that has elapsed from the occurrence of zero-crossing time point immediately before to the present time is estimated based on an induced voltage. Thus, a time required from the occurrence of zero-crossing time point immediately before to an occurrence of specified time point can be estimated.

Eighteenth Embodiment

Figure 63:
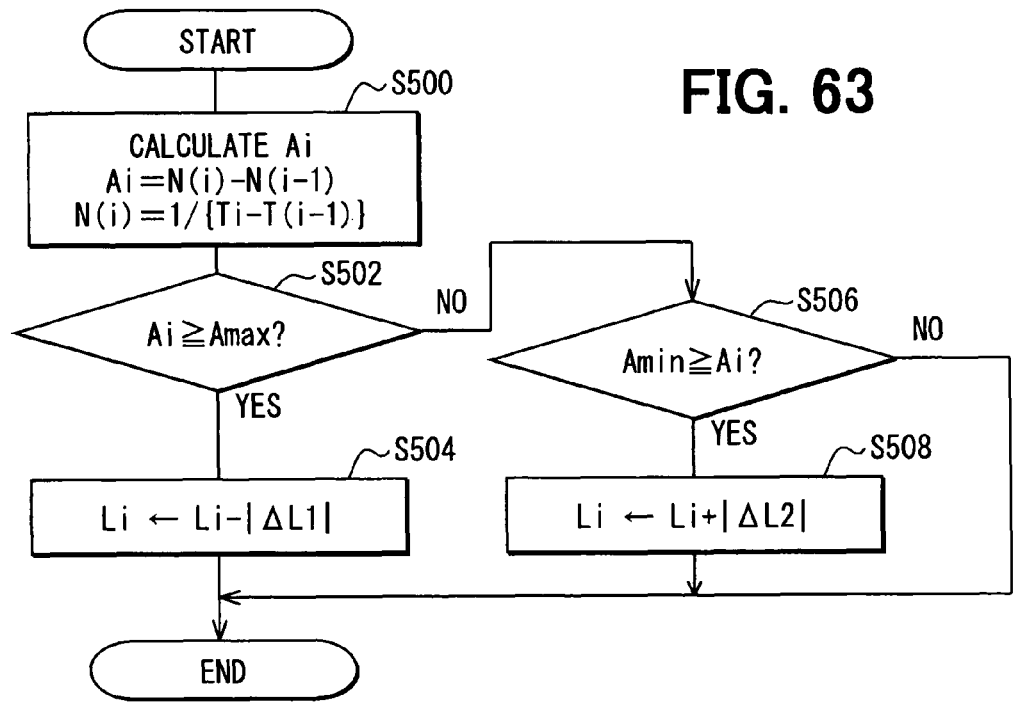
FIG. 63 is a flowchart illustrating processing for limiting a current in an eighteenth embodiment.

In this eighteenth embodiment, a limit value for the currents passed through the switching elements SW1 to SW6 is variably set according to the acceleration of the brushless motor 2. FIG. 63 illustrates processing for setting the above current limit value. This processing is repeatedly carried out by the drive control circuit 220, for example, in a predetermined cycle.

This series of processing is carried out as follows. At S500, the acceleration Ai is calculated. This processing is the same as the processing of S484 in FIG. 61. At S502, subsequently, it is checked whether or not the acceleration Ai is equal to or higher than a first specified acceleration Amax. The first specified acceleration Amax is set according to too high an acceleration at which degradation in the accuracy of setting of the specified time point based on a time interval between occurrences of zero-crossing time point becomes pronounced. When it is determined that the acceleration Ai is equal to or higher than the first specified acceleration Amax, the current limit value Li is reduced by $\Delta L1$ (>0) at S504. This processing is for reducing the acceleration of the brushless motor 2.

When it is determined that the acceleration Ai is lower than the first specified acceleration Amax, it is determined at S506 whether or not it is equal to or lower than a second specified acceleration Amin. The second specified acceleration Amin is set according to too low an acceleration (too high deceleration) at which degradation in the accuracy of setting of specified time point based on a time interval between occurrences of zero-crossing time point becomes pronounced. When it is determined that the acceleration is equal to or lower than the second specified acceleration Amin, the current limit value Li is increased by $\Delta L2$ (>0) at S508. This processing is for reducing the absolute value of the acceleration of the brushless motor 2.

In this embodiment, the following processing is carried out in a situation in which the absolute value of acceleration Ai is excessively large and thus the accuracy of setting of specified time point is pronouncedly degraded. Processing for reducing the absolute value of acceleration is carried out. The accuracy of setting of specified time point is thereby enhanced. This setting is especially effective in the following cases: cases where energization is basically carried by a 120°-energization method to simply control rotational speed as in this embodiment. More specifically, acceleration is determined by a load applied to the output shaft of the brushless motor 2 and the like, and it fluctuates from situation to situation. For example, when the viscosity of fuel in a fuel pump is low, the load applied to the output shaft of the brushless motor 2 is light. Therefore, there is a possibility that acceleration becomes too high at the time of startup or the like. When a measure is taken to prevent acceleration from becoming too high in a situation in which the viscosity of fuel is low, the following takes place. In a situation in which the viscosity of fuel is high, a starting time is lengthened. Since there is a demand that a starting time should be shortened or for other like reasons, it is difficult to prevent acceleration from becoming too high.

When the current supplied to the switching elements SW1 to SW6 exceeds a current limit value, PWM control is carried out instead of turning on the switching elements SW1 to SW6 for a period of 120°. At this time, the state of the switching elements SW1 to SW6 is switched between the ON state and the OFF state in a period of 120° from a specified time point. At this time, the time point with which the switching elements SW1 to SW6 are brought into the ON state for the first time or the time point with which they are brought into the OFF state for the last time does not always agree with specified time point.

When the switching elements SW1 to SW6 are turned on and off by PWM control, a current is supplied through the diodes D1 to D6. As a result, a period for which the terminal voltages Vu, Vv, Vw and the reference voltage Vref disagree with each other is newly produced. Therefore, a masking period is additionally set.

In this embodiment, the current limit value maybe changed only when acceleration is positive and too high.

According to this eighteenth embodiment, the following advantages can be provided in addition to the advantages (1) to (4) of the fifteenth embodiment.

(7) A current limit value Li is variably set according to acceleration. Thus, increase in the absolute value of acceleration can be suppressed to the extent that the accuracy of time required computation based on a time interval between occurrences of zero-crossing time point is not excessively degraded. For this reason, a specified time point can be more accurately set by use of together information pertaining to change in rotational speed.

Nineteenth Embodiment

Figure 64A:
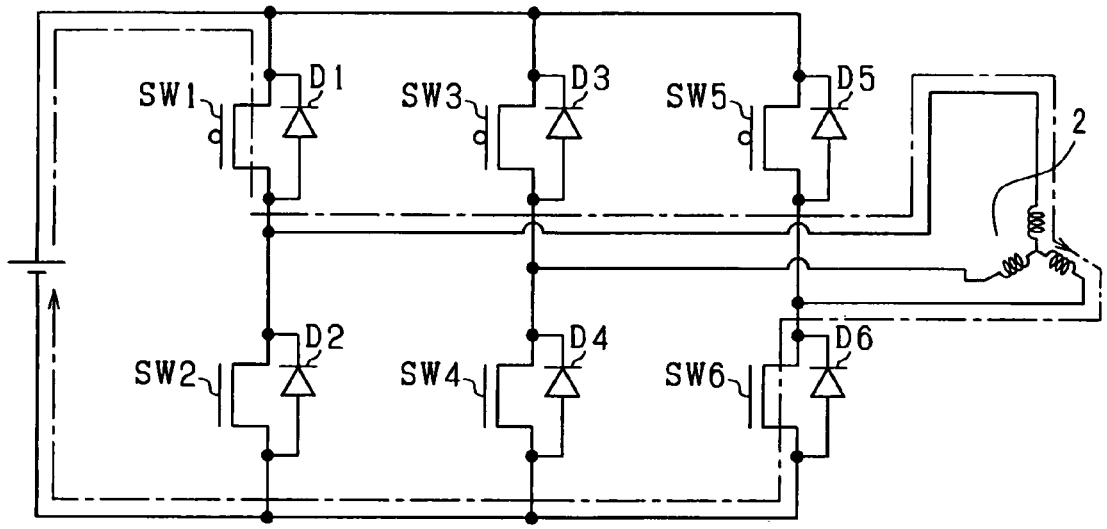
FIGS. 64A and 64B are circuit diagrams illustrating positioning processing carried out before a brushless motor is started in a nineteenth embodiment.

The induced voltage of the brushless motor 2 is produced in conjunction with rotation of the brushless motor 2. For this reason, when the brushless motor 2 at a stop is started, switching operation based on the induced voltage cannot be performed. To cope with this, the measure illustrated in FIG. 64A is normally taken when the brushless motor 2 is started. The angle (electrical angle) of the rotor is fixed by passing a current from a specific phase to another specific phase, that is, positioning processing is carried out. In the example illustrated in FIG. 55, the switching element SW1 of the high side arm and the switching element SW6 of the low side arm are brought into the ON state, and a current is thereby passed from the U-phase to the W-phase to fix the angle of the rotor of the brushless motor 2. When the angle of the rotor is fixed by this processing, a long time may be required for the angle of the rotor to settle. For this reason, there is a possibility that a starting time of the brushless motor 2 is lengthened.

Figure 64B:
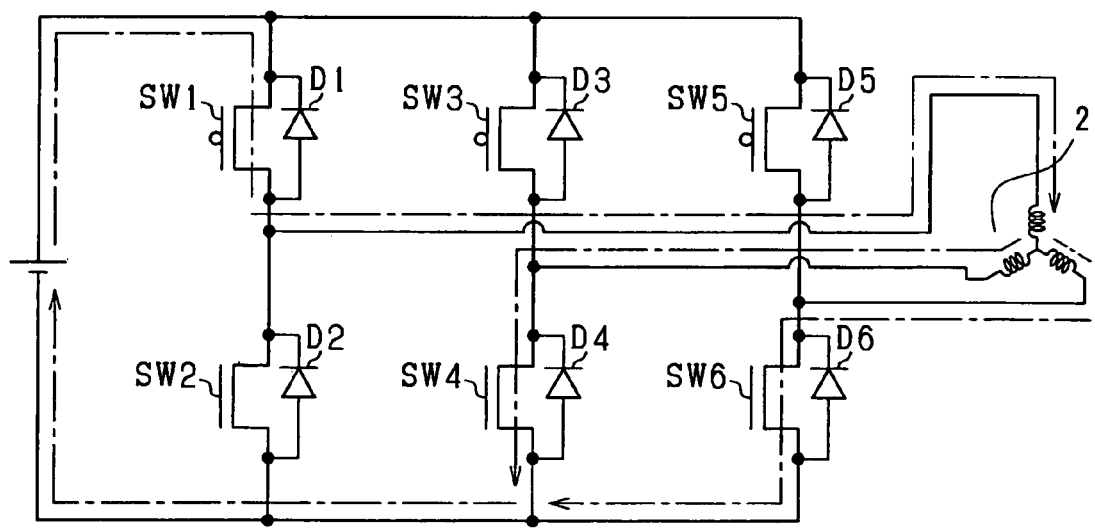

In a nineteenth embodiment, processing illustrated in FIG. 64B is carried out. That is, a switching element of one phase of the high side arms of the brushless motor 2 and switching elements of two phases of the low side arms are brought into the ON state to pass a current from one phase to two phases (one-phase/two-phase energization). The angle of the rotor of the brushless motor 2 is thereby fixed at a predetermined angle. FIG. 64B illustrates an example of cases where the following processing is carried out. The switching element SW1 of the high side arm and the switching elements SW4, SW6 of the low side arms are brought into the ON state, and the current is thereby passed from the U-phase to the V-phase and the W-phase. Thus, such force as to reduce the deviation of the angle of the rotor of the brushless motor 2 from a predetermined angle is exerted; therefore, a time it takes for the angle of the rotor to settle to the predetermined angle can be shortened.

Figure 65A:
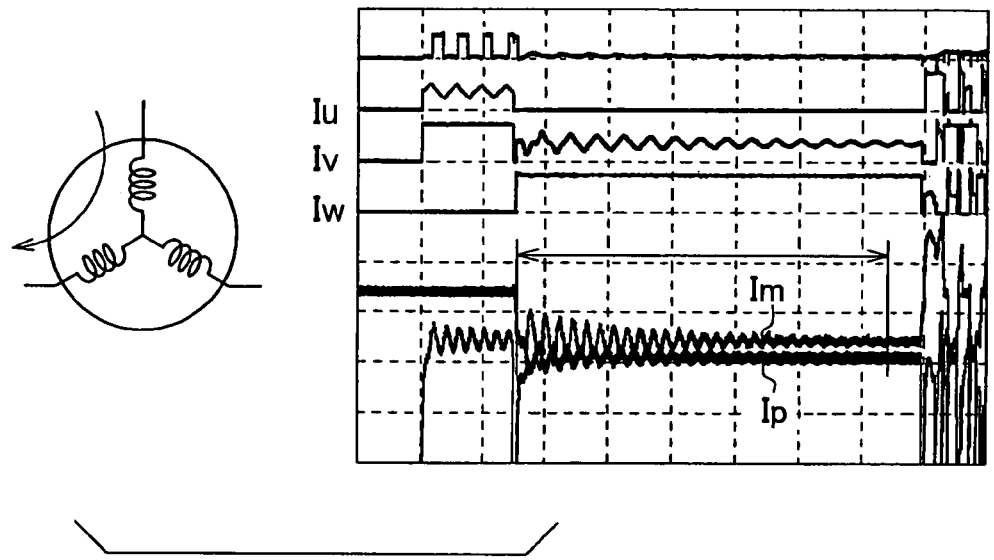
FIGS. 65A and 65B are signal diagrams illustrating a time it takes for the angle of a rotor to settle by the positioning processing.
Figure 65B:
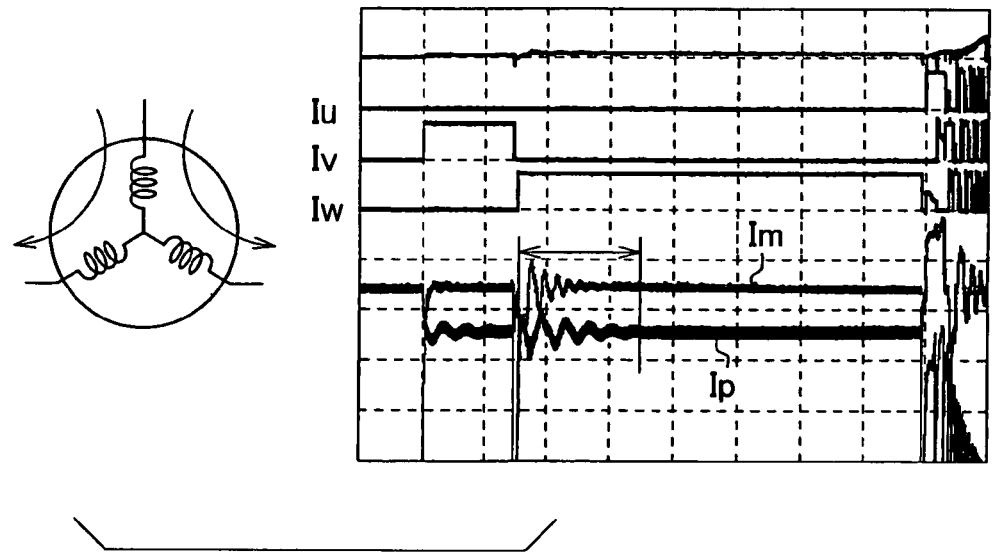

FIG. 65A illustrates the way the angle of the rotor is settled by the positioning processing illustrated in FIG. 64A, and FIG. 65B illustrates the way the angle of the rotor is settled by the positioning processing illustrated in FIG. 64B. In these figures, Iu, Iv, Iw indicate phase currents, and Im and Ip indicate a motor phase current and a power source current, respectively. According to the positioning processing in this embodiment, as illustrated in FIG. 65B, the time it takes for the angle of the rotor to settle is short, and fluctuation in the currents having correlation with fluctuation in the angle of the rotor ceases early.

Figure 66:
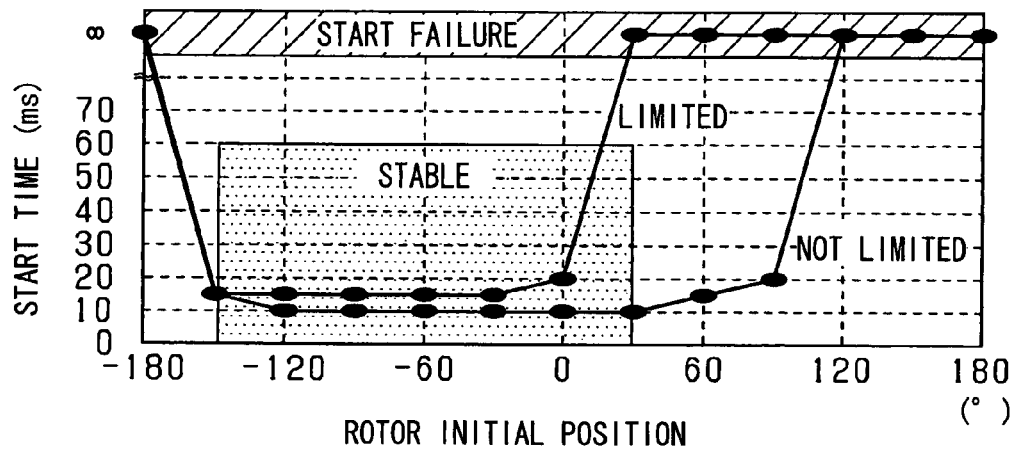
FIG. 66 is a graph illustrating a relation between an angle at which a rotor is fixed by positioning processing and a starting time.

Setting a predetermined angle may be carried out as illustrated in FIG. 66, which illustrates the relation between the predetermined angle and the starting time. In this example, an angle of 0° is defined as an angle to which the rotation angle is assumed to settle if the initial state of switching operation is continued when the brushless motor 2 is started. This figure illustrates starting time (period) with respect to a case where a current supplied to the brushless motor 2 is not limited in the positioning processing and with respect to a case where the current is limited.

Figure 67:
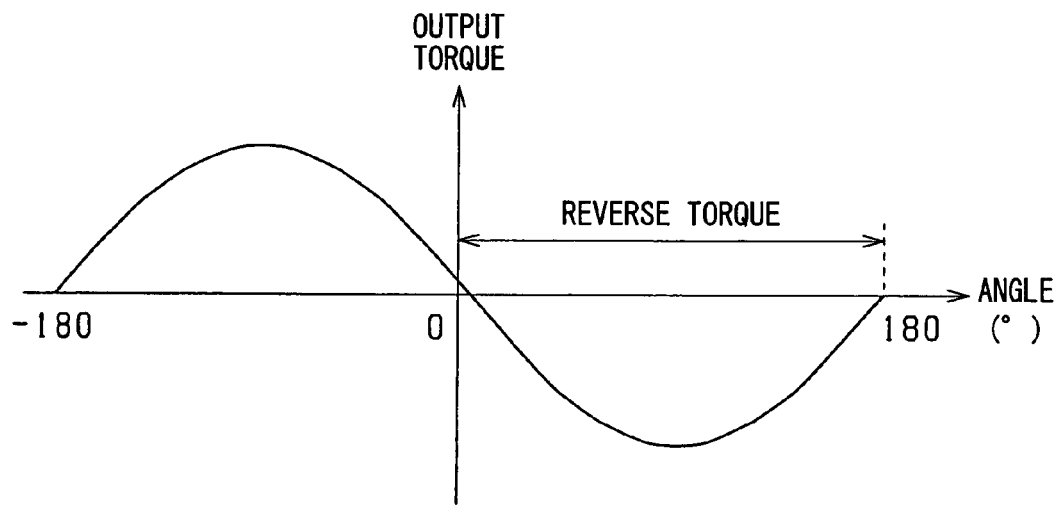
FIG. 67 is a signal diagram illustrating a relation between an angle at which a rotor is fixed by positioning processing and torque generated when startup operation is started.

When the predetermined angle is set within a range from ahead of an angle delayed by 150° to behind an angle advanced by 30°, the motor can be favorably started. This relates to that there is the relation illustrated in FIG. 67 between torque generated when the switching operation is started in conjunction with startup of the brushless motor 2 and the predetermined angle. In this example, torque having a positive value refers to torque that rotates the brushless motor 2 in the positive direction. In the range on the advanced side, torque that rotates in reverse the brushless motor 2 is produced. Therefore, the brushless motor 2 is prone to be reversely rotated. The output torque is maximized at an angle delayed by 60°. For this reason, the following can be implemented in proximity to an angle delayed by 60°. As illustrated in FIG. 66, the starting time can be especially shortened regardless of whether or not the current supplied to the brushless motor 2 is limited in positioning processing. In this embodiment, consequently, the predetermined angle is set in proximity to the angle delayed by 60°.

Figure 68:
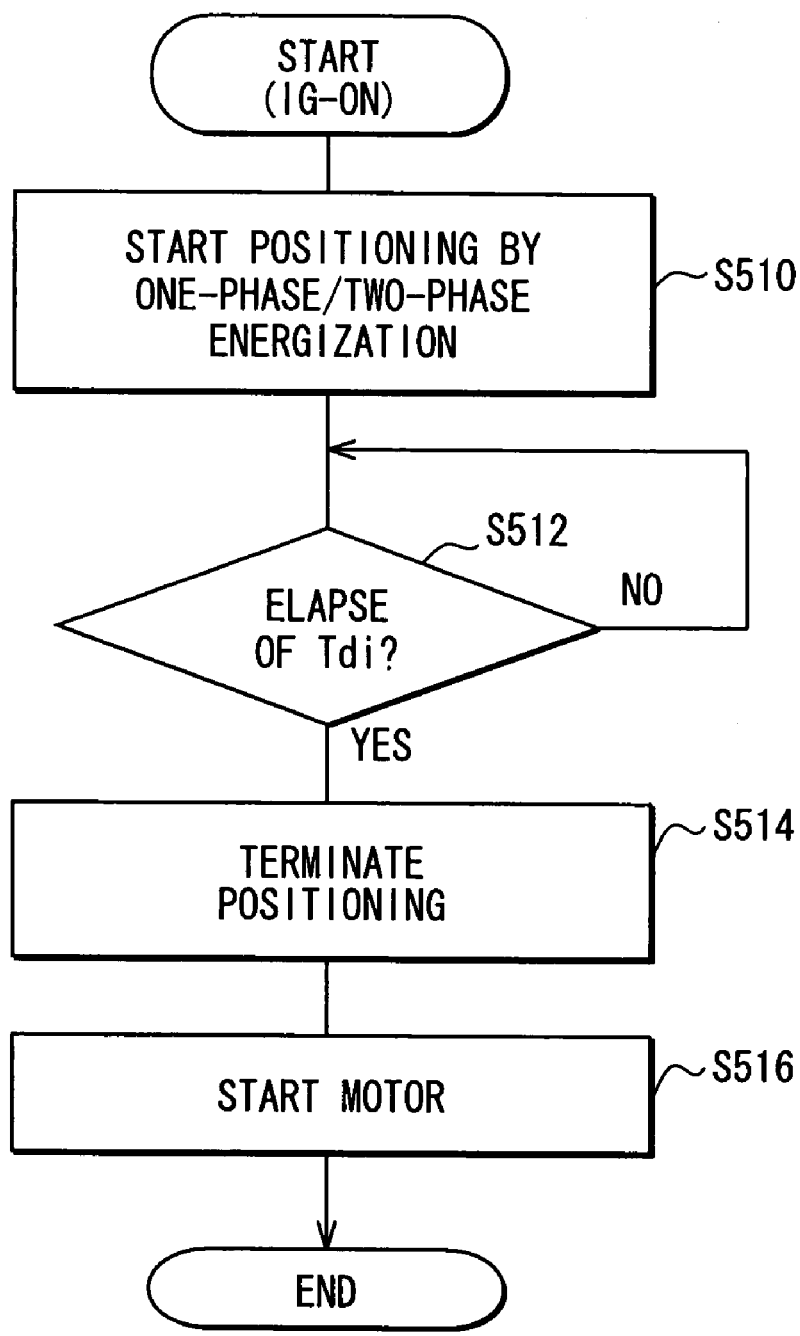
FIG. 68 is a flowchart illustrating positioning processing.

FIG. 68 illustrates processing for starting the brushless motor 2 in this embodiment. This processing is triggered by an ignition switch being turned on (IG-ON) and carried out by the drive control circuit 220.

When the ignition switch is turned on, positioning processing by the one-phase/two-phase energization is carried out at S510. At S512, it is checked whether or not a predetermined time Tdi has lapsed after the start of positioning processing. The predetermined time Tdi is set to a time that is equal to or longer than a time in which the angle of the rotor is assumed to settle to the predetermined angle by one-phase/two-phase energization and is as short as possible. When the predetermined time Tdi has elapsed, the positioning processing is terminated at S514. That is, the ON operation for the one phase of the high side arm and the two phases of the low side arms is stopped, and these phases are changed to the OFF operation state. At S516, the brushless motor 2 is started. The processing of S514 may be carried out as the processing of changing the state of switching operation for the above one-phase/two-phase energization to the initial state of switching operation in conjunction with startup of the brushless motor 2. When the processing of S516 is completed, this series of processing is once terminated.

According to the nineteenth embodiment, the following advantages can be provided in addition to the advantages (1) to (4) of the fifteenth embodiment.

(8) Prior to a startup of the brushless motor 2, a current is supplied from one phase to two other phases of the brushless motor 2 to fix the angle of the rotor of the brushless motor 2 at a predetermined angle. Thus, a time it takes for the angle to settle to the predetermined angle can be shortened, and thus the starting time of the brushless motor 2 can be shortened.

(9) The predetermined angle is set in proximity to an angle delayed by 60° from the settled value of the rotor of the brushless motor 2 assumed if the initial state of switching operation in conjunction with the startup of the brushless motor 2 is continued. Thus, large rotary torque in the positive direction can be generated by the first switching operation, and consequently, the starting time can be shortened.

Twentieth Embodiment

When the above positioning processing by the one-phase/two-phase energization is carried out, rotary torque may not be generated by the one-phase/two-phase energization depending on the stop position of the brushless motor 2 before the positioning processing is started. More specifically, as apparent from FIG. 67, the rotary torque is not generated when the predetermined angle and the stop position are shifted from each other by 180°. In this case, consequently, there is a possibility that positioning cannot be appropriately carried out by the above processing.

Figure 69:
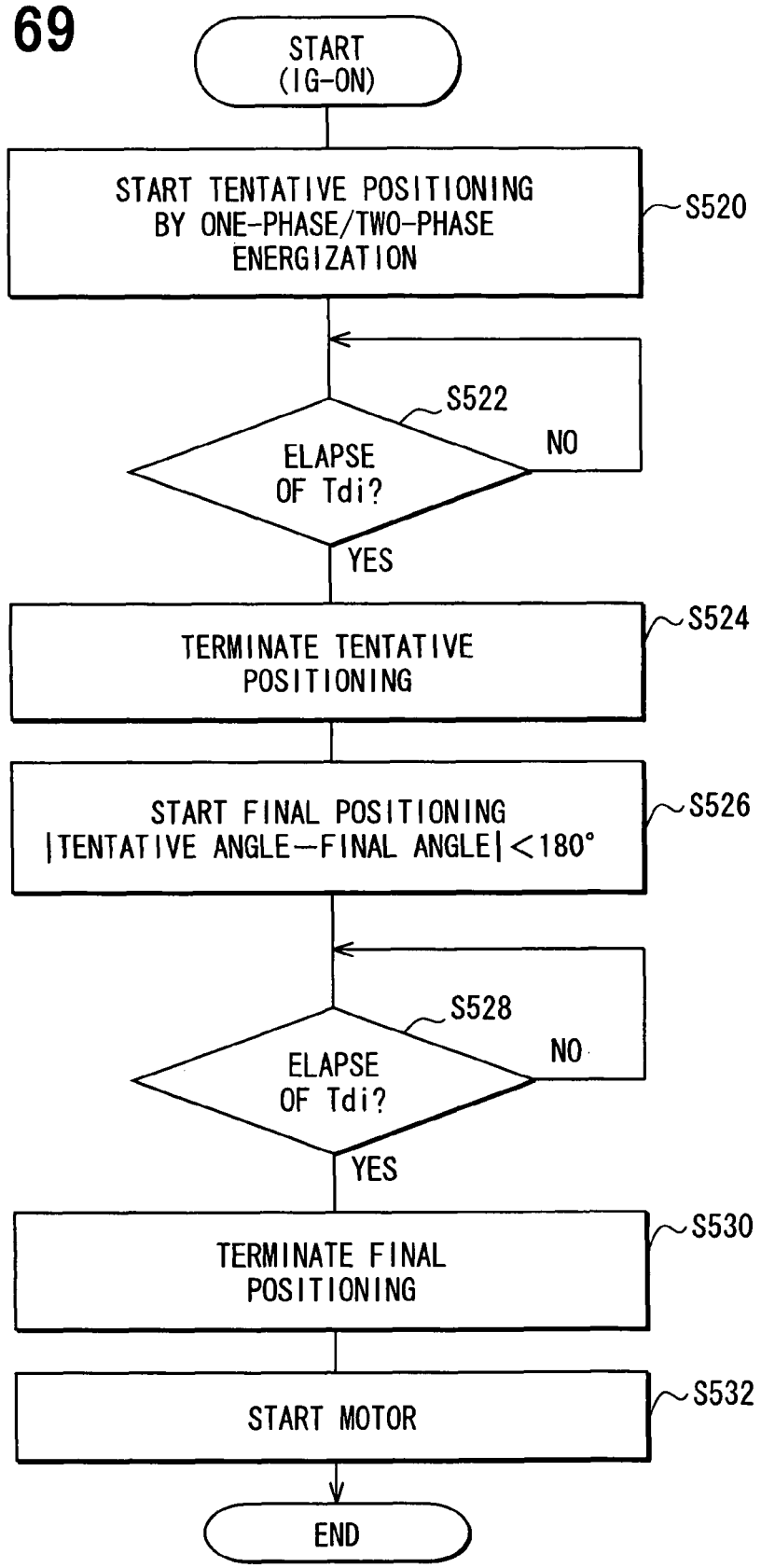
FIG. 69 is a flowchart illustrating positioning processing in a twentieth embodiment.

In a twentieth embodiment, consequently, positioning processing is achieved by carrying out one-phase/two-phase energization twice. FIG. 69 illustrates processing for starting the brushless motor 2 in this embodiment. This processing is triggered by the ignition switch being turned on and carried out by the drive control circuit 220.

This series of processing is carried out as follows. At S520, tentative positioning processing by one-phase/two-phase energization is carried out. At this time, the angle of the rotor is fixed at an angle different from a predetermined angle. When a predetermined time Tdi has elapsed (S522: YES), the tentative positioning processing is terminated at S524. At S526, subsequently, final positioning processing is carried out by the one-phase/two-phase energization. That is, this positioning processing is carried out to settle the angle of the rotor to the predetermined angle. At this time, the predetermined angle is set as in the fifteenth embodiment. That is, it is set to the angle in proximity to an angle delayed by 60° from the settled value of the angle of the rotor obtained if the initial state of switching operation in conjunction with startup of the brushless motor 2 is continued. The predetermined angle is so set that the angular difference between the angle at which the rotor is fixed by the above tentative positioning processing and the angle at which the rotor is fixed by the final positioning processing is larger than 0° and smaller than 180°. It is more desirably set so that the angular difference is substantially 60. When the time of the final positioning processing becomes equal to the predetermined time Tdi, the final positioning processing is terminated at S530. At S532, the brushless motor 2 is started.

According to the above processing, the following can be implemented even when the difference between the angle of the rotor of the brushless motor 2 and the predetermined angle is 180°. The brushless motor 2 can be rotated by tentative positioning processing to control the difference from the predetermined angle to less than 180°. For this reason, the angle of the rotor of the brushless motor 2 can be fixed at the predetermined angle without fail by final positioning processing. When the angle of the rotor of the brushless motor 2 prior to positioning processing is such an angle that the rotary torque is not generated by tentative positioning processing, this angle is an angle at which the rotary torque is generated by the final positioning processing. For this reason, the rotor can be rotated to the predetermined angle by the final positioning processing.

The following can be implemented by making the difference between the angle at which the rotor is fixed by the tentative positioning processing and the predetermined angle close to 60°. The predetermined time Tdi at S528 can be made shorter than the predetermined time Tdi at S512 in FIG. 68. The reason for this is as follows. The rotary torque generated in the brushless motor 2 when the final positioning processing is started is increased. As a result, a time required for the angle at which the rotor is fixed by the tentative positioning processing to transition to the predetermined angle is shortened.

According to the twentieth embodiment, the following advantage can be provided in addition to the advantages (8) and (9) of the nineteenth embodiment.

(10) The angle of the rotor of the brushless motor 2 is fixed at a predetermined angle by carrying out the one-phase/two-phase energization twice with the fixed position varied. Thus, the angle of the rotor can be fixed at the predetermined angle without fail regardless of the angle of the rotor of the brushless motor 2 prior to the positioning processing.

Twenty-first Embodiment

Figure 70:
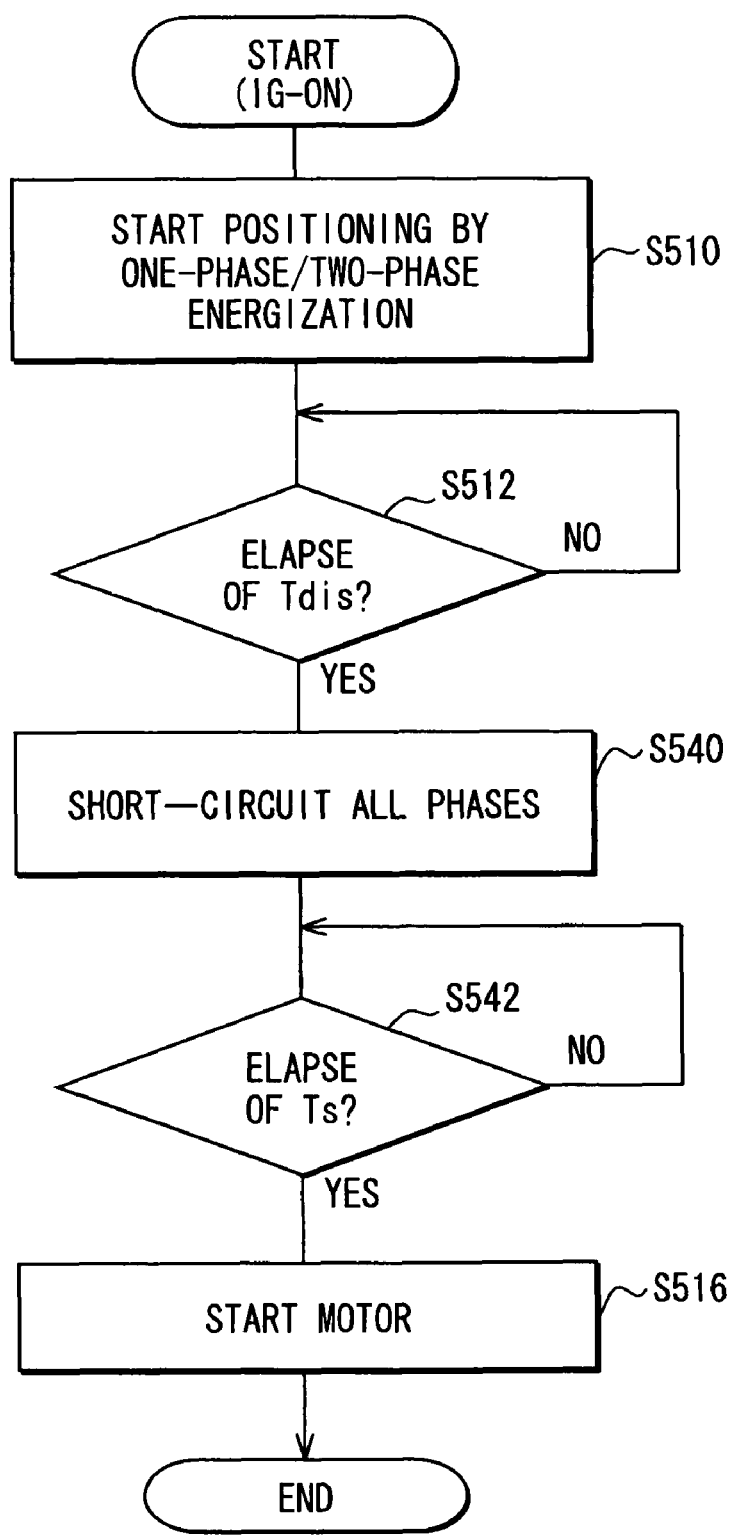
FIG. 70 is a flowchart illustrating positioning processing in a twenty-first embodiment.

In a twenty-first embodiment, as illustrated in FIG. 70, processing for starting a brushless motor 2 is triggered by the ignition switch being turned on and is carried out by the drive control circuit 220. This series of processing is similar to but different from the nineteenth embodiment (FIG. 68) in S540 and S542.

When it is determined at S512 that the predetermined time Tdis has elapsed, all-phase short-circuiting processing is carried out at S540. In this processing, the switching elements SW1, SW3, SW5 of the high side arms or the switching elements SW2, SW4, SW6 of the low side arms are all turned on. When the all-phase short-circuiting processing is carried out for a predetermined time Ts (S542: YES), the brushless motor 2 is started.

According to the all-phase short-circuiting processing, a current is supplied through the brushless motor 2 by the induced voltage in conjunction with rotation of the brushless motor 2. This current is attenuated by the resistance of the current passage and the like. In other words, rotational energy is attenuated. For this reason, the brushless motor 2 can be quickly stopped at the predetermined angle. The predetermined time Ts is set to a time that meets the following conditions: the time should be equal to or longer than a time in which vibration is attenuated by the all-phase short-circuiting processing so that the angle of the rotor of the brushless motor 2 settles to the predetermined angle and the motor is substantially stopped; and the time should be as short as possible.

According to this processing, it is unnecessary to determine the predetermined time Tdis at S512 according to a time it takes for the angle of the rotor of the brushless motor 2 to settle to the predetermined angle. The predetermined time can be determined according to a time required to cause the angle of the rotor to transition to a predetermined angle. For this reason, the predetermined time Tdis can be made shorter than the predetermined time Tdi at S512 in FIG. 68.

According to the twenty-first embodiment, the following advantage can be provided in addition to the advantages (8) and (9) of the nineteenth embodiment.

(11) After the processing by one-phase/two-phase energization, all the phases of the brushless motor 2 are short-circuited. Thus, a time it takes for the angle of the rotor to settle to the predetermined angle can be further shortened.

Twenty-second Embodiment

Figure 71:
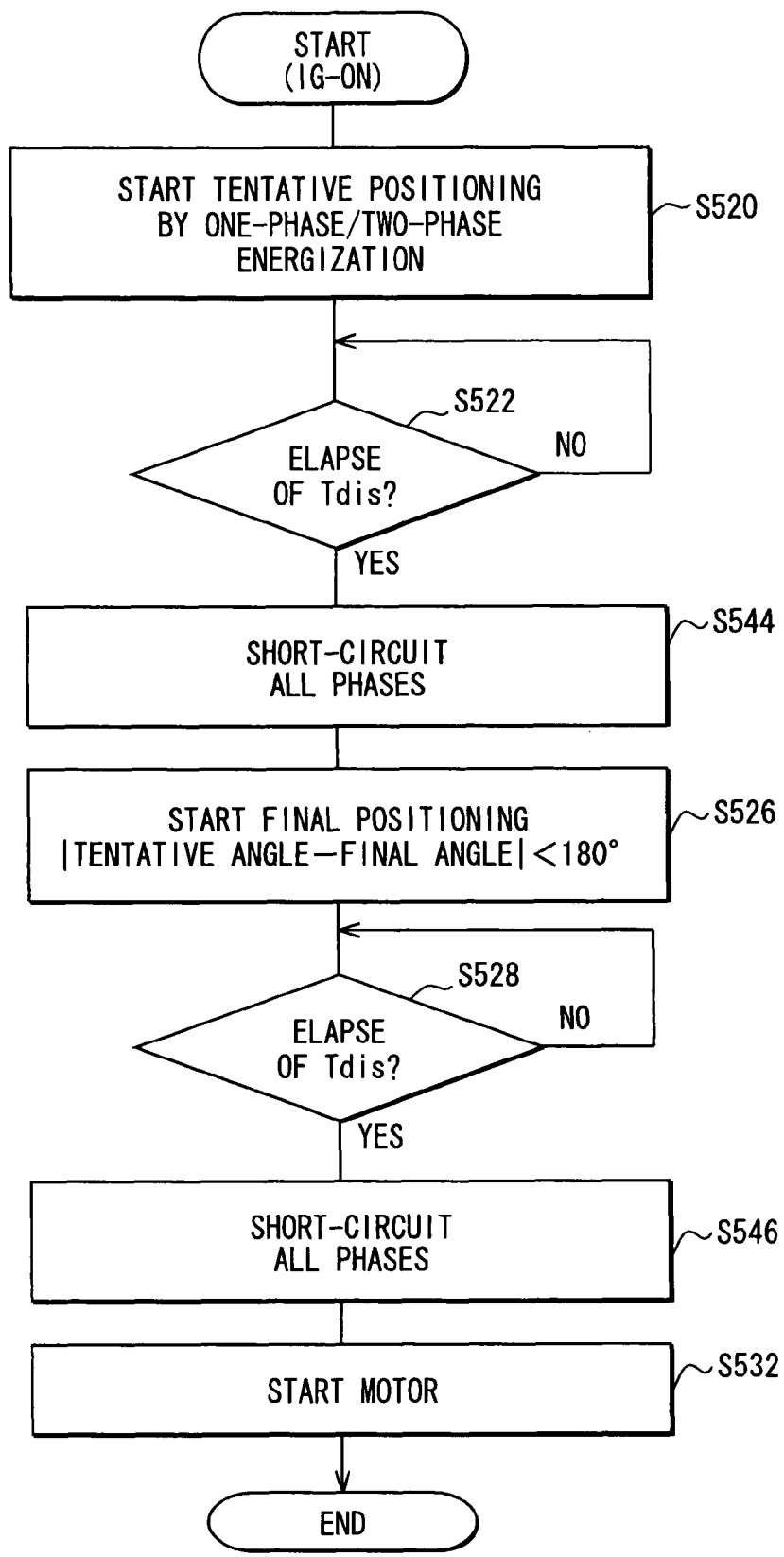
FIG. 71 is a flowchart illustrating positioning processing in a twenty-second embodiment.

FIG. 71 illustrates processing for starting the brushless motor 2 in a twenty-second embodiment. This processing is triggered by the ignition switch being turned on and is carried out by the drive control circuit 220. This processing is similar to but different from the processing of the twentieth embodiment (FIG. 69) in S544 and S546.

This series of processing is carried out as follows. All-phase short-circuiting processing is carried out (S544 and S546) when the following processing is carried out. It is carried out when the one-phase/two-phase energization for the tentative positioning processing is carried out for the predetermined time Tdis (S522: YES). In addition, it is carried out when the one-phase/two-phase energization for the final positioning processing is carried out for the predetermined time Tdis (S528: YES). Thus, the time required for positioning can be shortened as compared with the twentieth embodiment (FIG. 69).

Twenty-third Embodiment

A twenty-third embodiment is a modification of the twentieth embodiment (FIG. 69).

When the current supplied to the switching elements SW1 to SW6 becomes equal to or larger than the predetermined value in the 120°-energization control, PWM control is carried out to limit it. In this embodiment, PWM control is also carried out when the current supplied to the switching elements SW1 to SW6 is equal to or larger than a predetermined value in the positioning processing.

Figure 72:
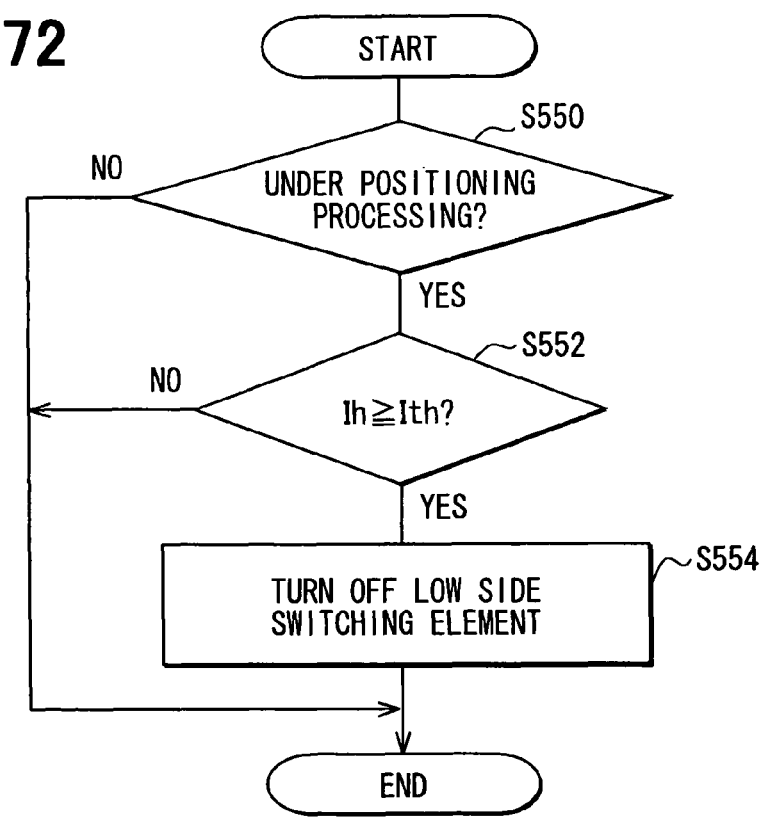
FIG. 72 is a flowchart illustrating processing for limiting an amount of energization in positioning processing in a twenty-third embodiment.

FIG. 72 illustrates processing in current limit control in this twenty-third embodiment. This processing is repeatedly carried out by the drive control circuit 220, for example, in a predetermined cycle.

At S550, it is checked whether or not the positioning processing is underway. When it is determined that the positioning processing is underway, it is determined at S552 whether or not the amount of current Ih of the switching elements SW1, SW3, SW5 of the high side arms is equal to or larger than a threshold current Ith. This processing is for determining whether or not the amount of current Ih is too large during the positioning processing. When it is determined that the amount of current Ihs is equal to or larger than the threshold current Ith, all the switching elements SW2, SW4, SW6 of the low side arms are turned off at S554. When a negative determination is made at S550 or S552 or when the processing of S554 is completed, this series of processing is once terminated.

In this twenty-third embodiment, the current may be limited by turning off the switching elements of the high side arms. In this case, however, processing is carried out to limit the current according to, for example, whether or not the sum of the values of currents passed through the switching elements of the low side arms is equal to or larger than a predetermined value.

According to the twenty-third embodiment, the following advantage (12) can be provided in addition to the advantages (8) and (9).

(12) When the amount of current supplied to the brushless motor 2 becomes equal to or larger than the predetermined value due to the one-phase/two-phase energization in positioning processing, the amount of energization is limited. Thus, the power consumption in positioning processing can be prevented from becoming excessively large. In addition, it is possible to prevent torque produced by energizing operation for positioning from becoming too high and shorten a time it takes for the rotation angle to settle.

Twenty-fourth Embodiment

Figure 73:
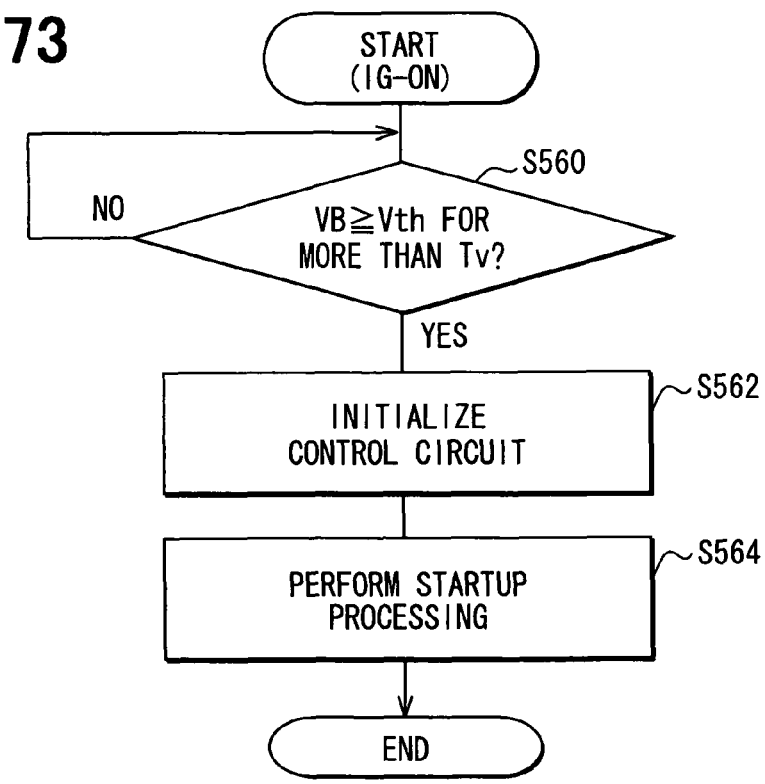
FIG. 73 is a flowchart illustrating processing for starting startup of a brushless motor in a twenty-fourth embodiment.

FIG. 73 illustrates processing associated with start of processing for starting the brushless motor 2 in a twenty-fourth embodiment. This processing is triggered by the ignition switch being turned on and is repeatedly carried out by the drive control circuit 220, for example, in a predetermined cycle.

In this processing, when a period for which the voltage VB of the battery 214 is equal to or higher than a specified voltage Vth lasts for a predetermined time Tv or longer (S560: YES), the following processing is carried out. Various parameters for controlling the brushless motor 2 in the drive control circuit 220 are initialized (S562), and processing associated with startup of the brushless motor 2 is carried out (S564). That is, the processing illustrated in FIG. 68 is carried out.

Figure 74:
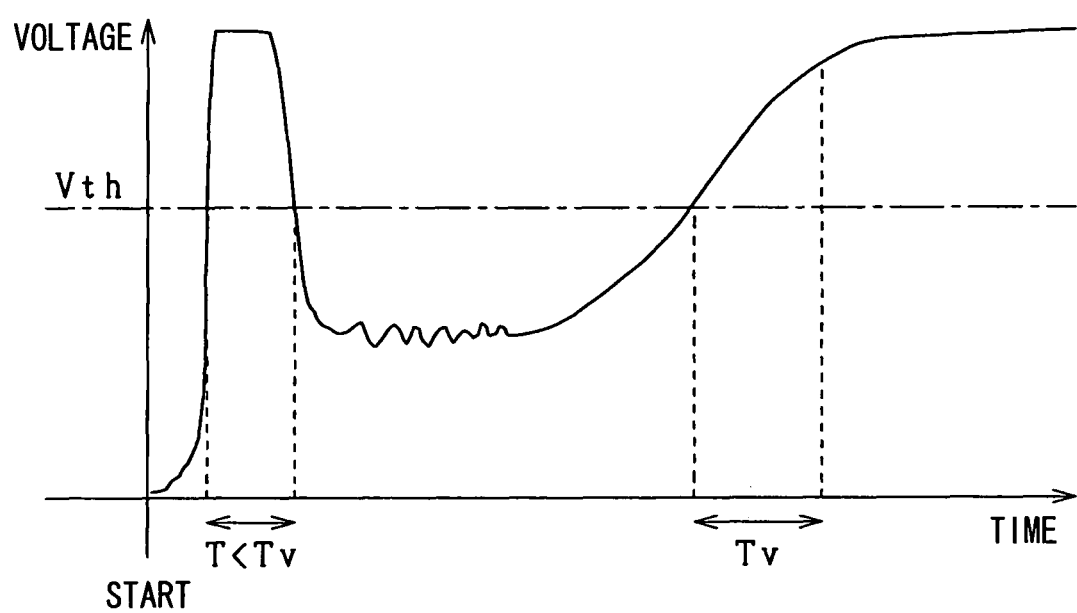
FIG. 74 is a signal diagram illustrating transition of a voltage of a battery at startup.

The specified voltage Vth is set to a value obtained by adding a predetermined margin to a voltage required for the operation of the drive control circuit 220 to stabilize. When the startup of the brushless motor 2 is restrained until a state in which the voltage of the battery 214 is equal to or higher than the specified voltage Vth lasts for the predetermined time TV or longer, the following can be implemented. As illustrated in FIG. 74, the brushless motor 2 can be started when the voltage of the battery 214 has been stabilized.

The reason why the initialization of S562 is carried out is as follows. Since the voltage applied to the drive control circuit 220 drops once, there is a possibility that the reliability of the parameters used in the drive control circuit 220 is degraded.

According to the twenty-fourth embodiment, the following advantages can be provided in addition to the advantages (8) and (9) of the twentieth embodiment.

(13) The brushless motor 2 is restrained from being started until the voltage of the brushless motor 2 becomes equal to or higher than a predetermined specified voltage. Thus, it is possible to prevent an event that the operation of the drive control circuit 220 is destabilized and the rotating state of the brushless motor 2 gets out of control and the like. For this reason, a situation in which the rotation of the brushless motor 2 is stopped and then starting processing is carried out again can be avoided.

(14) The brushless motor 2 is restrained from being started until a period for which the voltage of the battery 214 is equal to or higher than a specified voltage lasts for a predetermined time Tv. Thus, the motor can be started with the voltage of the battery 214 stabilized.

The fifteenth to twenty-fourth embodiments may be modified as described below.

The modification to the nineteenth embodiment made in the twenty-third embodiment may be applied to the twenty-first to twenty-second embodiments. The modification to the nineteenth embodiment made in the twenty-fourth embodiment may be applied to the fifteenth to the nineteenth and twenty-second to twenty-third embodiments.

The positioning processing need not be carried out by turning on the switching element of one phase of the high side arm and switching elements of the two other phases of the low side arms to pass a current from the one phase to the two other phases. For example, it may be carried out by turning on the switching elements of two phases of the high side arms and the switching element of the one other phase of the low side arm to pass a current from the two phases to the one phase. If the brushless motor 2 of four or more phases is used, for example, positioning processing may be carried out as follows. Switching elements of two phases of the high side arms are turned on and further, switching elements of two phases of the low side arms are turned on.

The predetermined angle is not limited to those described as an example with respect to the above embodiments. In this case, it is desirable to set the predetermined angle within an angle domain from ahead of an angle delayed by 180° to behind an angle advanced by 30°. To generate positive torque by the initial switching operation to start the brushless motor 2, it is desirable to set the predetermined angle on the delayed side. In addition, from the viewpoint of reducing a starting time regardless of whether or not a current is limited, it is desirable to set the predetermined angle ahead of an angle delayed by 120°.

The technique for setting a specified time point need not be the following method: a time required from the occurrence of zero-crossing time point immediately before to an occurrence of specified time point is calculated according to a time interval between occurrences of zero-crossing time point; and the calculated time required is corrected according to change in rotational speed. For example, a two-dimensional map defining the relation between rotational speed, acceleration, and time required may be used. Further, a time required t may be calculated from a predetermined angle during a period from an occurrence of zero-crossing time point to an occurrence of specified time point, rotational speed Ni, and acceleration Ai, by an expression of predetermined angle=Ni×t+(1/2)×Ai×t×t.

The technique for extracting information pertaining to change in a rotational speed from a result of detection of a zero-crossing time point and setting a specified time point based on this information is not limited to those described with respect to the above embodiments or the modifications thereto. For example, a value obtained by the following expression may be taken as the value of the specified time point setting counter at an occurrence of zero-crossing time point: present value of the counter×(present value of the counter/previous value of the counter). A value obtained by present value of the counter−K×(present value of the counter−previous value of the counter) may be taken as the value of the specified time point setting counter. That is, any technique can be used as long as the above information is extracted by use of three or more results of zero-crossing time point detection and a specified time point is set based on this information.

The construction of the current detector 228 is not limited to those described as an example with respect to the above-embodiments. For example, it may be so constructed that a shunt resistor is provided between each switching element SW1, SW3, SW5 and the positive potential of the battery 214 and a current supplied to them is detected based on the amount of voltage drop by the shunt resistor.

The brushless motor 2 need not be an actuator mounted in a fuel pump and may be, for example, an actuator of a fan for cooling a radiator of an in-vehicle internal combustion engine. Further, it may be a motor provided in a data recorder or a reproducer mounted in an automobile navigation system or the like. That is, it may be a motor provided in a data recorder or a reproducer for disc media, such as DVD (Digital Versatile Disc), CD-ROM (Compact Disc Read Only Memory), and hard disc. The rotary machine need not be a motor and may be a generator.

The power supply need not be a battery 214 and may be a generator configured to convert the rotational energy of an in-vehicle internal combustion engine into electrical energy.

What is claimed is:

1. A rotary machine driving apparatus for a rotary machine comprising:
a sensorless mode driving means that drives the rotary machine in a sensorless mode after the rotary machine is driven to an initial position and started to rotate by forced commutation of currents supplied to the rotary machine;
a loss-of-synchronism predicting means that monitors, while the rotary machine is driven in the sensorless mode by the sensorless mode driving means, a state of rotation of the rotary machine and thereby detects a sign of the rotary machine transitioning to a state of loss of synchronism; and
a drive controlling means that, when the sign is detected by the loss-of-synchronism predicting means, temporarily stops driving of the rotary machine to bring the rotary machine into a free running state and thereafter carries out control so as to resume driving of the rotary machine.

2. The rotary machine driving apparatus of claim 1, wherein: the loss-of-synchronism predicting means detects a speed of the rotary machine, compares the detected speed with a normal speed of the rotary machine, and detects the sign when a difference between the detected speed and the normal speed becomes equal to or higher than a predetermined value.

3. The rotary machine driving apparatus of claim 2, wherein: the loss-of-synchronism, predicting means detects a period equivalent to an electrical angle of 60° based on the zero-crossing time point of an induced voltage of the rotary machine and compares a length of the detected period with a period equivalent to an electrical angle of 60° at a normal speed in case of the rotary machine being a three-phase rotary machine.

4. The rotary machine driving apparatus of claim 1, wherein: the loss-of-synchronism predicting means detects the sign when a period, for which a pattern of development of the output voltage of each phase for the rotary machine disagrees with a predetermined developmental pattern, becomes equal to or larger than a predetermined value.

5. The rotary machine driving apparatus of claim 1, wherein: the loss-of-synchronism predicting means discriminates an induced voltage of the rotary machine into three levels that are high level, low level and non-energization level set between the high level and the low level, in detecting a pattern of development of the induced voltage of each phase.

6. The rotary machine driving apparatus of claim 1, wherein: the loss-of-synchronism predicting means detects a current supplied to the rotary machine, and detects the sign when fluctuation in the current becomes equal to or higher than a predetermined value.

7. The rotary machine driving method of claim 6, wherein: the monitoring detects a pattern of development of an induced voltage of each phase of the rotary machine, and discriminates the induced voltage into three levels that are high level, low level and non-energization level set between the high level and the low level.

8. The rotary machine driving method of claim 6, wherein: the monitoring detects a current supplied to the rotary machine, and detects the sign when fluctuation in the current becomes equal to or higher than a predetermined value.

9. A rotary machine driving method comprising:
detecting an induced voltage developed in a winding of a rotary machine;
estimating a rotor position of the rotary machine based on the detected induced voltage thereby to obtain an energization time point for the rotary machine, characterized by
driving the rotary machine to start rotation by forced commutation after driving to an initial position by currents supplied to the rotary machine;
driving the rotary machine in a sensorless mode by supplying the currents in a predetermined commutation pattern after the rotary machine is started to rotate;
monitoring a state of rotation of the rotary machine and thereby detecting a sign of the rotary machine transitioning to a state of loss of synchronism, while the rotary machine is driven in the sensorless mode; and
temporarily stopping driving of the rotary machine to bring the rotary machine into a free running state when the sign is detected, and thereafter carrying out control so as to resume driving of the rotary machine.

10. The rotary machine driving method of claim 9, wherein: the monitoring detects the sign by either (1) comparing a detected speed of the rotary machine with a normal speed of the rotary machine, (2) comparing a length of a detected period equivalent to an electrical angle of 60° based on the zero-crossing time point of the induced voltage of the rotary machine with a period equivalent to an electrical angle of 60° at the normal speed, or (3) comparing a period for which a pattern of development of output voltage of each phase for the rotary machine disagrees with a predetermined developmental pattern becomes equal to or larger than a predetermined value.

11. A rotary machine driving apparatus for a rotary machine comprising:
- a forced commutation means for carrying out forced commutation to start the rotary machine before driving the rotary machine is a sensorless mode; and
- a torque limiting means for limiting a current supplied to a winding of the rotary machine to an upper limit level set higher than a level at which a current flows, when the rotary machine is in a normal rotating state, when the forced commutation means carries out the forced commutation,
- wherein the torque limiting means is configured to detect a current supplied to the rotary machine, compare a detected current with a reference corresponding to the upper limit level, and turn off supply of the current to the rotary machine when a comparison result indicates that the detected current exceeds the upper limit level.

12. The rotary machine driving apparatus of claim 11, wherein:
- the forced commutation means starts the forced commutation after positioning a rotor of the rotary machine; and
- the torque limiting means energizes the winding at a phase angle which is advanced by a predetermined amount from an appropriate phase angle relative to the rotor position.

13. A rotary machine driving method for a rotary machine comprising:
- detecting an induced voltage developed in a winding of the rotary machine when the rotary machine is driven in a sensorless mode;
- estimating a rotor position of the rotary machine based on the detected induced voltage thereby to obtain an energization time point for the rotary machine; characterized by
- detecting a current supplied to the rotary machine when the rotary machine is driven to start rotation by forced commutation of the current supplied before being driven in the sensorless mode; and
- limiting the current supplied to the winding of the rotary machine to an upper limit level set higher than a level at which a current flows in a steady rotating state of the rotary machine, when the current detected exceeds the upper limit level under a condition that the forced commutation is carried out to start the rotary machine.

14. The rotary machine driving method of claim 13, further comprising:
- starting the forced commutation after the rotor is positioned at an initial position; and
- energizing, simultaneously with the starting, the winding of the rotary machine at a phase angle which is advanced by a predetermined amount from an appropriate phase angle relative to the rotor position.

15. The rotary machine driving method of claim 14, wherein: the predetermined amount is about 30° in electrical angle of the rotary machine.

16. A rotary machine driving method comprising:
- comparing a terminal voltage of a rotary machine with a reference voltage with respect to magnitude to detect a zero-crossing time point when the reference voltage, which is either a neutral point voltage of the rotary machine or an equivalent thereof, and an induced voltage of the rotary machine agree with each other;
- operating switching elements to control a supply of current to the rotary machine based on the zero-crossing time point; and
- offset-correcting at least one of a value of the terminal voltage and a value of the reference voltage, which are compared with each other by the comparing means, to differentiate the values of the terminal voltage and the reference voltage when a rotational speed of the rotary machine is substantially zero, at which time the terminal voltage and the reference voltage are generally equal.

17. The rotary machine driving method of claim 16, wherein: the rotary machine is a multi-phase rotary machine, and the offset-correcting carries out an offset correction so that a result of comparison made when the rotational speed of the multi-phase rotary machine is substantially zero becomes the same for all phases.

18. A rotary machine driving apparatus for a rotary machine comprising:
- a loss-of-synchronism predicting means that monitors a state of rotation of the rotary machine and thereby detects a sign of the rotary machine transitioning to a state of loss of synchronism; and
- a drive controlling means that, when the sign is detected by the loss-of-synchronism predicting means, temporarily stops driving the rotary machine to bring the rotary machine into a free running state and thereafter carries out control to resume driving of the rotary machine,
- wherein the loss-of-synchronism predicting means detects a speed of the rotary machine, compares the detected speed with a normal speed of the rotary machine, and detects the sign when a difference between the detected speed and the normal speed becomes equal to or higher than a predetermined difference,
- wherein the loss-of-synchronism predicting means detects a period equivalent to an electrical angle of 60° based on the zero-crossing time point of an induced voltage of the rotary machine and compares a length of the detected period with a period equivalent to an electrical angle of 60° at a normal speed if the rotary machine is a three-phase rotary machine, and
- wherein the loss-of-synchronism predicting means detects the sign when a period, for which a pattern of development of the output voltage of each phase for the rotary machine disagrees with a predetermined development pattern, becomes equal to or larger than a predetermined period.

19. A rotary machine driving apparatus comprising:
- a power conversion circuit including a switching element;
- a comparing means for comparing a terminal voltage of a rotary machine with a reference voltage with respect to magnitude to detect a zero-crossing time point when the reference voltage, which is either a neutral point voltage of the rotary machine or an equivalent thereof, and an induced voltage of the rotary machine agree with each other, and operating the switching element to control a supply of current to the rotary machine based on the zero-crossing time point; and
- a correcting means for offset-correcting at least one of a value of the terminal voltage and a value of the reference voltage, which are compared with each other by the comparing means, so as to differentiate the values of the terminal voltage and the reference voltage when a rotational speed of the rotary machine is substantially zero, at which the terminal voltage and the reference voltage are generally equal to each other, wherein
the rotary machine is a multi-phase rotary machine, and
the correcting means carries out an offset correction so that a result of comparison by the comparing means when the rotational speed of the multi-phase rotary machine is substantially zero becomes the same for all phases.

* * * * *